(12) United States Patent
Rokhsaz et al.

(10) Patent No.: US 9,748,632 B2
(45) Date of Patent: Aug. 29, 2017

(54) RADIO FREQUENCY IDENTIFICATION (RFID) TAG(S) AND SENSOR(S)

(71) Applicant: RFMicron, Inc., Austin, TX (US)

(72) Inventors: Shahriar Rokhsaz, Austin, TX (US); Brian David Young, Austin, TX (US); Ahmed Younis, San Antonio, TX (US); John J. Paulos, Austin, TX (US); Abhay Misra, Austin, TX (US); Benjamin Cooke, Spicewood, TX (US); Marwan Hassoun, Austin, TX (US)

(73) Assignee: RF Micron, Inc., Austin, TX (US)

( * ) Notice: Subject to any disclaimer, the term of this patent is extended or adjusted under 35 U.S.C. 154(b) by 0 days.

(21) Appl. No.: 15/470,512

(22) Filed: Mar. 27, 2017

(65) Prior Publication Data

US 2017/0201004 A1    Jul. 13, 2017

Related U.S. Application Data

(63) Continuation of application No. 14/869,940, filed on Sep. 29, 2015, now Pat. No. 9,607,188.

(60) Provisional application No. 62/057,186, filed on Sep. 29, 2014, provisional application No. 62/057,187, filed on Sep. 29, 2014.

(51) Int. Cl.
*H01Q 1/22* (2006.01)
*H01Q 5/335* (2015.01)
*G06K 19/077* (2006.01)

(52) U.S. Cl.
CPC ..... *H01Q 1/2225* (2013.01); *G06K 19/07788* (2013.01); *H01Q 5/335* (2015.01)

(58) Field of Classification Search
None
See application file for complete search history.

(56) References Cited

U.S. PATENT DOCUMENTS

| 8,952,792 | B1 * | 2/2015 | Srinivas | 340/10.1 |
| 2012/0176240 | A1 * | 7/2012 | Athalye | H01Q 1/44 340/539.32 |
| 2013/0293354 | A1 * | 11/2013 | Vemagiri | H01F 38/14 340/10.1 |

* cited by examiner

*Primary Examiner* — Kristy A Haupt
(74) *Attorney, Agent, or Firm* — Garlick & Markison; Timothy W. Markison

(57) ABSTRACT

A wireless sensor includes an antenna, a sensing element, a tuning circuit, a processing module, a reference circuit block, and a transmitter. The tuning circuit adjusts the RF front-end to compensation for a change in a characteristic of the RF front end caused by the sensing element. The reference circuit block generates a signal based on a low voltage low frequency input that corresponds to a second environmental condition. The processing module generates a first digital value based on the adjustment to the RF front-end, where the first digital value is a representation of the first environmental condition, and generate a second digital value based on the signal, where the second digital value is a representation of the second environmental condition. The transmitter generates the outbound RF signal that includes at least one of the first and second digital values.

9 Claims, 33 Drawing Sheets

No Dither, 128 Average

True Random Bits, 1024 Average (Q=20), Peak-to-Peak "Error" ~ 0.2

True Random Bits, 128 Average (Q=20), Peak-to-Peak "Error" - 0.54

Pseudo Pseudo-Random Bits, 128 Average (Q=20), Peak-to-Peak "Error" - 0.2

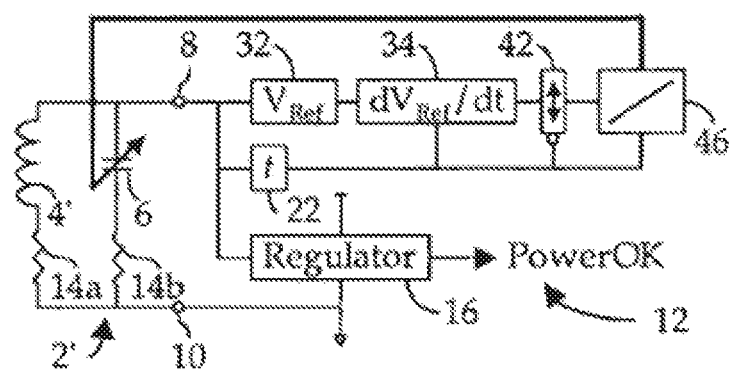
FIG. 36 illustrates in block schematic form, an embodiment of a self-tuning engine

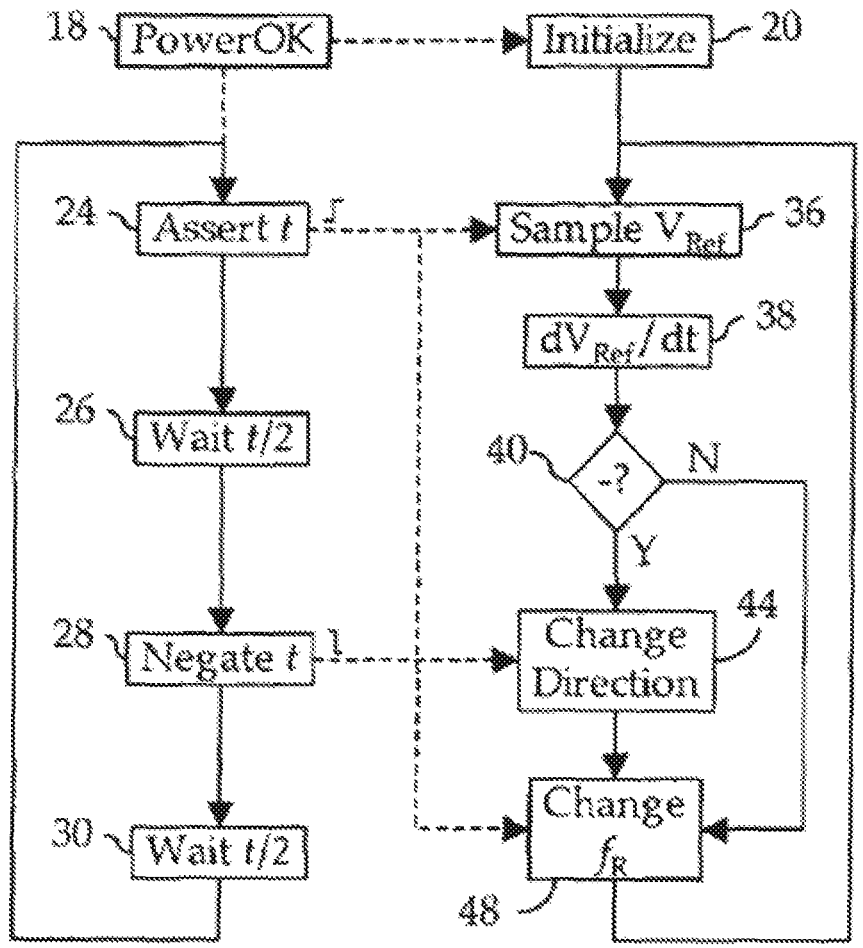
FIG. 37 illustrates in flow diagram form the sequencing of operations in the self-tuning engine shown in FIG. 36;

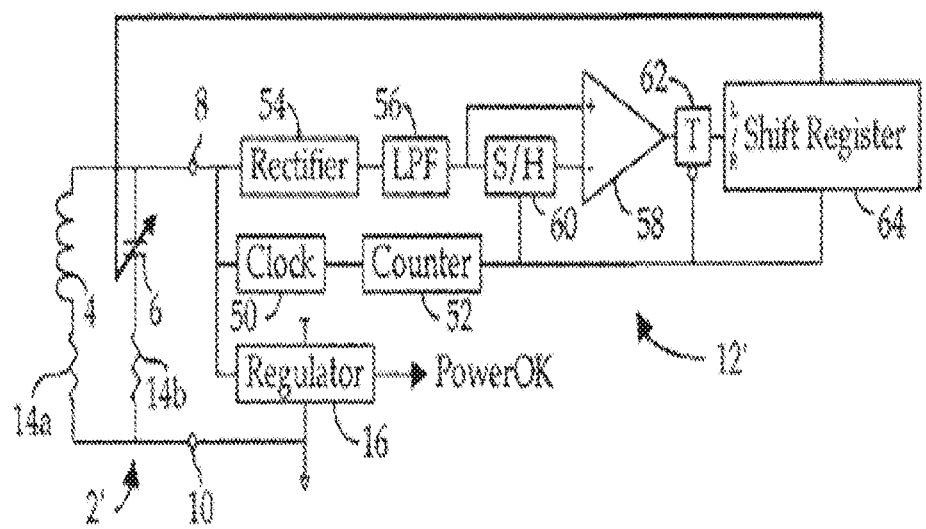
FIG. 38 illustrates in block schematic form, another embodiment of a self-tuning engine;

RADIO FREQUENCY IDENTIFICATION (RFID) TAG(S) AND SENSOR(S)

CROSS REFERENCE TO RELATED PATENTS

The present U.S. Utility patent application claims priority pursuant to 35 U.S.C. §120 as a continuation of U.S. Utility application Ser. No. 14/869,940, entitled "RADIO FREQUENCY IDENTIFICATION (RFID) TAG(S) and SENSOR(S)", filed Sep. 29, 2015, issuing as U.S. Pat. No. 9,607,188 on Mar. 28, 2017, which claims priority pursuant to 35 U.S.C. §119(e) to U.S. Provisional Application No. 62/057,186, entitled "RADIO FREQUENCY IDENTIFICATION (RFID) TAGS AND SENSORS", filed Sep. 29, 2014, and U.S. Provisional Application No. 62/057,187, entitled "METHOD AND APPARATUS FOR IMPEDANCE MATCHING USING DITHERING", filed Sep. 29, 2014, all of which are hereby incorporated herein by reference in their entirety and made part of the present U.S. Utility patent application for all purposes.

BACKGROUND OF THE INVENTION

1. Field of the Invention

The present invention relates generally to sensing a detectable environmental condition, and, in particular, to sensing a detectable environmental condition in a passive RFID system.

2. Description of the Related Art

In general, in an RF communication system, a single antenna structure is adapted to receive signals, the carrier frequencies ("$f_C$") of these signals can vary significantly from the resonant frequency ("$f_R$") of the antenna. The mismatch between $f_C$ and $f_R$ results in loss of transmitted power. In some applications, this may not be of particular concern, but, in others, such as in RF identification ("RFID") applications, such losses are of critical concern. For example, in a passive RFID tag, a significant portion of received power is used to develop all of the operating power required by the RFID tag's electrical circuits. In such an application, a variable impedance circuit can be employed to shift the $f_R$ of the RFID tag's receiver so as to better match the $f_C$ of the transmitter of the system's RFID reader. A single design that is useful in all systems is precluded by the lack of standards as to appropriate RFID system frequencies, and, the breadth of the available frequency spectrum is quite broad: Low Frequency ("LF"), including 125-134.2 kHz and 140-148.f kHz; High-Frequency ("HF") at 13.56 MHz; and Ultra-High-Frequency ("UHF") at 868-928 MHz. Compounding this problem is the fact that system manufacturers cannot agree on which specific $f_C$ is the best for specific uses, and, indeed, to prevent cross-talk, it is desirable to allow each system to distinguish itself from nearby systems by selecting different $f_C$ within a defined range.

Attempts have been made to improve the ability of the RFID tag's antenna to compensate for system variables, such as the materials used to manufacture the RFID tag. However, such structural improvements, while valuable, do not solve the basic need for a variable impedance circuit having a relatively broad tuning range.

Shown in FIG. 1 is an ideal variable impedance circuit 100. Circuit 100 comprised of a variable inductor 102, a variable capacitor 104 and a variable resistor. When used as a tank in a resonant system, the circuit 100 exhibits a quality factor ("Q") of:

$$Q = \frac{f_R}{\Delta f} = \frac{1}{R}\sqrt{\frac{L}{C}} \quad [1]$$

where: Q=the quality factor of circuit 100;
$f_R$=the resonant frequency of circuit 100, measured in hertz;
$\Delta f$=the bandwidth of circuit 100, measured in hertz at −3 db
R=the resistance of resistor, measured in ohms;
L=the inductance of variable inductor 102, measured in henries; and
C=the capacitance of capacitor, measured in farads.

In such a system, the resonant frequency, $f_R$, of circuit 100 is:

$$f_R = \frac{1}{2\pi\sqrt{LC}} \quad [2]$$

As is well known, the total impedance of circuit 100 is:

$$Z = \frac{Z_L Z_C}{Z_L + Z_C} \quad [3]$$

where: Z=the total impedance of circuit 100, measured in ohms;
$Z_L$=the impedance of variable inductor 102, measured in ohms; and
$Z_C$=the impedance of capacitor, measured in ohms.

As is known, the relationship between impedance, resistance and reactance is:

$$Z = R + jX \quad [4]$$

where: Z=impedance, measured in ohms;
R=resistance, measured in ohms;
j=the imaginary unit $$\sqrt{-1};$$

and
X=reactance, measured in ohms.

In general, it is sufficient to consider just the magnitude of the impedance:

$$|Z| = \sqrt{R^2 + X^2} \quad [5]$$

For a purely inductive or capacitive element, the magnitude of the impedance simplifies to just the respective reactance's. Thus, for variable inductor 102, the reactance can be expressed as:

$$X_L = 2\pi f L \quad [6]$$

Similarly, for capacitor, the reactance can be expressed as:

$$X_C = \frac{1}{2\pi f C} \quad [7]$$

Because the reactance of variable inductor 102 is in phase while the reactance of capacitor is in quadrature, the reactance of variable inductor 102 is positive while the reactance of capacitor is negative. Accordingly, a desired total impedance can be maintained if a change in inductive reactance is offset by an appropriate change in capacitive reactance.

Within known limits, changes can be made in the relative values of variable inductor 102, capacitor, and resistor to adjust the resonant frequency, $f_R$, of circuit 100 to better match the carrier frequency, $f_C$, of a received signal, while, at the same, maximizing Q.

In many applications, such as RFID tags, it may be economically desirable to substitute for variable inductor 102 a fixed inductor 202, as in the variable tank circuit 200 shown in FIG. 2. In general, in order to maximize Q in circuit 200.

The amplitude modulated ("AM") signal broadcast by the reader in an RFID system will be electromagnetically coupled to a conventional antenna, and a portion of the current induced in a tank circuit is extracted by a regulator to provide operating power for all other circuits. Once sufficient stable power is available, the regulator will produce, e.g., a power-on-reset signal to initiate system operation.

Tags based on conventional chips can be detuned by a variety of external factors, most commonly by proximity to liquids or metals. Such factors can change the impedance characteristics of a tag's antenna. When the tag chip has a fixed impedance, a mismatch between the chip and the antenna results, reducing the tag's performance.

BRIEF SUMMARY OF THE INVENTION

Embodiments of the present disclosure are directed to systems and methods that are further described in the following description and claims. Advantages and features of embodiments of the present disclosure may become apparent from the description, accompanying the drawings and claims.

Accordingly, the above problems and difficulties are obviated by embodiments of the present disclosure which provide an RF-based environmental sensing system comprising one or more special antenna arrangements, and an RF transceiver. In this embodiment, the antenna arrangement comprises: an antenna having an antenna impedance; and a transmission line operatively coupled to the antenna and adapted selectively to modify the antenna impendence. Further, the RF transceiver comprises: a number of tank circuit(s) operatively coupled to the antenna and having a selectively variable impedance; and a tuning circuit adapted to dynamically vary the impedance of the tank circuit, and to develop a first quantized value representative of the impedance of the tank circuit, wherein the first quantized value is a function of the modified antenna impedance.

Further embodiments provide a method for operating the first embodiment comprising the steps of: exposing the transmission line to a selected environmental condition; dynamically varying the impedance of the tank circuit substantially to match the modified antenna impedance; and using the first value to sense the environmental condition.

Another embodiment of the present disclosure provides an environmental sensing method for use in an RF system comprising the steps of: calibrating an RF sensor by developing a first calibration value indicative of an absence of a detectable quantity of a substance (or a known quantity or environmental parameter) and a second calibration value indicative of a presence of the detectable quantity of the substance (or a known quantity or environmental parameter); installing the sensor in a structure; exposing the structure to the substance; interrogating the sensor to retrieve a sensed value; and detecting the presence of the substance in the structure as a function of the sensed value relative to the first and second calibration values.

Yet another embodiment comprises multiple sensing engines that are located within a single integrated circuit (IC) or die that functions as a passive RFID tag. A generic sensing interface on the passive RFID tag provides additional flexibility and expanded general sensor applications. The present disclosure encompasses the ability for the passive RFID tag to (or based on the data supplied by the RFID tag) to make decisions based on multiple sensory inputs.

In yet another embodiment, the passive RFID tag/sensor includes one or more inductive loops, wherein the inductive loop(s) have a unique impedance, the unique impedance may be permanently altered in response to an environmental parameter proximate to the inductive loop(s). The quantized values generated in response to such an impedance change are used to indicate the occurrence of a physical event and/or the magnitude of such an occurrence. Such events include but are not limited to temperature changes, impacts, physical damage, exposure to moisture, humidity, or contaminates.

These embodiments and additional embodiments are described in more details in the detailed description.

BRIEF DESCRIPTION OF THE SEVERAL VIEWS OF THE DRAWINGS

Embodiments of the present disclosure may be more fully understood by a description of certain preferred embodiments in conjunction with the attached drawings in which:

FIG. 15, comprising

FIG. 36 illustrates in block schematic form, an embodiment of a self-tuning engine;

FIG. 37 illustrates in flow diagram form the sequencing of operations in the self-tuning engine shown in FIG. 36; and FIG. 38 illustrates in block schematic form, another embodiment of a self-tuning engine.

Figure 1:
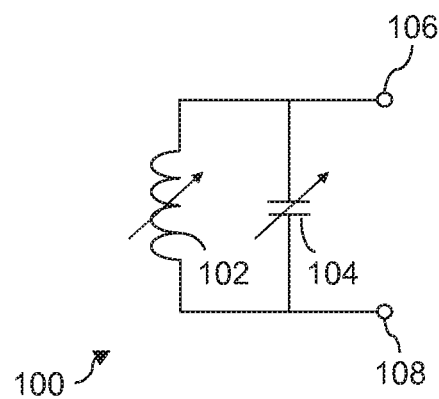
FIG. 1 is an ideal variable impedance circuit.
Figure 2:
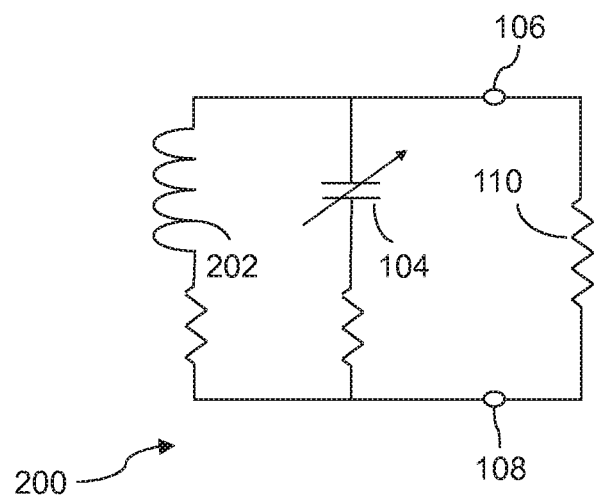
FIG. 2 is a second variable impedance circuit.

In the drawings, similar elements will be similarly numbered whenever possible. However, this practice is simply for convenience of reference and to avoid unnecessary proliferation of numbers, and is not intended to imply or suggest that the present disclosure requires identity in either function or structure in the several embodiments.

DETAILED DESCRIPTION OF THE INVENTION

Preferred embodiments of the present invention are illustrated in the FIGs., like numerals being used to refer to like and corresponding parts of the various drawings.

Throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, reference may be made to the mutually exclusive Boolean states as logic_0 and logic 1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Embodiments of the present disclosure provide various passive radio frequency identification (RFID) sensors. These passive RFID sensors include an antenna, a processing module, and a wireless communication module. The antenna has an antenna impedance that may vary with an environment in which the antenna is placed. The processing module couples to the antenna and has one or more self-tuning module(s) that may vary a reactive component impedance coupled to the antenna in order to change a system impedance. The system impedance including both the antenna impedance and the reactive component impedance. The self-tuning module(s) then produces an impedance value representative of the reactive component impedance. A memory module may store the impedance value which may then later is communicated to an RFID reader via the wireless communication module. The RFID reader then exchanges the impedance value representative of the reactive components of impedance with the RFID reader such that the RFID reader or another external processing unit may process the impedance value in order to determine environmental conditions at the antenna. These environmental conditions may include but are not limited to temperature, humidity, wetness, or proximity of the RFID reader to the passive RFID sensor.

FIG. 36 illustrates in block schematic form, an embodiment of a self-tuning engine. In FIG. 36 the amplitude modulated ("AM") signal broadcast by the reader in an RFID system will be magnetically coupled to a conventional coil antenna comprising inductor 3604', and a portion of the induced current is extracted via nodes 3608 and 3610 by a regulator 3616 to produce operating power for all other circuits. Once sufficient stable power is available, regulator 3616 will produce a PowerOK signal to initiate system operation (see, 3618 and 3620 in FIG. 37). If desired, a variable resistor (not shown) can be provided in parallel with inductor 3604', generally between nodes 3608 and 3610, and regulator 3616 can be constructed so as to automatically vary this resistance to control the gain of the tank circuit 3602'.

In response to the PowerOK signal, a timer 3622 will periodically generate a timing pulse t (see, generally, 3624, 3626, 3628, and 3630 in FIG. 37). Preferably, the frequency of t pulses is a selected sub-multiple of the received signal, and the duty cycle is on the order of fifty percent (50%). However, as will be explained below, other duty cycles may be appropriate depending on the specific circuit elements selected to implement my invention.

In response to the PowerOK signal, a reference voltage generator 3632 will continuously produce a reference voltage signal $V_{Ref}$ proportional to the voltage induced by the received signal between nodes 3608 and 3610. In response to the assertion of each t pulse, a differentiator 3634, will save the then-current value of the $V_{Ref}$ signal (see, 3636 in FIG. 37). Thereafter, differentiator 3634 will continuously determine the polarity of the change of the previously saved value with respect to the then-current value of the $V_{Ref}$ signal (see, 3638 in FIG. 37). If the polarity is negative, indicating that the current $V_{Ref}$ signal is lower than the previously-saved $V_{Ref}$ signal, differentiator 3634 will assert a change direction signal; otherwise, differentiator 3634 will negate the change direction signal (see, 3640 in FIG. 37).

In response to each negation of t, a direction selector 3642 will toggle between an up state and a down state if and only if differentiator 3634 is then asserting the change direction signal; otherwise, selector 3642 continues to maintain its current state (see, 3644 in FIG. 37).

In response to the PowerOK signal, a ramp generator 3646 will reset to a predetermined initial value (see, 3620 in FIG. 37). Thereafter, in response to each assertion of t, generator 3646 will selectively change the value of capacitor 3606, thereby changing the resonant frequency $f_R$ of circuit 3602' (see, 3648 in FIG. 37). Preferably, the initial value for generator 3646 is selected such that the initial resonant frequency $f_R$ of circuit 3602' will approximate the anticipated carrier frequency $f_C$ of the received signal, thereby assuring convergence with a minimal number of re-tuning cycles. Although the initial value can be established using any of several known non-volatile techniques, including hard wiring or any of a variety of read-only-memory (ROM) structures, re-writable mechanisms, such as a flash or other electrically-programmable ROM structure are preferable. Using the latter, it would be a simple matter to construct regulator 3616 so as to provide a PowerLoss signal when the level of available power drops to a predetermined minimum, and then, in response to the PowerLoss signal, to copy the current value in generator 3646 into the memory. Upon next receiving the PowerOK signal, the generator 3646 will resume operation at the stored value, potentially reducing convergence time.

After each change in the resonant frequency $f_R$ of circuit 3602', circuit 3612 again determines the polarity of change of $V_{Ref}$. If the polarity is found to be positive, the resonant frequency $f_R$ is converging toward the carrier frequency $f_C$, so the direction of change is correct. However, if the polarity is found to be negative, the resonant frequency $f_R$ is diverging from the carrier frequency, and the direction of change must be reversed. During operation, circuit 12 will selectively vary the value of capacitor 3606 so that the resonant frequency $f_R$ of tank circuit 3602' converges toward the carrier frequency $f_C$ of the received signal. Thus, if the polarity is found to be positive, circuit 3612 will continue to vary the value of capacitor 3606 in the currently-selected direction, say, for example, "up"; but, if the polarity is found to be negative, circuit 3612 will switch the direction in which the value of capacitor 3606 is varied, i.e., from "up" to "down", and begin varying the value of capacitor 6 in the newly-selected direction, now "down". In this manner, circuit 3612 is able to converge the resonant frequency $f_R$ toward the carrier frequency $f_C$ regardless of whether or not the resonant frequency is initially higher or lower than the carrier frequency.

In the current embodiment it is irrelevant which direction is initially selected by selector 3642, as circuit 3612 will quickly detect divergence and reverse the state of selector 3642. However, if desired, a predetermined initial direction can be selected during initialization using conventional means.

It is to be expected that, as difference between the resonant frequency $f_R$ of tank circuit 3602' and the carrier frequency $f_C$ of the received signal becomes relatively small, the ability of differentiator 3634 to detect polarity changes will be significantly diminished. At such time, circuit 3612 will tend to seek, i.e., changing tuning direction on each t. Additional circuitry could be easily added to detect this condition and to, for example, significantly decrease the operating frequency of timer 3622 or, if desired, cease operation.

Another embodiment of a self-tuned engine that is digitally based is shown in FIG. 38. Thus, for example, in the digital circuit 3612' shown in FIG. 38, timer 3622 could comprise a clock 3650 and an up/down-counter 3652 adapted to continuously negate the t signal while down-counting to predetermined minimum value and then to continuously assert the t signal while up-counting to a predetermined maximum value, the counter 3652 automatically reversing count direction upon reaching the predetermined minimum/maximum values. $V_{Ref}$ generator 3632 could be implemented using a full-wave rectifier 3654 and a low-pass filter 3656, while differentiator 3634 could comprise a comparator 3658 with its positive input adapted to receive the current value of $V_{Ref}$ and its negative input adapted to receive the previous value of $V_{Ref}$ captured and saved by a sample-and-hold 3660. Finally, selector 3642 can be a simple toggle latch 3662, while generator 3646 could be an n-bit, bidirectional edge-triggered shift register 3664. In response to the assertion of the PowerOK signal, shift register 3664 will preferably initialize the high-order half of the n-bits to logic_0, and the low-order half to logic_1; in response to the leading-edge of the t signal (i.e., upon each assertion of t), shift register 3664 will shift either left or right, depending on the state of toggle latch 3662. Thus, to increase frequency, register 3664 would perform a right-shift with a left fill of logic_0; whereas to decrease frequency, register 3664 would perform a left-shift with a right-fill of logic_1.

When comparator 3658 negates the change direction signal, the resonant frequency of circuit 3602" is converging on the carrier frequency of the received signal; whereas, when comparator 3658 asserts the change direction signal, the resonant frequency of circuit 3602" is diverging from the carrier frequency of the received signal. Thus, for example, if the old value held in sample-and-hold 3660 is less than the new value provided by the filter 3656, comparator 3658 will negate the change direction signal, indicating that register 3664 is shifting in the correct direction to achieve convergence; under this condition, toggle 3662 will not toggle. On the other hand, if the old value held in sample-and-hold 3660 is greater than the new value provided by the filter 3656, comparator 3658 will assert the change direction signal, indicating that register 3664 is not shifting in the correct direction to achieve convergence; under this condition, toggle 3662 will toggle.

In the embodiment shown in FIG. 38, it is preferable but not necessary to select the minimum anticipated settling time of the sample-and-hold 3660 as the minimum duration of the negated portion of each t pulse. For the period of t, it is preferable but not necessary to select the minimum anticipated settling time of the tank circuit 3602' to each variation in tank capacitance. In such an arrangement, the negated portion of each t pulse will be relatively small with respect to the asserted portion. In general, this arrangement should enable circuit 3612' to "re-tune" the tank circuit 3602' as quickly as the various circuit components are able to detect, and then respond to, the resulting changes in $V_{Ref}$.

Self-tuning passive RFID sensors of the present disclosure enable a wide variety of applications. One embodiment provides a sensor for pressure or proximity sensing using a conventional compact dipole antenna augmented with a simple floating sheet of metal. The sensor exploits the basic electromagnetic effect where a sheet of metal brought in proximity to an inductive loop lowers the inductance of the loop due to eddy currents generated on the sheet of metal. The closer the sheet gets to the loop, the lower the inductance. Embodiments allow the metal to move freely while others only allow movement in one direction. The later allows a permanent record to be created of a physical event.

Conventional dipole design for RFID tags use a small inductive loop to tune out the input capacitance of the RFID IC. By placing a metal sheet near this inductive tuning loop, the inductance depends on the distance between the loop and the sheet. The self-tuning engine detects the change in inductance and adjusts its input capacitance to maintain peak power to the die. The change in capacitance can be read from the die as a sensor code using the standard EPC read command. The sensor code reflects the relative position of the sheet to the antenna inductor.

A proximity sensor mounts the RFID tag onto one surface and a metal patch onto another surface that moves relative to the RFID tag. As the patch moves closer to the RFID tag, the inductances of the tuning loop decreases. The self-tuning engine compensates for the lower inductance with higher capacitance which is then readable as a sensor code with higher value. The sensor reports closer proximity with higher sensor codes.

The proximity sensor can be converted into a pressure sensor by using a pressure sensitive spring between the sheet and the inductor. A simple spring is a small block of closed cell foam, which changes its thickness with pressure. Higher pressures compress the foam and bring the metal sheet closer to the inductor, lowering its inductance. Just as for the proximity sensor, the self-tuning engine compensates for the lower inductance with higher capacitance leading to a larger sensor code. The sensor reports higher pressure as higher sensor codes.

The proximity/pressure sensor uses a conventional compressed dipole with an inductive tuning loop fabricated on PET, polyimide, or other similar plastic material. As will be shown, the sensor incorporates a metal patch about the size of the inductive tuning loop placed directly over the tuning loop. The gap between the patch and the antenna can range, in one embodiment the gap varies from about 0.5 mm to 3 mm. The area enclosed by the inductive tuning loop must be tuned for the application so that the sensor code stays within its total tuning range. The sensor code changes as the gap between the tuning loop and the metal patch varies, so the design target would vary the codes within a predetermined range for the smallest gap and the largest gap, leaving margin for manufacturing and environmental variations to avoid pegging the sensor code during normal operation.

For operation as a pressure sensor, the metal patch is mounted over the tuning inductor using closed-cell neoprene foam rubber that can vary in thickness with pressure changes. The sensor codes are averaged to produce a single average sensor code at each pressure. The sensor achieves very linear response to pressure with low hysteresis. A simple linear calibration can be applied to convert the average sensor code reading directly to psi. Pressure sensors can use low-cost closed cell foams to implement very low-cost sensors. However, foams may have limited range of use as foams may set over time or wear out. Higher precision pressure sensors using steel springs are also possible.

Embodiments of the present disclosure can also serve as a metal detector, where the presence or absence of metal can be measured. The presence of metal in fluid flow in plastic pipe can be measured with potential applications in food processing.

Proximity applications also include on/off applications, such as open/closed sensors for doors or windows. As a security seal, the metal can be stripped off when a container is opened enabling the sensor to detect tampering. Conventional RFID tags can only achieve this function through destruction, leading to the possibility of false positives.

In general, prior disclosures have focused primarily on quantizing the voltage developed by the tank circuit as the primary means of matching the $f_R$ of the tank circuit to the transmission frequency, $f_C$, of the received signal. However, this voltage quantization is, at best, indirectly related to received signal field strength. Other effective and efficient methods may quantize the received field strength as a function of induced current. In particular, a method and apparatus adapted to develop this field quantization in a form and manner that is suitable for selectively varying the input impedance of the receiver circuit to maximize received power, especially during normal system operation. Additionally, in light of the power sensitive nature of RFID systems, disclosed methods and apparatus of the present disclosure vary the input impedance with a minimum power loss.

While prior disclosures use methods to sense environmental changes to which the RFID tag is exposed. Embodiments of the present disclosure further develop this capability and disclose embodiments specifically adapted to operate in a variety of environments.

Figure 3:
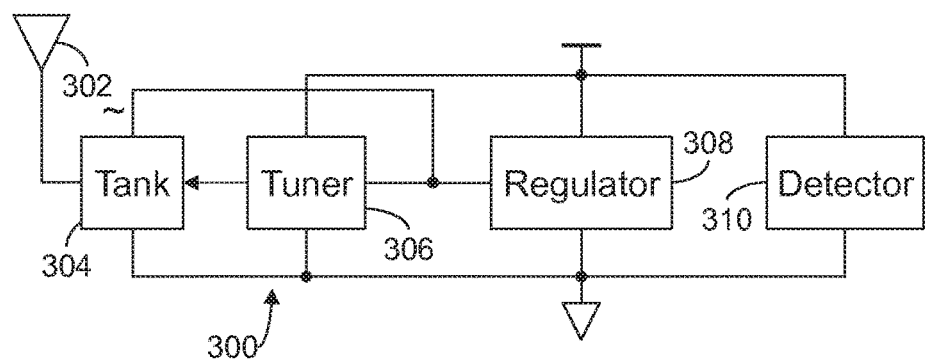
FIG. 3 illustrates, in block diagram form, an RF receiver circuit having a field strength detector constructed in accordance with an embodiment of the present disclosure.

Shown in FIG. 3 is an RF receiver circuit 300 suitable for use in an RFID application. An RF signal electromagnetically coupled to an antenna 302 is received via a tank circuit 304, the response frequency, $f_R$, of which is dynamically varied by a tuner 306 to better match the transmission frequency, $f_C$, of the received RF signal, thus obtaining a maximum power transfer. In particular, the RMS voltage induced across the tank circuit 304 by the received RF signal is quantized by tuner 306 and the developed quantization employed to control the impedance of the tank circuit 304 as explained above. Also, the unregulated, AC current induced in the tank circuit by the received RF signal is conditioned by a regulator 308 to provide regulated DC operating power to the receiver circuit 300. This allows the tank circuit 304 to function as a power harvesting circuit wherein the power may be stored in a capacitor, charge pump or other like circuit. In accordance with our present disclosure, we now provide a field strength detector 310, also known as a power detector, adapted to develop a field-strength value as a function of the field strength of the received RF signal. As indicated in FIG. 3, field strength detector 310 is adapted to cooperate with the regulator 308 in the development of the field-strength value. Field strength detector 310 can be adapted to cooperate with the tuner 306 in controlling the operating characteristics of the tank circuit 304.

In general, in an RF communication system, an antenna structure is used to receive signals, the carrier frequencies ("$f_C$") of which may vary significantly from the natural resonant frequency ("$f_R$") of the antenna. It is well known that mismatch between $f_C$ and $f_R$ results in loss of transmitted power. In some applications, this may not be of particular concern, but, in others, such as in RF identification ("RFID") applications, such losses are of critical concern. For example, in a passive RFID tag, a significant portion of received power is used to develop all of the operating power required by the RFID tag's electrical circuits. In such an application, a variable impedance circuit may be employed to shift the $f_R$ of the RFID tag's receiver so as to better match the $f_C$ of the transmitter of the system's RFID reader.

In accordance with one embodiment of the present disclosure, the amplitude modulated ("AM") signal broadcast by the reader in an RFID system (or other CW source) are magnetically coupled to a conventional coil antenna comprising inductor, and a portion of the induced current is extracted via nodes by a regulator to produce operating power for all other circuits. Such a regulator may include a charge pump.

Figure 4:
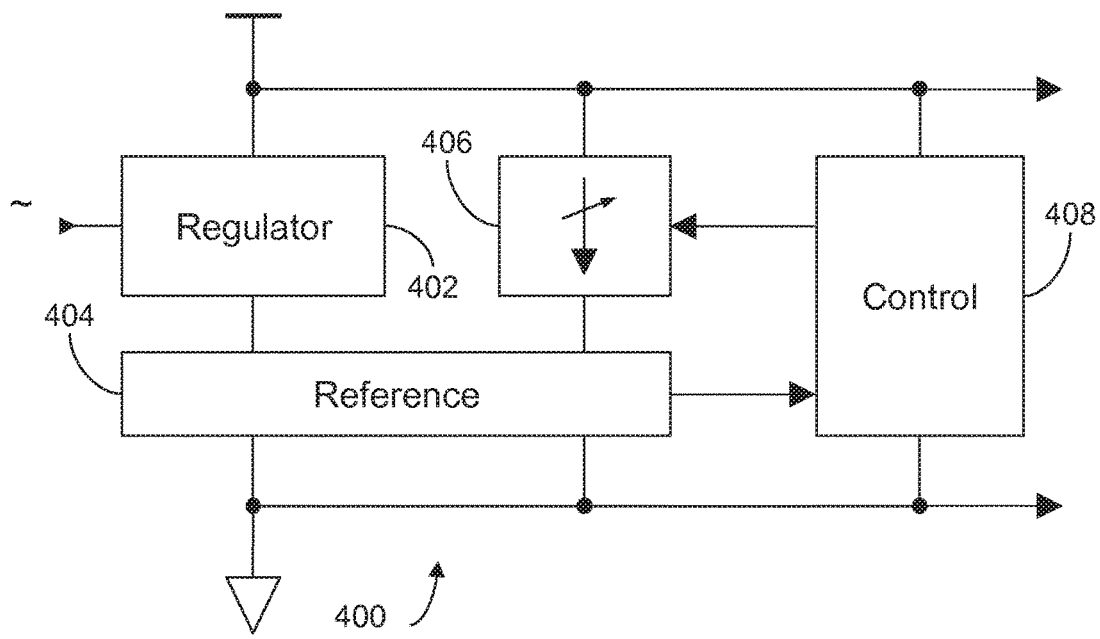
FIG. 4 illustrates, in block diagram form, a field strength detector circuit constructed in accordance with an embodiment of the present disclosure.

Shown by way of example in FIG. 4 is one possible embodiment of a field strength or power detector 400 (field strength detector 310 of FIG. 3) that is integrated into the sensor. This embodiment employs a shunt-type regulator 402 so that, during normal operation, the shunted 'excess' current can be used as a reference against which we develop the field-strength value. In this regard, reference module 404 produces a shunt current reference value proportional to the shunted current, and then develops a mirrored current reference value as a function of both the shunted current and a field strength reference current provided by a digitally-controlled current source 406. Preferably, once the tuner 306 has completed its initial operating sequence, whereby the $f_R$ of the tank circuit 304 has been substantially matched to the $f_C$ of the received signal, a digital control 408 initiates operation of the current source 406 at a predetermined, digitally-established minimum field strength reference current. After a predetermined period of time, control 408 captures the mirrored current reference value provided by the current reference module 404, compares the captured signal against a predetermined threshold value, and, if the comparison indicates that the field strength reference current is insufficient, changes, in accordance with a predetermined sequence of digital-controlled increments, the field strength reference current; upon the comparison indicating that the field strength reference current is sufficient, control 408 will, at least temporarily, cease operation.

In accordance with embodiments of the present disclosure, the digital field-strength value developed by control 408 to control the field strength current source 406 is a function of the current induced in the tank circuit 304 by the received RF signal. Once developed, this digital field-strength value can be employed in various ways. For example, it can be selectively transmitted by the RFID device (using conventional means) back to the reader (not shown) for reference purposes. Such a transaction can be either on-demand or periodic depending on system requirements. One embodiment distributes a plurality of RFID tag devices, perhaps randomly, throughout a restricted, 3-dimensional space, e.g., a loaded pallet. The reader is programmed to query, at an initial field strength, all tags "in bulk" and to command all tags that have developed a field-strength value greater than a respective field-strength value to remain 'silent'. By performing a sequence of such operations, each at an increasing field strength, the reader will, ultimately, be able to isolate and distinguish those tags most deeply embedded within the space; once these 'core' tags have been read, a reverse sequence can be performed to isolate and distinguish all tags within respective, concentric 'shells' comprising the space of interest. Although, in all likelihood, these shells will not be regular in either shape or relative volume, the analogy should still be applicable.

Figure 5:
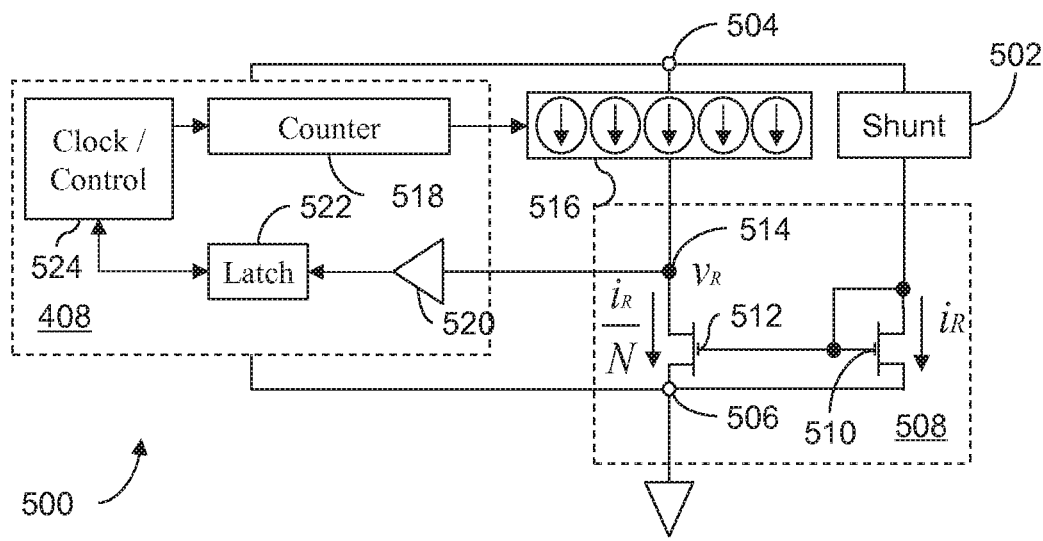
FIG. 5 illustrates, in block schematic form, a more detailed embodiment of the field strength detector circuit shown in FIG. 4.

FIG. 5 illustrates one embodiment of a field strength detector 500. In general, shunt circuit 502 develops a substantially constant operating voltage level across supply node 504 and ground node 506. Shunt regulators of this type are well known in the art, and typically use zener diodes, avalanche breakdown diodes, diode-connected MOS devices, and the like.

As can be seen, current reference 404 of FIG. 4 may be implemented in the form of a current mirror circuit 508, connected in series with shunt circuit 502 between nodes 504 and 506. As is typical, current mirror circuit 508 comprises a diode-connected reference transistor 510 and a mirror transistor 512. If desired, a more sophisticated circuit such as a Widlar current source may be used rather than this basic two-transistor configuration. For convenience of reference, the current shunted by shunt circuit 502 via reference transistor 510 is designated as $i_R$; similarly, the current flowing through mirror transistor 512 is designated as $i_R/N$, wherein, as is known, N is the ratio of the widths of reference transistor 510 and mirror transistor 512.

Here, the field strength current source 516 is implemented as a set of n individual current sources, each connected in parallel between the supply node 504 and the mirror transistor 512. In general, field strength current source 516 is adapted to source current at a level corresponding to an n-bit digital control value developed by a counter 518. In the illustrated embodiment, wherein n=5, field strength current source 516 is potentially capable of sourcing thirty-two distinct reference current levels. We propose that the initial, minimum reference current level be selected so as to be less than the current carrying capacity of the mirror transistor 512 when the shunt circuit 502 first begins to shunt excess induced current through reference transistor 512; that the maximum reference current level be selected so as to be greater than the current carrying capacity of the mirror transistor 512 when the shunt circuit 502 is shunting a maximum anticipated amount of excess induced current; and that the intermediate reference current levels be distributed relatively evenly between the minimum and maximum levels. Of course, alternate schemes may be practicable, and, perhaps, desirable depending on system requirements.

Within control 518, a conventional analog-to-digital converter ("ADC") 520, having its input connected to a sensing node 514, provides a digital output indicative of the field strength reference voltage, $v_R$, developed on sensing node

514. In one embodiment, ADC 520 may comprise a comparator circuit adapted to switch from a logic_0 state to a logic_1 when sufficient current is sourced by field strength current source 516 to raise the voltage on sensing node 514 above a predetermined reference voltage threshold, $v_{th}$. Alternatively, ADC 520 may be implemented as a multi-bit ADC capable of providing higher precision regarding the specific voltage developed on sensing node 514, depending on the requirements of the system. Sufficient current may be characterized as that current sourced by the field strength current source 516 or sunk by mirror transistor 512 such that the voltage on sensing node 514 is altered substantially above or below a predetermined reference voltage threshold, $v_{th}$. In the exemplary case of a simple CMOS inverter, $v_{th}$ is, in its simplest form, one-half of the supply voltage (VDD/2). Those skilled in the art will appreciate that $v_{th}$ may by appropriately modified by altering the widths and lengths of the devices of which the inverter is comprised. In the exemplary case a multi-bit ADC, $v_{th}$ may be established by design depending on the system requirements and furthermore, may be programmable by the system.

In the illustrated embodiment, a latch 522 captures the output state of ADC 520 in response to control signals provided by a clock/control circuit 524. If the captured state is logic_0, the clock/control circuit 524 will change counter 518 to change the reference current being sourced by field strength current source 516; otherwise clock/control circuit 524 will, at least temporarily, cease operation. However, notwithstanding, the digital field-strength value developed by counter 518 is available for any appropriate use, as discussed above.

Dithering is a well-known technique in quantization systems (e.g. ADC) achieved by adding noise before quantization makes it possible to achieve sub-LSB resolution with subsequent averaging. This is a very small amount of random noise (white noise), which is added to the input before conversion. Dithering's effect is to cause the state of the LSB to randomly oscillate between 0 and 1 in the presence of very low levels of input, rather than sticking at a fixed value. Rather than the signal simply getting cut off altogether at this low level (which is only being quantized to a resolution of 1 bit), dithering extends the effective range of signals that the ADC can convert, at the expense of a slight increase in noise—effectively the quantization error is diffused across a series of noise values which is far less objectionable than a hard cutoff. The result is an accurate representation of the signal over time. A suitable filter at the output of the system can thus recover this small signal variation.

This process is applicable to both ADC and reduction of word width in digital systems.

For example, consider an ideal, noise free ADC, an input corresponding to an output code of 15.8 will always code as 16, as will an input corresponding to 16.3. No amount of post-conversion averaging can discriminate between these two cases.

Now consider an ideal but noisy ADC, given enough of the right kind of noise, an input of 15.8 will result in a histogram of conversion results with an average value of 15.8, and an input of 16.3 will result in a histogram with an average value of 16.3. Similarly, with sufficient dithering, an input described by 16+0.1 $\sin(\omega t)$ will result in an output code sequence which will include an undistorted 0.1 $\sin(\omega t)$ component, which can be recovered by averaging or by an FFT.

Noise can be used to avoid local minima in search algorithms. "Hill Climbing" search algorithms find an optimal point in a multi-dimensional space by computing the gradient at a given point and then moving in the direction of the gradient. In the absence of noise, a simple Hill Climbing algorithm can only find the global maximum if there are no local maxima in the function. By adding noise to the gradient before taking the next step, the exploration of the function is randomized, and with enough noise the system can escape from local maxima to find the global maximum. In "annealing" algorithms, the variance of the noise is progressively reduced until the system freezes at the final solution.

The present disclosure provides a method and apparatus for incorporating dithering into the RFID sensor circuitry.

The present disclosure also provides a method and apparatus for a self-tuning engine with, optionally, the ability to detect RF field strength for use generally in RFID tags and sensors. A field strength reference generator develops a field strength reference current as a function of a field strength of a received RF signal; and a field strength quantizer develops a digital field strength value indicative of the field strength reference current. In one embodiment, detected field strength is used to dynamically vary the impedance of a tank circuit via an optimization loop that includes a search process whereby, over time, induced current is maximized. A similar process, as explained above is used for the self-tuning engine. Incorporating dithering into the process will be further discussed with reference to FIGS. 30 and 31A-31D.

Figure 6:
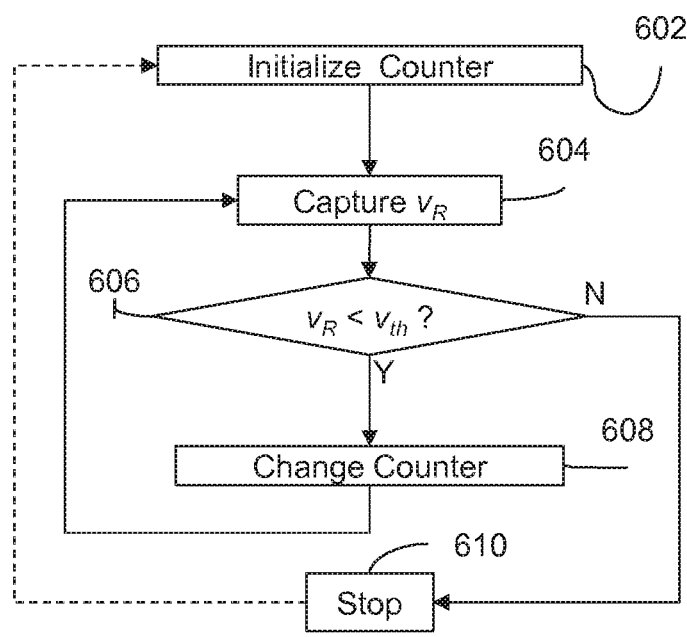
FIG. 6 illustrates, in flow diagram form, the sequencing of operations in the field strength detector circuit shown in FIG. 3.

By way of example, FIG. 6 illustrates one possible general operational flow of a field strength detector in accordance with embodiments of the present disclosure. Upon activation, counter 518 is set to its initial digital field-strength value (step 602), thereby enabling field strength current source 516 to initiate reference current sourcing at the selected level. After an appropriate settling time, the field strength reference voltage, $v_R$, developed on sensing node 514 and digitized by ADC 520 is captured in latch 522 (step 604). If the captured field strength reference voltage, $v_R$, is less than (or equal to) the predetermined reference threshold voltage, $v_{th}$, clock/control 524 will change counter 518 (step 606). This process will repeat, changing the reference current sourced by field strength current source 516 until the captured field strength reference voltage, $v_R$, is greater than the predetermined reference threshold voltage, $v_{th}$, (at step 608), at which time the process will stop (step 610). As illustrated, this sweep process can be selectively reactivated as required, beginning each time at either the initial field-strength value or some other selected value within the possible range of values as desired.

Figure 7:
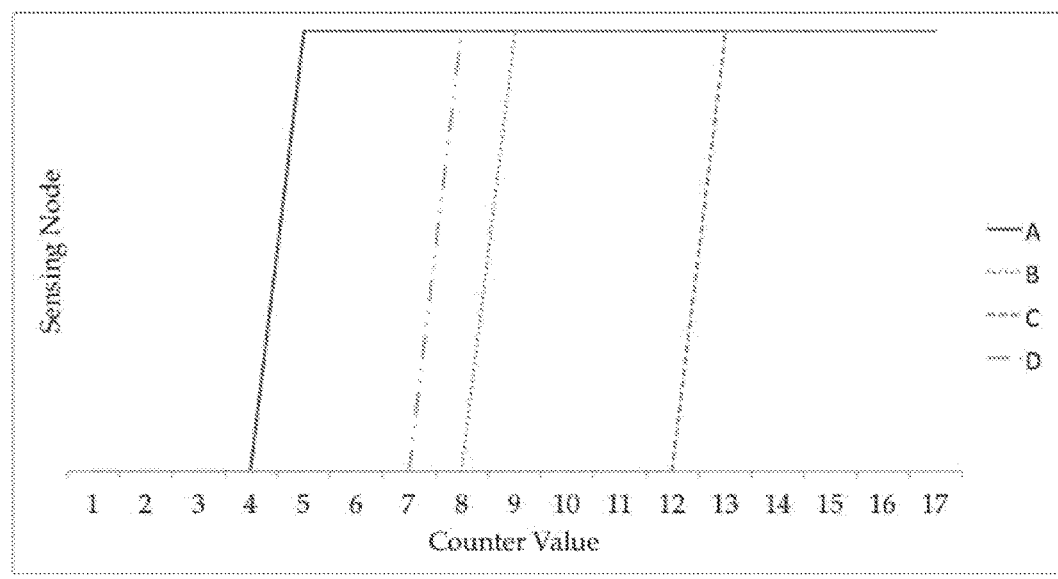
FIG. 7 illustrates, in graph form, the response of the field strength detector circuit shown in FIG. 3 to various conditions.

The graph provided in FIG. 7 depicts several plots of the voltage developed on sensing node 514 as the field strength detector circuit 400 sweeps the value of counter 518 according to the flow illustrated in FIG. 6. As an example, note that the curve labeled "A" in FIG. 7 begins at a logic_0 value when the value of counter 518 is at a minimum value such as "1" as an exemplary value. Subsequent loops though the sweep loop gradually increase the field strength reference voltage on sensing node 514 until counter 518 reaches a value of "4" as an example. At this point, the "A" plot in FIG. 7 switches from a logic_0 value to a logic_1 value, indicating that the field strength reference voltage, $v_R$, on sensing node 514 has exceeded the predetermined reference threshold voltage, $v_{th}$. Other curves labeled "B" through "D" depict incremental increases of reference currents, $i_R$, flowing through reference device, resulting in correspondingly higher mirrored currents flowing through the mirror device.

This incrementally higher mirror current requires field strength current source to source a higher current level which in turn corresponds to higher values in counter 518. Thus, it is clear that embodiments of the present disclosure are adapted to effectively and efficiently develop a digital representation of the current flowing through sensing node 514 that is suitable for any appropriate use.

Figure 8:
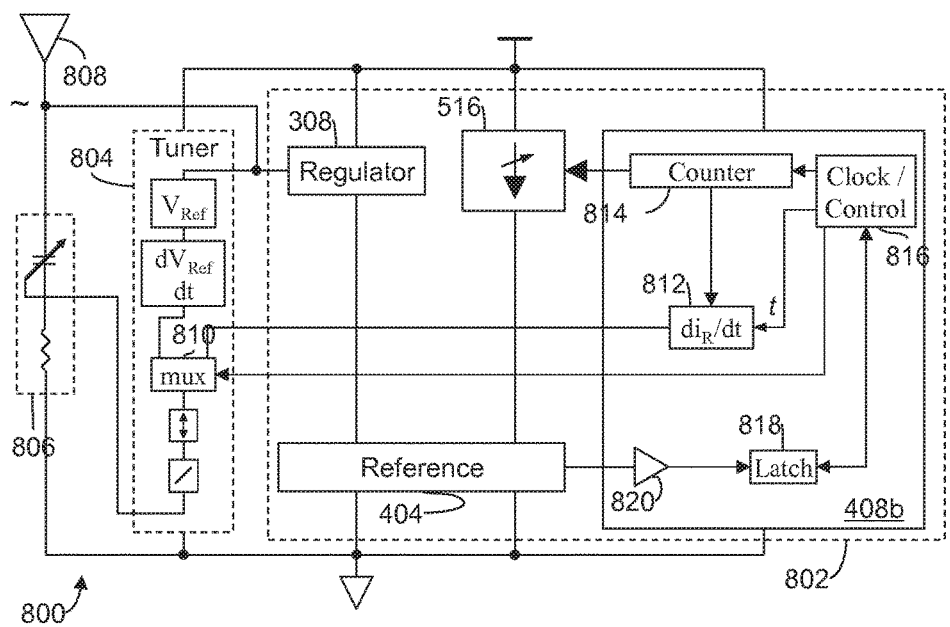
FIG. 8 illustrates, in block schematic form, an RF receiver circuit constructed in accordance with another embodiment of the present disclosure.

One such use, as discussed earlier, of field strength detector 310 is to cooperate with tuner 306 in controlling the operating characteristics of the tank circuit 304. FIG. 8 illustrates one possible embodiment where receiver circuit 800 uses a field strength detector 802 specially adapted to share with tuner 804 the control of the tank circuit 806. Dynamically tuning, via tuner 804, the tank circuit 806 allows one to dynamically shift the $f_R$ of the tank circuit 806 to better match the $f_C$ of the received RF signal at antenna 808. FIG. 8 adds a multiplexer 810 to tuner 804 to facilitate shared access to the tuner control apparatus. Shown in FIG. 9 is the operational flow of field strength detector 800 upon assuming control of tank circuit 806.

Figure 9:
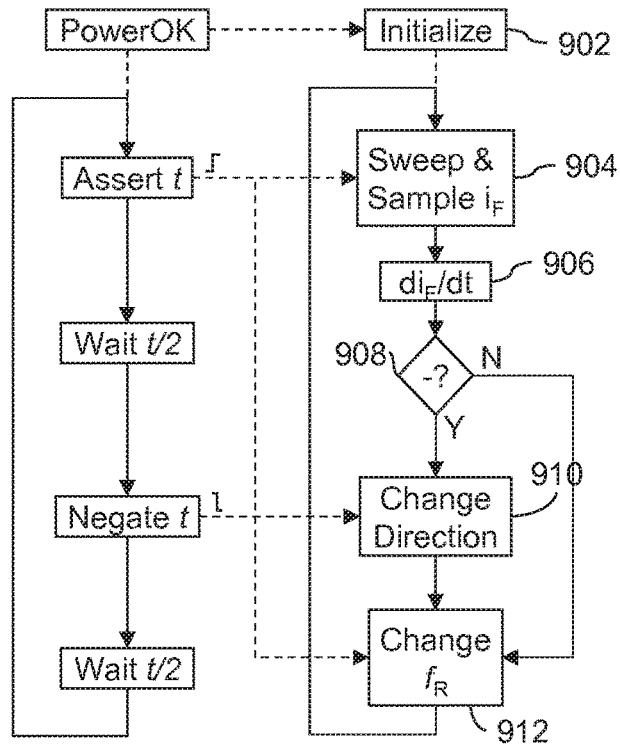
FIG. 9 illustrates, in flow diagram form, the sequencing of the operations in the RF receiver circuit shown in FIG. 8.
Figure 10:
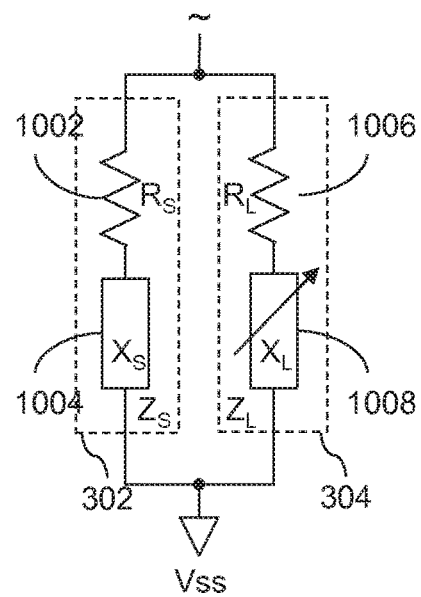
FIG. 10 illustrates, in block schematic form, an alternative representation of the impedance represented by the antenna and the tank circuit of the exemplary RFID receiver circuit.

In context of this particular use, once tuner 804 has completed its initial operating sequences, and field strength detector 500 has performed an initial sweep (as described above and illustrated in FIG. 6) and saved in a differentiator 812 a base-line field-strength value developed in counter 814, clock/control 816 commands multiplexer 810 to transfer control of the tank circuit 806 to field strength detector 802 (all comprising step 902 in FIG. 9). Upon completing a second current sweep, differentiator 812 will save the then-current field-strength value developed in the counter 814 (step 904). Thereafter, differentiator 812 will determine the polarity of the change of the previously saved field-strength value with respect to the then-current field-strength value developed in counter 814 (step 906). If the polarity is negative (step 908), indicating that the current field-strength value is lower than the previously-saved field-strength value, differentiator 812 will assert a change direction signal; otherwise, differentiator 812 will negate the change direction signal (step 910). In response, the shared components in tuner 804 downstream of the multiplexer 810 will change the tuning characteristics of tank circuit 806 (step 912). Now, looping back (to step 904), the resulting change of field strength, as quantized is the digital field-strength value developed in counter 814 during the next sweep (step 904), will be detected and, if higher, will result in a further shift in the $f_R$ of the tank circuit 806 in the selected direction or, if lower, will result in a change of direction (step 910). Accordingly, over a number of such 'seek' cycles, embodiments of the present disclosure will selectively allow the receiver 800 to maximize received field strength even if, as a result of unusual factors, the $f_R$ of the tank circuit 806 may not be precisely matched to the $f_C$ of the received RF signal, i.e., the reactance of the antenna is closely matched with the reactance of the tank circuit, thus achieving maximum power transfer. In an alternative embodiment, it would be unnecessary for tuner 804 to perform an initial operating sequence. Rather, field strength detector 802 may be used exclusively to perform both the initial tuning of the receiver circuit 800 as well as the subsequent field strength detection. Note that the source impedance of antenna 808 and load impedance of tank circuit 806 may be represented alternatively in schematic form as in FIG. 10, wherein antenna 808 is represented as equivalent source resistance $R_S$ 1002 and equivalent source reactance $X_S$ 1004, and tank circuit 806 is represented as equivalent load resistance $R_L$ 1006 and equivalent, variable load reactance $X_L$ 1008.

Figure 11:
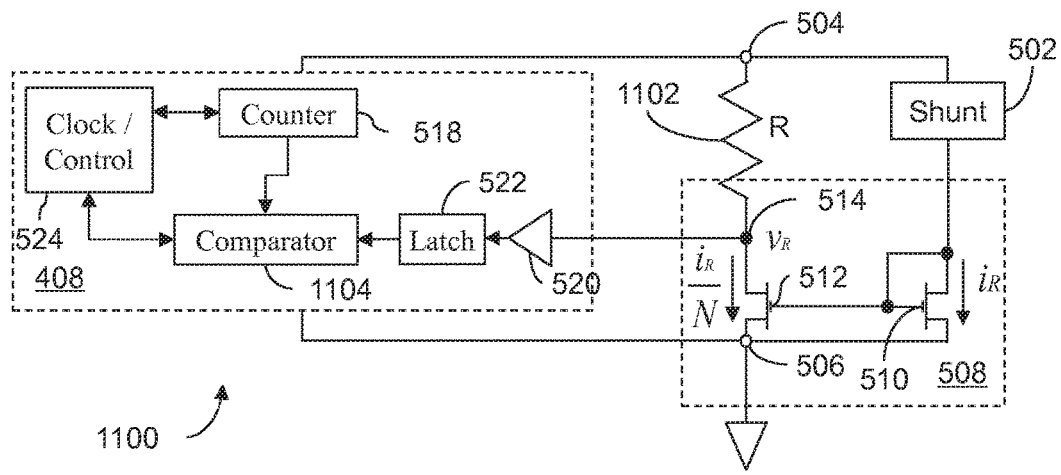
FIG. 11 illustrates, in block schematic form, an alternative exemplary embodiment of the field strength detector circuit shown in FIG. 5.

FIG. 11 illustrates alternate embodiments of a field strength detector 1100, previously discussed with reference to FIG. 5. Here, as before, shunt circuit 502 is used to develop a substantially constant operating voltage level across supply node 504 and ground node 506. Also, as before, the current reference 516 is implemented as a current mirror circuit 508 connected in series with shunt circuit 502 between nodes 504 and 506. However, in this embodiment, the field strength current source comprises a resistive component 1102 adapted to function as a static resistive pull-up device. Many possible implementations exist besides a basic resistor, such as a long channel length transistor, and those skilled in the art will appreciate the various implementations that are available to accomplish analogous functionality. The field strength voltage reference $v_R$ developed on sensing node 514 will be drawn to a state near the supply voltage when the mirrored current flowing though transistor 512 is relatively small, e.g. close to zero amps, indicating a weak field strength. As the field strength increases, the current flowing through mirror transistor 512 will increase, and the field strength voltage reference $v_R$ developed on sensing node 514 will drop proportionally to the mirrored current flowing through mirror transistor 512 as $i_R/N$. ADC 520, having its input connected to sensing node 514, provides a digital output indicative of the field strength reference voltage, $v_R$, developed on sensing node 514, as described previously.

In this alternate embodiment, latch 522 captures the output state of ADC 520 in response to control signals provided by a clock/control circuit 524. As disclosed earlier, the ADC 520 may comprise a comparator circuit. In this instance, ADC 520 is adapted to switch from a logic_1 state to a logic_0 when sufficient current is sunk by mirror transistor 512 to lower the voltage on sensing node 514 below a predetermined reference voltage threshold, $v_{th}$. Alternatively, ADC 520 may be implemented as a multi-bit ADC capable of providing higher precision regarding the specific voltage developed on sensing node 514 depending on the requirements of the system.

Comparator 1104 subsequently compares the captured output state held in latch 520 with a value held in counter 518 that is selectively controlled by clock/control circuit 524. In response to the output generated by comparator 1104, clock/control circuit 524 may selectively change the value held in counter 518 to be one of a higher value or a lower value, depending on the algorithm employed. Depending upon the implementation of counter 518 and comparator 1104, clock/control circuit 524 may also selectively reset the value of counter 518 or comparator 1104 or both. The digital field-strength value developed by counter 518 is available for any appropriate use, as discussed above.

Figure 12:
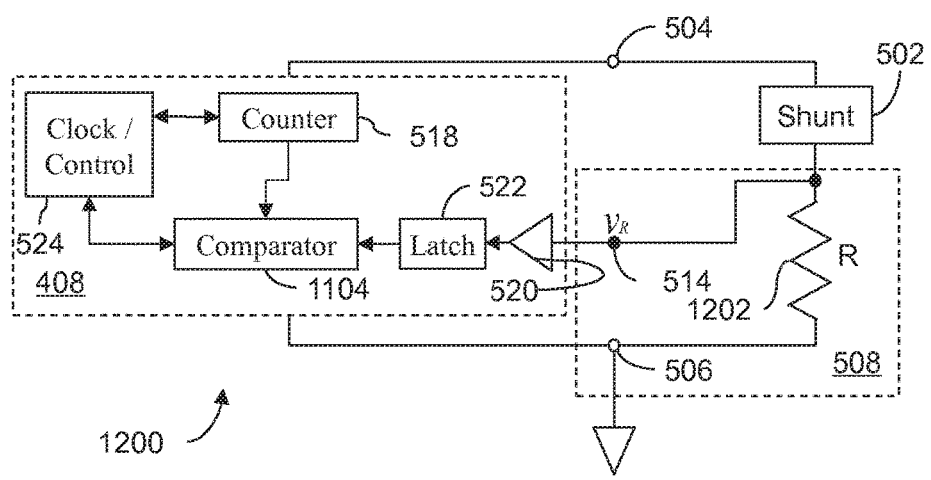
FIG. 12 illustrates, in block schematic form, an alternative exemplary embodiment of the field strength detector circuit shown in FIG. 5

In FIG. 12 we have illustrated another alternate embodiment of our field strength detector 1200 illustrated in FIG. 5. Here, as before, shunt circuit 502 is used to develop a substantially constant operating voltage level across supply node 504 and ground node 506. In this embodiment, the current reference is implemented as a resistive component 1202 that functions as a static pull-down device. Many possible implementations exist besides a basic resistor, such as a long channel length transistor and those skilled in the art will appreciate the various implementations that are available to accomplish analogous functionality. The field strength voltage reference $v_R$ developed on sensing node 514 will be drawn to a state near the ground node when the current flowing though shunt circuit 502 is relatively small, e.g. close to zero amps, indicating a weak field strength. As the field strength increase, the current flowing through shunt circuit 502 will increase, and the field strength voltage reference $v_R$ developed on sensing node 514 will rise proportionally to the current flowing through shunt circuit 502. ADC 520, having its input connected to a sensing node 514, provides a digital output indicative of the field strength reference voltage, $v_R$, developed on sensing node 514, as described previously.

In this alternate embodiment, latch 522 captures the output state of ADC 520 in response to control signals provided by a clock/control circuit 524. As disclosed earlier, the ADC 520 may comprise a comparator circuit. In this instance, ADC 520 is adapted to switch from a logic_0 state to a logic_1 when sufficient current is sourced by shunt circuit 502 to raise the voltage on sensing node 514 above a predetermined reference voltage threshold, $v_{th}$. Alternatively, ADC 520 may be implemented as a multi-bit ADC capable of providing higher precision regarding the specific voltage developed on sensing node 514, depending on the requirements of the system.

Comparator 1104 subsequently compares the captured output state held in latch 522 with a value held in counter 518 that is selectively controlled by clock/control circuit 524. In response to the output generated by comparator 1104, clock/control circuit 524 may selectively change the value held in counter 518 to be one of a higher value or a lower value, depending on the algorithm employed. Depending upon the implementation of counter 518 and comparator 1104, clock/control circuit 524 may also selectively reset the value of counter 518 or comparator 1104 or both. The digital field-strength value developed by counter 518 is available for any appropriate use, as discussed above.

In another embodiment, embodiments of the present disclosure may be adapted to sense the environment to which a tag is exposed, as well as sensing changes to that same environment. The auto-tuning capability of tuner 306 acting in conjunction with tank circuit 304 detects antenna impedance changes. These impedance changes may be a function of environmental factors such as proximity to interfering substances, e.g., metals or liquids, as well as a function of a reader or receiver antenna orientation. Likewise, as disclosed herein, field strength (i.e., received power) detector may be used to detect changes in received power (i.e., field strength) as a function of, for example, power emitted by the reader, distance between tag and reader, physical characteristics of materials or elements in the immediate vicinity of the RFID tag and reader, or the like. Sensing the environment or, at least, changes to the environment is accomplished using one or both of these capabilities.

Figure 13:
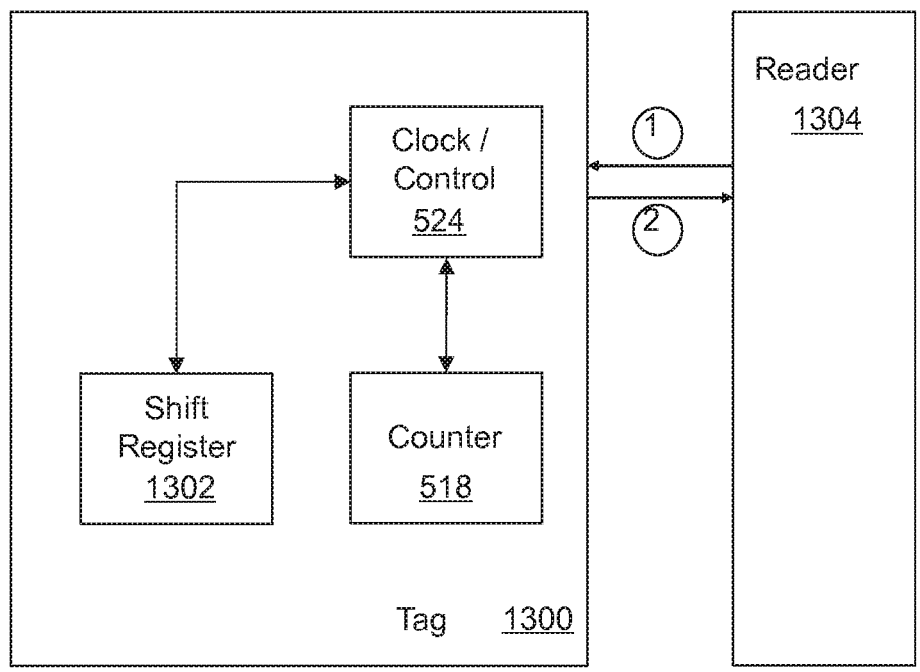
FIG. 13 illustrates, in block schematic form, an exemplary RFID sub-system containing tag and reader.

As an example, the RFID tag 1300 of FIG. 13, contains both a source tag antenna (not shown, but see, e.g., FIG. 8) and a corresponding load chip tank circuit 304 (not shown, but see, e.g., FIG. 8). Each contains both resistive and reactive elements as discussed previously (see, e.g., FIG. 10). Tag 1300 containing such a tank circuit 304 mounted on a metallic surface will exhibit antenna impedance that is dramatically different than the same tag 1300 in free space or mounted on a container of liquid. Shown in Table 1 are exemplary values for impedance variations in both antenna source resistance 1002 as well as antenna source reactance 1004 as a function of frequency as well as environmental effects at an exemplary frequency.

TABLE 1

Antenna Impedance Variations

| | 860 MHz | | 870 MHz | | 880 MHz | | 890 MHz | |
|---|---|---|---|---|---|---|---|---|
| | $R_S$, Ω | $X_S$, Ω | $R_S$, Ω | $X_S$, Ω | $R_S$, Ω | $X_S$, Ω | $R_S$, Ω | $X_S$, Ω |
| In Air | 1.3 | 10.7 | 1.4 | 10.9 | 1.5 | 11.2 | 1.6 | 11.5 |
| On Metal | 1.4 | 10.0 | 1.5 | 10.3 | 1.6 | 10.6 | 1.7 | 10.9 |
| On Water | 4.9 | 11.3 | 1.8 | 11.1 | 2.4 | 11.7 | 2.9 | 11.5 |
| On Glass | 1.8 | 11.1 | 2.0 | 11.4 | 2.2 | 11.7 | 2.5 | 12.0 |
| On Acrylic | 1.4 | 10.6 | 1.6 | 11.1 | 1.7 | 11.4 | 1.9 | 11.7 |
| | 900 MHz | | 910 MHz | | 920 MHz | | 930 MHz | |
| | $R_S$, Ω | $X_S$, Ω | $R_S$, Ω | $X_S$, Ω | $R_S$, Ω | $X_S$, Ω | $R_S$, Ω | $X_S$, Ω |
| In Air | 1.8 | 11.8 | 2.0 | 12.1 | 2.2 | 12.4 | 2.4 | 12.8 |
| On Metal | 1.9 | 11.2 | 2.1 | 11.6 | 2.3 | 12.0 | 2.6 | 12.4 |
| On Water | 2.5 | 12.3 | 3.0 | 12.7 | 5.8 | 14.1 | 9.1 | 13.2 |
| On Glass | 2.8 | 12.4 | 3.2 | 12.8 | 3.7 | 13.2 | 4.2 | 13.6 |
| On Acrylic | 2.0 | 12.1 | 2.3 | 12.4 | 2.5 | 12.8 | 2.8 | 13.2 |

The tuner circuit 306 of embodiments of the present disclosure automatically adjusts the load impendence by adjusting load reactance 1008 to match source antenna impedance represented by source resistance 1002 and source reactance 1004. As previously disclosed, matching of the chip load impedance and antenna source impedance can be performed automatically in order to achieve maximum power transfer between the antenna and the chip. A digital shift register 1302 allows selectively changing the value of the load reactive component 1008 (see, e.g., FIG. 10), in the present case a variable capacitor, until power transfer is maximized. This digital value of the matched impendence may be used either internally by the RFID tag 1300, or read and used by the reader 1304, to discern relative environmental information to which the RFID tag 1300 is exposed. For example, tag 1300 may contain a calibrated look-up-table within the clock/control circuit 524 which may be accessed to determine the relevant environmental information. Likewise, a RFID reader 1304 may issue commands (see transaction 1 in FIG. 13) to retrieve (see transaction 2 in FIG. 13) the values contained in digital shift register 1302 via conventional means, and used that retrieved information to evaluate the environment to which tag 1300 is exposed. The evaluation could be as simple as referencing fixed data in memory that has already been stored and calibrated, or as complex as a software application running on the reader or its connected systems for performing interpretive evaluations.

Likewise, consider a tag 1300 containing a field strength (i.e., received power) detector wherein the method of operation of the system containing the RFID tag 1300 calls for field strength detector to selectively perform a sweep function and developing the quantized digital representation of the current via the method discussed earlier. As illustrated in FIG. 13, counter 518 will contain the digital representation developed by our field strength detector 310 of the RF signal induced current, and may be used either internally by the RFID tag 1300, or read and used by the reader 1304, to discern relative environmental information to which the RFID tag is exposed. For example, reader 1304 may issue a command to the RFID tag 1300 to activate tuner 306 and/or detector 310 and, subsequent to the respective operations of tuner 306 and/or detector 310, receive the digital representations of either the matched impedance or the maximum current developed during those operations. Once again, this digital value of the field strength stored in the counter 518 may be used either internally by the RFID tag 1300, or read and used by the reader 1304, to discern relative environmental information to which the RFID tag 1300 is exposed. For example, tag 1300 may contain a calibrated look-up-table within the clock and control block 524 which may be accessed to determine the relevant environmental information. Likewise, a RFID reader may issue commands to retrieve the values contained in digital shift register 1302, and use that retrieved information to evaluate the environment to which tag 1300 is exposed. The evaluation could be as simple as referencing fixed data in memory that has already been stored and calibrated, or as complex as a software application running on the reader or its connected systems for performing interpretive evaluations. Thus, the combining of the technologies enables a user to sense the environment to which a tag 1300 is exposed as well as sense changes to that same environment.

Some environmental factors can change the effective impedance of the RFID antenna. Thus, it is possible to dynamically retune the tank circuit 304 or other like impedance to compensate for the environmentally-induced change in impedance by systematically changing the digital tuning parameters of tank circuit 304. By characterizing the antenna impedance as a function of various factors, one can develop an estimate of the relative change in the environmental factor as a function of the relative change in the digital tuning parameters of the tank circuit 304.

Figure 14:
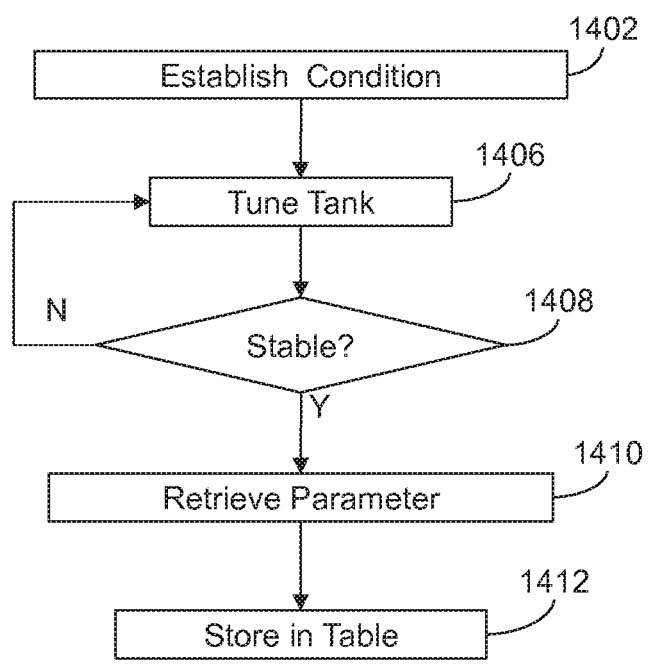
FIG. 14 illustrates, m flow diagram form, the sequencing of the operations in developing a reference table associating tank tuning parameters with system frequency.

As can be seen in Table 1, above, it is possible to develop, a priori, a reference table storing information relating to a plurality of environmental reference conditions. Thereafter, in carefully controlled conditions wherein one and only one environmental condition of interest is varied (see, FIG. 14), an operational tag 1300 is exposed to each of the stored reference conditions (step 1402) and allowed to complete the tank tuning process. (recursive steps 1406 and 1408. After tuning, has stabilized, the RFID tag 1300 can be interrogated (step 1410), and the final value in the shift register 1302 retrieved (step 1410). This value is then stored in the reference table in association with the respective environmental condition (step 1412). The resulting table might look like this:

TABLE 2

Tuning Parameters vs. Frequency

|  | 860 MHz | 870 MHz | 880 MHz | 890 MHz | 900 MHz | 910 MHz | 920 MHz | 930 MHz |
|---|---|---|---|---|---|---|---|---|
| In Air | 25 | 21 | 16 | 12 | 8 | 4 | 0 | 0* |
| On Metal | 31 | 27 | 22 | 17 | 12 | 8 | 3 | 0 |
| On Water | 20 | 19 | 12 | 12 | 4 | 0 | 0* | 0* |
| On Glass | 21 | 17 | 12 | 8 | 4 | 0* | 0* | 0* |
| On Acrylic | 23 | 19 | 14 | 10 | 6 | 2 | 0* | 0* |

0* indicates that a lower code was needed but not available; 0 is a valid code.

In contrast to prior art systems in which the antenna impedance must be estimated indirectly, e.g., using the relative strength of the analog signal returned by a prior art tag 1300 in response to interrogation by the reader 1304, methods of the present disclosure employ the on-chip re-tuning capability of our tag 1300 to return a digital value which more directly indicates the effective antenna impedance. Using a reference table having a sufficiently fine resolution, it is possible to detect even modest changes in the relevant environmental conditions. It will be readily realized by practitioners in this art that, in general applications, environment conditions typically do not change in an ideal manner, and, more typically, changes in one condition are typically accompanied by changes in at least one other condition. Thus, antenna design will be important depending on the application of interest.

One possible approach mounts the antenna on a substrate that tends to amplify the environmental condition of interest, e.g., temperature.

Figure 15A:
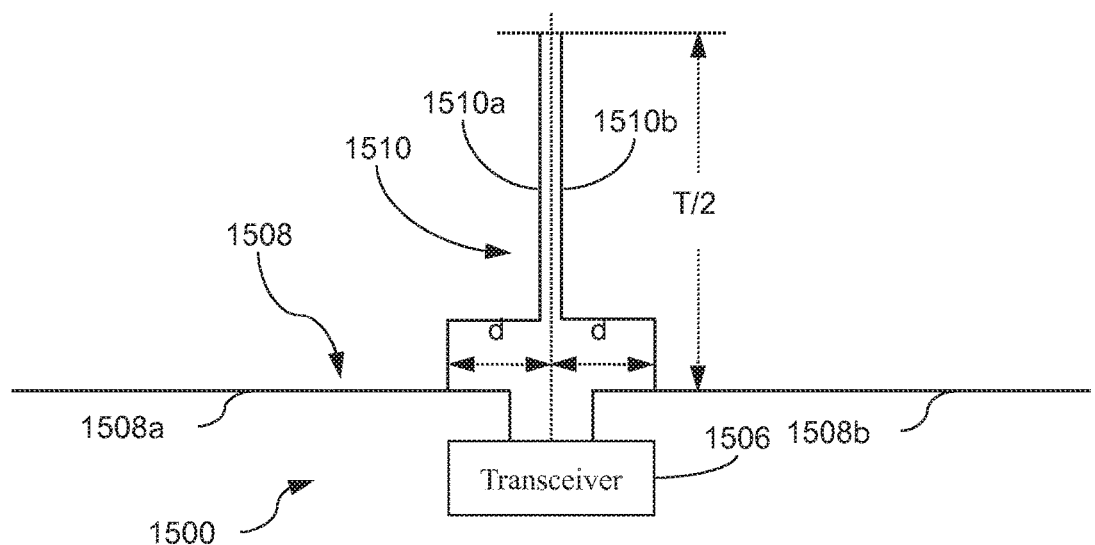
FIGS. 15A and 15B, illustrates an RF system constructed in accordance with one embodiment of the present disclosure to sense environmental conditions in a selected region surrounding the system.
Figure 15B:
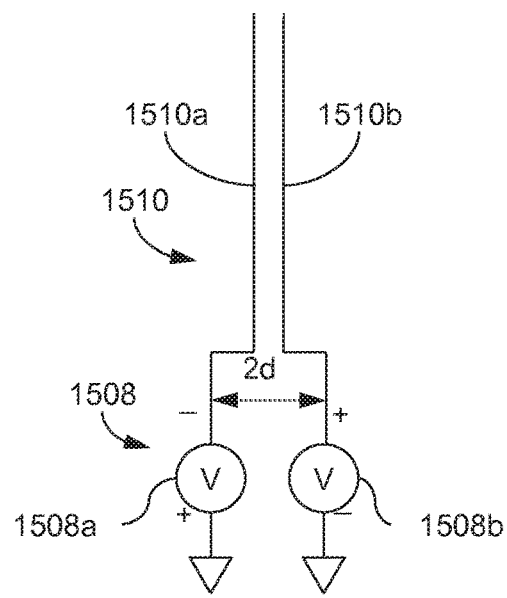

Shown in FIGS. 15A and 15B is an RF sensing system 1500 constructed in accordance with one embodiment of embodiments of the present disclosure, and specially adapted to facilitate sensing of one or more environmental conditions in a selected region surrounding the system 1500. In general, the system 1500 comprises: an RF transceiver 1506; a di-pole antenna 1508 comprising a pole 1508A and an anti-pole 1508B; and a tail 1510 of effective length T, comprising respective transmission line pole 1510A and transmission line anti-pole 1510B, each of length T/2. In accordance with embodiments of the present disclosure, the differential transmission line elements 1510A-1510B are symmetrically coupled to respective poles 1508A-1508B at a distance d from the axis of symmetry of the antenna 1508 (illustrated as a dotted line extending generally vertically from the transceiver 1506). In general, d determines the strength of the interaction between the transmission line 1510 and the antenna 1508, e.g., increasing d tends to strengthen the interaction. In the equivalent circuit shown in FIG. 15B, the voltage differential between the complementary voltage sources 1508A and 1508B tends to increase as d is increased, and to decrease as d is decreased. Preferably d is optimized for a given application. However, it will be recognized that the sensitivity of the antenna may be degraded as a function of d if a load, either resistive or capacitive, is imposed on the tail 1510.

In operation, the tail 1510 uses the transmission line poles 1510A-1510B to move the impedance at the tip of the tail 1510 to the antenna 1508, thus directly affecting the impedance of the antenna 1508. Preferably, the transceiver 1506 incorporates our tuning circuit 306 so as to detect any resulting change in antenna impedance and to quantize that change for recovery, e.g., using the method we have described above with reference to FIG. 14.

Figure 16:
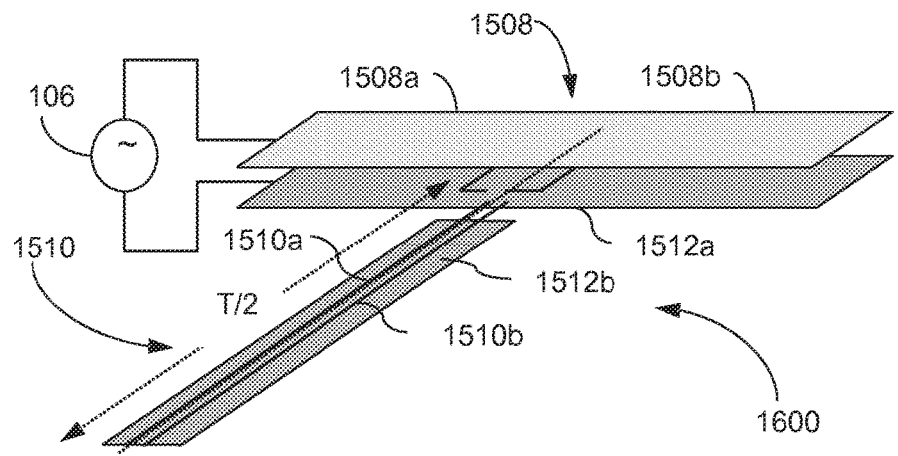
FIG. 16 illustrates, in perspective, exploded view, one possible configuration of an antenna and tail arrangement adapted for use in the system of FIG. 13.

FIG. 16 illustrates one possible embodiment of the system 1600 in which the antenna poles 1508A-1508B are instantiated as a patch antenna (illustrated in light grey), with the antenna pole 1508A connected to one output of transceiver 1506, and the other output of transceiver 1506 connected to the antenna anti-pole 1508B. A ground plane 1512A (illustrated in a darker shade of grey than the patch antenna 1508) is disposed substantially parallel to both the antenna poles 1508A-1508B and a ground plane 1512B disposed substantially parallel to the transmission line poles 1510A-1510B. As is known, the ground planes 1512 are separated from the poles by a dielectric substrate (not shown), e.g., conventional flex material or the like. If the dielectric layer between the antenna poles 1508 and ground plane 1512A is of a different thickness than the layer between the transmission line poles 1510 and the ground plane 1512B, the ground plane 1512B may be disconnected from the ground plane 1512A and allowed to float. In general, this embodiment operates on the same principles as described above with reference to FIGS. 15A and 15B.

Figure 17:
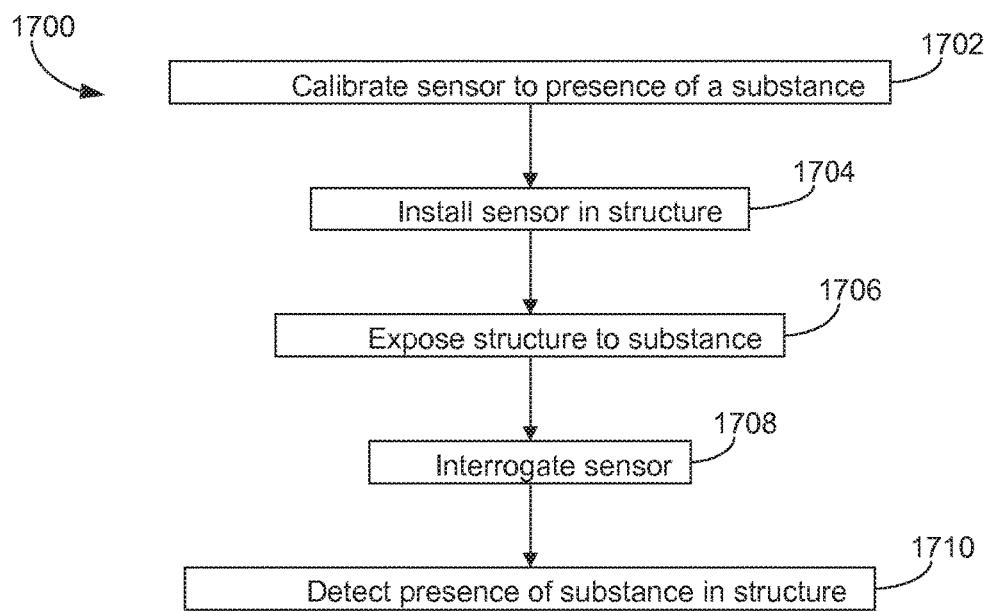
FIG. 17 illustrates, in flow diagram form, the sequencing of the operations m detecting the presence of a contaminant using, e.g., the antenna of in the system shown in FIG. 11.

Shown in FIG. 17 is one possible flow for a sensing system 1500 using the antenna 114. As has been explained above with reference to FIG. 14, operations 1700 begins with the sensor being first calibrated (step 1702 to detect the presence of varying levels of a particular substance. For the purposes of this discussion, we mean the term substance to mean any physical material, whether liquid, particulate or solid, that is: detectable by the sensor; and to which the sensor demonstrably responds. By detectable, we mean that, with respect to the resonant frequency of the antenna in the absence of the substance, the presence of the substance in at least some non-trivial amount results in a shift in the resonant frequency of the antenna, thereby resulting in a concomitant adjustment in the value stored in the shift register 1302; and by demonstrably responds we mean that the value stored in the shift register 1302 varies as a function of the level the substance relative to the tip of the tail 1506 of the antenna 1700. Once calibrated, the sensor can be installed in a structure (step 1704), wherein the structure can be open, closed or any condition in between. The structure can then be exposed to the substance (step 1706), wherein the means of exposure can be any form appropriate for both the structure and the substance, e.g., sprayed in aerosol, foam or dust form, immersed in whole or in part in a liquid, or other known forms. Following a period of time deemed appropriate for the form of exposure, the sensor is interrogated (step 1708) and the then-current value stored in the shift register 1302 retrieved. By correlating this value with the table of calibration data gathered in step 1702, the presence or absence of the substance can be detected (step 1710).

In one embodiment, the table of calibration data can be stored in the sensor and selectively provided to the reader during interrogation to retrieve the current value. Alternatively, the table can be stored in, e.g., the reader and selectively accessed once the current value has been retrieved. As will be clear, other embodiments are possible, including storing the table in a separate computing facility adapted to selectively perform the detection lookup when a new current value has been retrieved.

Figure 18:
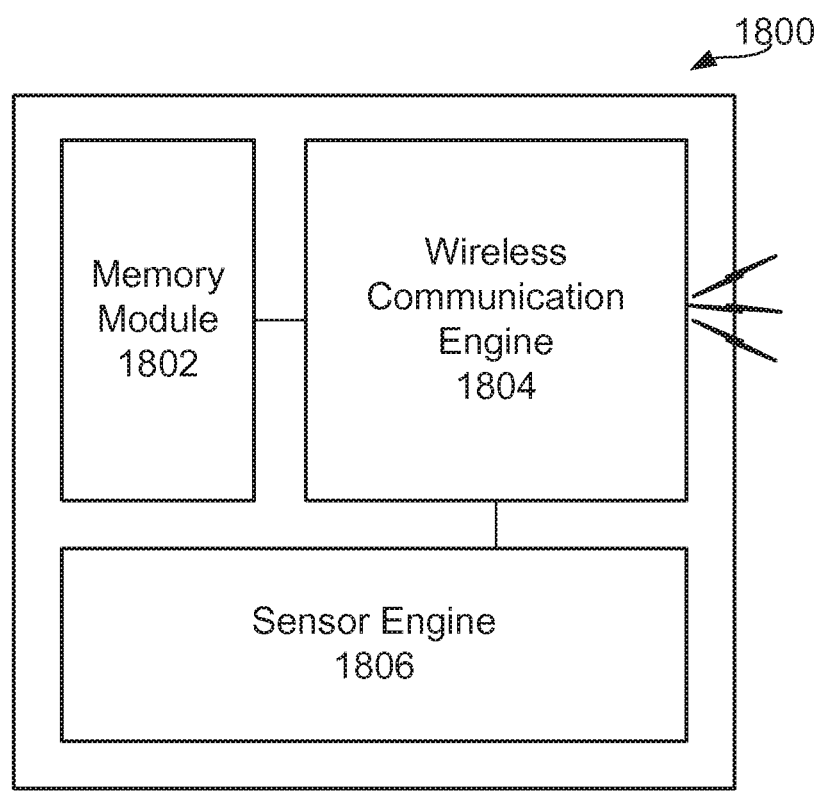
FIG. 18 is a block diagram of a RFID wireless solution provided by embodiments of the present disclosure.

FIG. 18 is a block diagram of a RFID wireless solution provided by embodiments of the present disclosure. Integrated circuit (IC) 1800 comprises a memory module 1802, a wireless communication engine 1804, and a sensor engine 1806 which includes an antenna 1808. IC 1800 is capable of sensing a change in the environmental perimeters proximate to IC 1800 via impedance changes associated with antenna 1808. In other embodiments, a proximity sensor may be employed to determine the proximity of IC 1800 to a given location or RFID reader by tuning the antenna 1808 and an associated tunable impedance. Memory module 1802 is coupled with both the wireless communication engine 1804 and sensor engine 1806. Memory module 1802 is capable of storing information and data gathered by sensor engine 1806 and communicated via wireless communication engine 1804. Further, wireless communication engine 1804 and sensor engine 1806 may be fully programmable via wireless methods. Passive RFID sensors of FIG. 18 may be deployed as an array of smart sensors or agents to collect data that may be sent back to a central processing unit.

Figure 19:
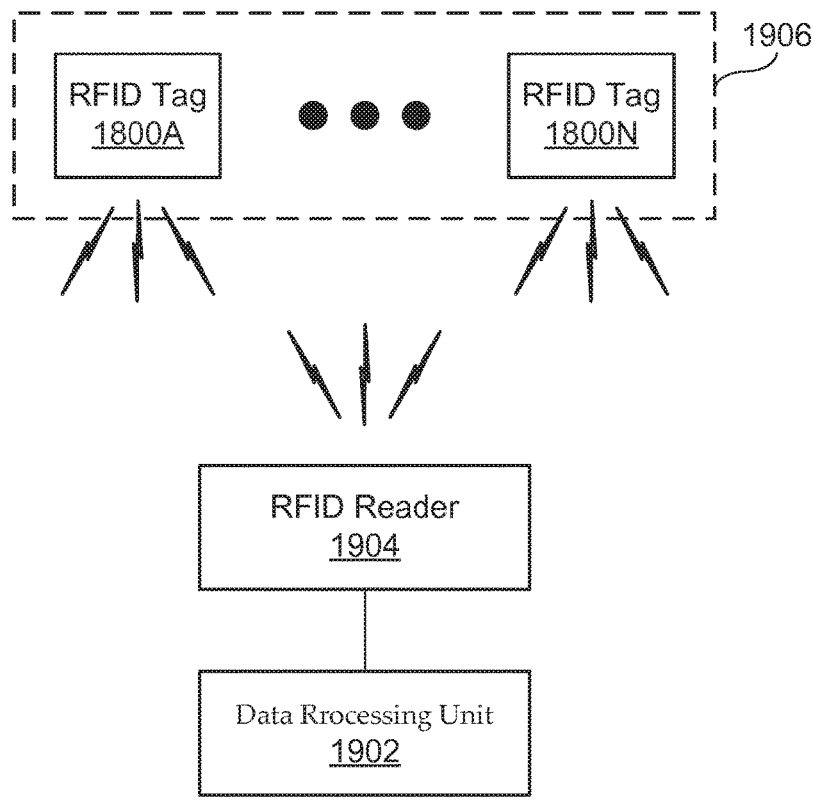
FIG. 19 is a block diagram of one arrangement of smart sensors and a data processing unit 1902 in accordance with embodiments of the present disclosure.

FIG. 19 is a block diagram of one arrangement of smart sensors and a data processing unit 1902 in accordance with embodiments of the present disclosure. Here a series of passive RFID sensors 1800A-N are deployed wherein each sensor may have a unique identification number stored within the memory module and communicated via the internal wireless communications engine 1804 to a data processing unit. Interrogator (RFID reader) 1904 interacts with passive RFID sensors 1800A-N. Interrogator 1904 may then communicate with a data processing unit 1902. Thus, the passive RFID sensor array 1906 may allow information to be sensed and communicated via RFID reader 1904, wherein this information may be pre-processed at the passive RFID sensor, or remotely processed at the RFID reader 1904 or data processing unit 1902 depending on the system needs.

Embodiments of the present disclosure realize an advantage over prior systems, in that not all sensing requires high precision sensors which are both expensive and consume relatively large amounts of power. The sensors provided by embodiments of the present disclosure are relative measurements and post processing of collected measurements yields sense information. Calibration may be done during manufacturing at the wafer or die level or when the assembled sensors are deployed in the field wherein this calibration information may be stored in the memory module 1802. This information may be retrieved at any time for baseline calculations. From relative changes accurate information may then be derived from remote data processing provided by data processing unit 1902. Calibration may involve retrieving sensing measurements from memory module 1802 or current measurements directly form sensor engine 1806. The use of this information then allows accurate data associated with environmental conditions to be determined. In one example, RFID sensor array 1906 of FIG. 19 may include temperature sensors. Wherein each passive RFID sensor 1800A-N is an independent sensor and may sense a current condition at time zero that is stored to memory module 1802 or sent to data processing unit 1902. This measurement may be repeated at Time 1. Wherein this data is either stored or transmitted. Data processing unit 1902 may perform more complex calculations. For example, if the temperature is known at Time 0, the sensor information collected at Time 1, when communicated may be processed using information associated with the measurements and known temperature at Time 0 in order to determine or approximate an actual temperature. This may involve a lookup in a characterized data table or computations based on mathematical models of the calibration of the sensors to determine or approximate the actual temperature.

Another embodiment can sense the level of wetness or humidity proximate to the sensor engine. In either case, temperature or moisture, raw data may be collected from passive RFID sensors via the RFID reader for processing to be performed by data processing unit 1902 where the computation to determine a humidity or temperature measurement.

Figure 20:
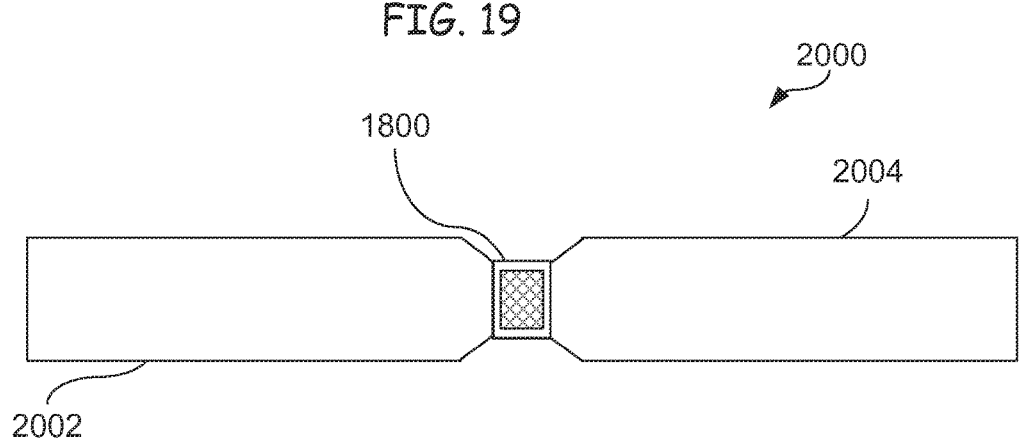
FIG. 20 provides an illustration of an antenna arrangement in accordance with embodiments of the present disclosure.

FIG. 20 provides an illustration of an antenna arrangement in accordance with embodiments of the present disclosure. In this antenna arrangement 2000 the antenna comprises a first antenna wing 2002 and a second antenna wing 2004 coupled to IC 1800 via connections 2006. IC 1800 may optimize the impedance match between the IC 1800 and antenna 2000. This can be accomplished by adding shunt capacitors, variable inductors or variable impedances across the input terminals of IC 1800. As a result, the input impedance of integrated circuit can be varied between in one embodiment can be varied between 2.4 minus J 67.6 to 0.92 minus J 41.5 ohms. An antenna such as that provided in FIG. 20 may be designed to operate within these impedance values.

In one embodiment this may provide an RF sensitivity of approximately—10.5 DbM. The antenna provided in FIG. 20 may be optimized to provide a conjugate match in one embodiment at about 960 megahertz. This allows the integrated circuit to optimize and match by selecting the best self-tuning value over the remaining portion of the frequency band. The operational bandwidth is proportional to the RFID tag thickness.

Figure 21:
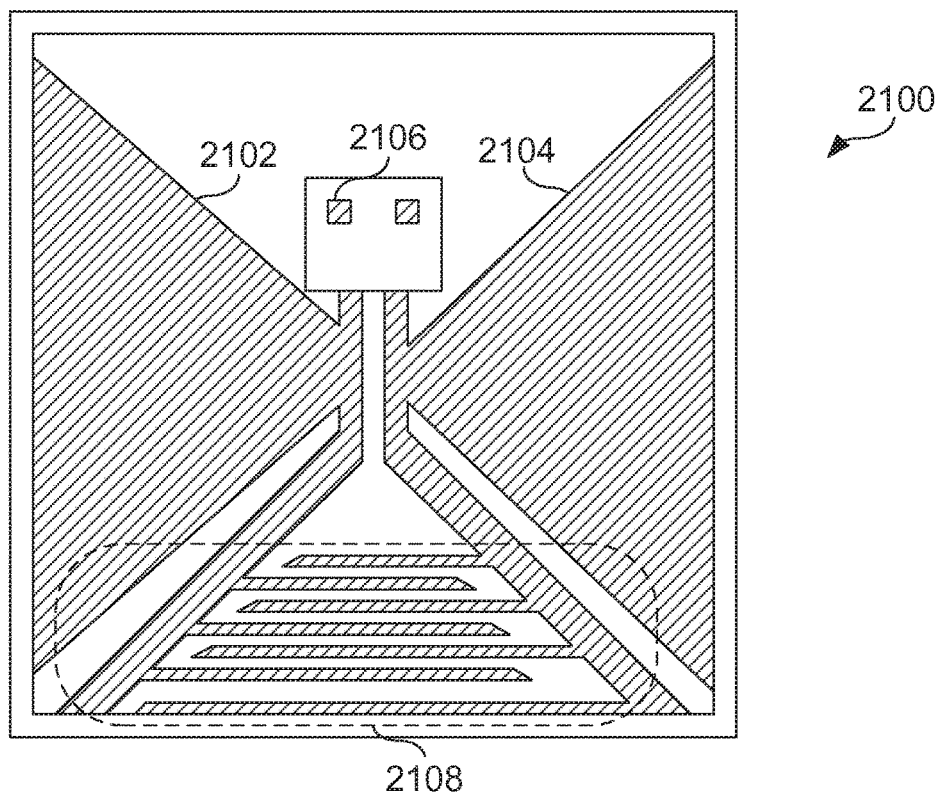
FIG. 21 provides an illustration of an antenna arrangement in accordance with embodiments of the present disclosure.

FIG. 21 provides an illustration of an antenna arrangement in accordance with embodiments of the present disclosure. In this antenna arrangement 2100 the antenna comprises a first antenna wing 2102 and a second antenna wing 2104 coupled to IC 1800 via connections 2106. IC 1800 may optimize the impedance match between the IC 1800 and antenna 2100. First antenna wing 2102 and second antenna wing 2104 can have interdigitated portions 2108, wherein the coupling of these interdigitated portions 2108 varies with dielectric changes in the gap 2110 between the interdigitated portions 2108. This can be accomplished by adding variable impedances across the input terminals of IC 1800.

Figure 22B:
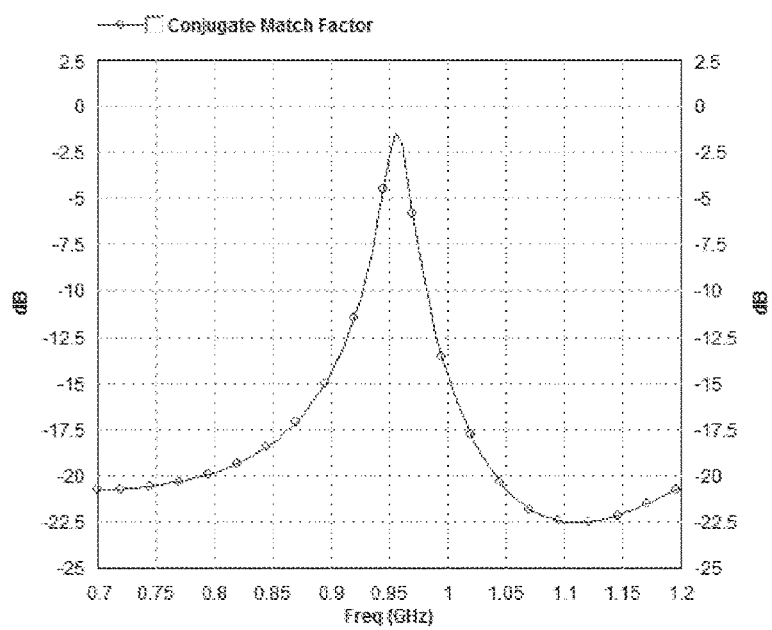
FIGS. 22A and 22B are graphs of the conjugate match factor (CMF) where the passive RFID sensor tags have a thickness of 0.03 and 0.05 inches thick tags with a quantized value of 0 in accordance with another embodiment of the present disclosure.
Figure 22A:
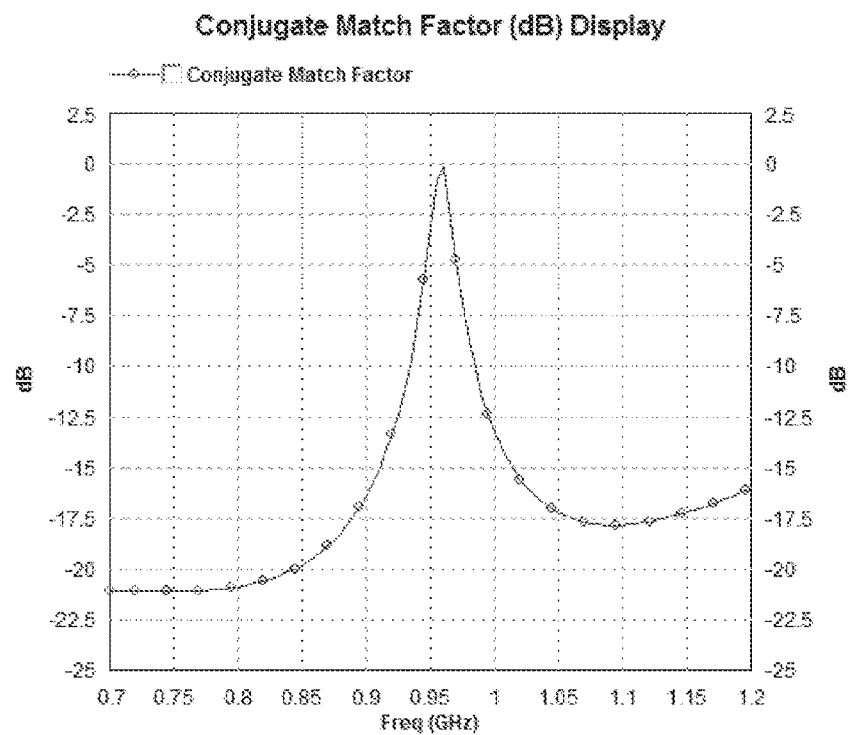
Figure 23A:
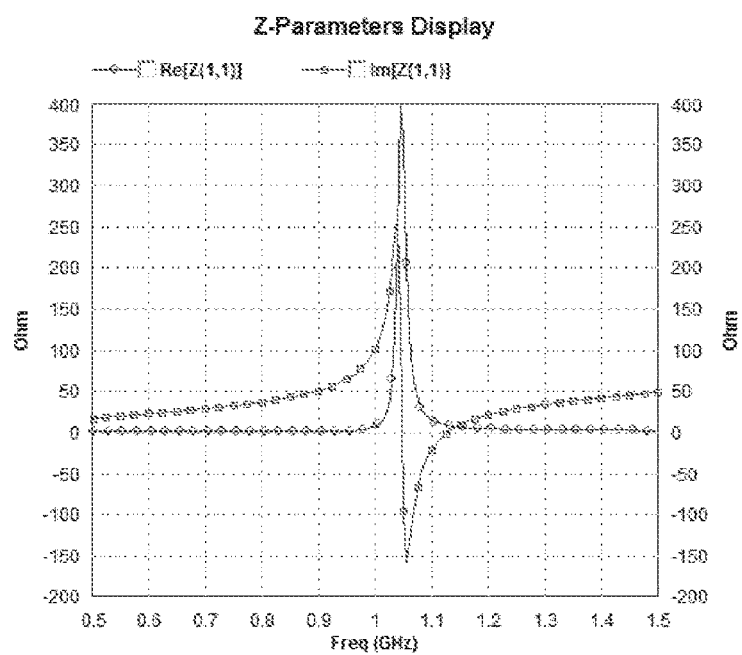
FIGS. 23A and 23B provide graphs of the antenna impedance for the previously depicted antenna of FIG. 20 in accordance with another embodiment of the present disclosure.
Figure 23B:
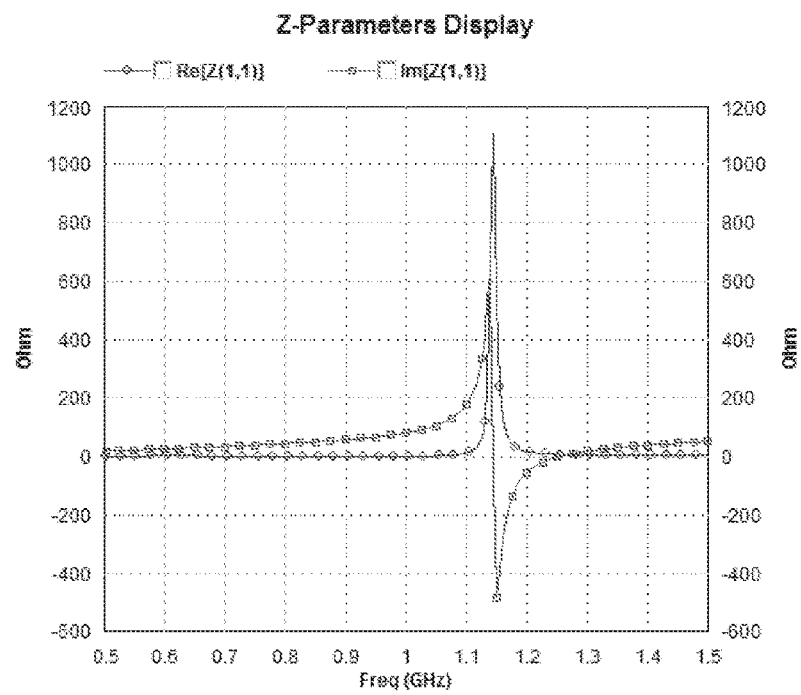
Figure 24A:
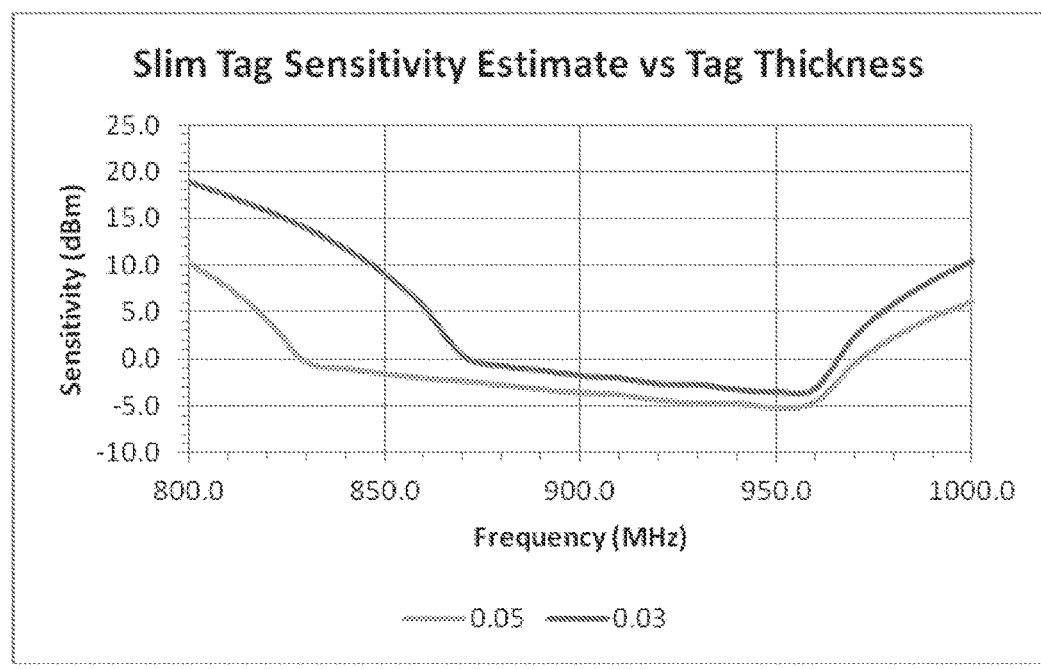
FIGS. 24A and 24B provide sensitivity graphs for varying thicknesses associated with the antenna's impendence, directivity, and radiation efficiency values are used to predict the RF sensitivity and read range of the RFID tag in accordance with embodiments of the present disclosure.
Figure 24B:
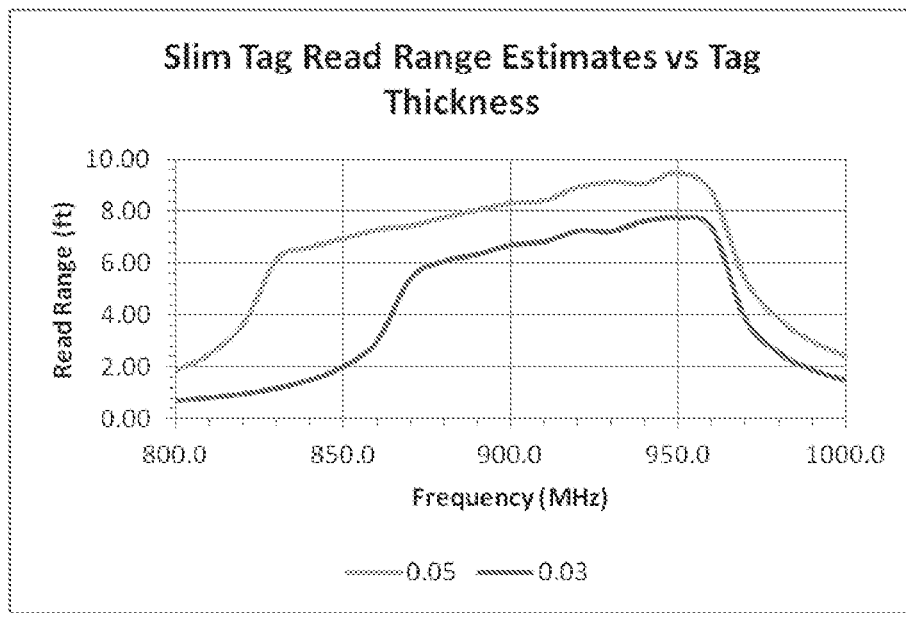

FIGS. 22A and 22B are graphs of the conjugate match factor (CMF) where the passive RFID sensor tags have a thickness of 0.03 and 0.05 inches thick tags with a self-tuning value of 0. FIGS. 23A and 23B provide a graph of the antenna impedance for the previously depicted antenna of FIG. 20. The rate of change in the impedance data for the thicker version is shown to be less than the rate of change in the impedance for the thinner version. This equates to a larger operation bandwidth. FIGS. 24A and 24B provide sensitivity graphs for varying thicknesses associated with the antenna's impendence, directivity, and radiation efficiency values are used to predict the RF sensitivity and read range of the RFID tag.

The antennas provided by embodiments of the present disclosure may be fabricated in one embodiment using flex PCB materials. Electrical connections between the bumps of the integrated circuit and the antenna allow the antenna and integrated circuit to be electrically coupled.

Figure 25:
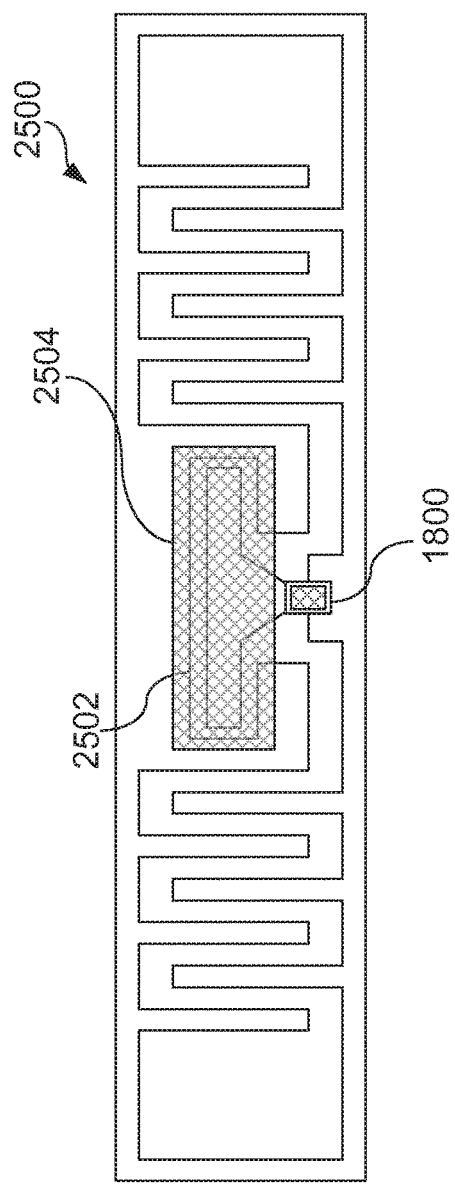
FIGS. 25 and 26 are views of an RFID pressure sensing tag in accordance with an embodiment of the present disclosure.
Figure 26:
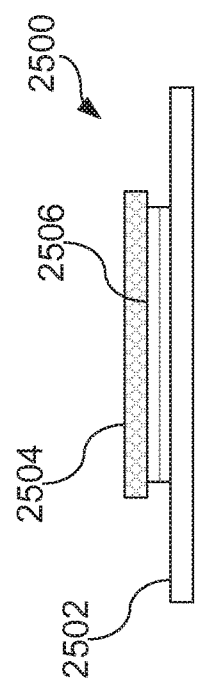

FIGS. 25 and 26 are views of an RFID pressure sensing tag 2500 in accordance with an embodiment of the present disclosure. Pressure sensing tag 2500 is a passive RFID tag, which includes a sensor, the sensor having a variable sensor impedance, and IC 1800. The sensor impedance varies. In one embodiment conductive plate 2504 is located proximate to a tuning circuit 2502. When an external pressure is applied to the conductive plate, the separation between conductive plate 2504 and tuning loop 2502 is reduced causing an impedance change. The impedance of the tuning circuit in the processing module coupled to the sensor then produces an output, a sensor code, representative of the pressure applied. This data may be stored within a memory circuit of IC 1800 or transmitted to an external reader by the wireless communication module of IC 1800.

Conductive plate 2504 may sit on a compressible material space 2506 as shown in the cross section of FIG. 26. The presence and relative movement of conductive plate 2504 reduces the inductance of the tuning loop 2502. This causes the tuning module of IC 1800 to generate different sensor codes to compensate for the impedance change. In one embodiment, compressible material space 2506 has a substantially linear compression between 25 and 50% compression.

Figure 27:
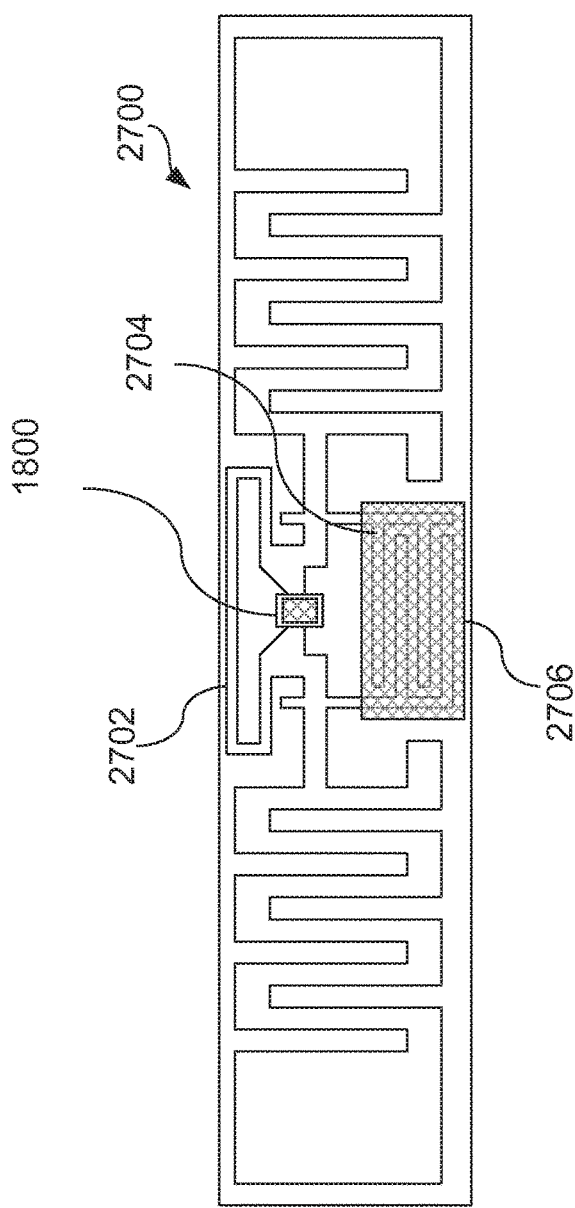
FIG. 27 is a view of an RFID moisture or humidity sensing tag in accordance with an embodiment of the present disclosure.

FIG. 27 is a view of an RFID moisture or humidity sensing tag 2700 in accordance with an embodiment of the present disclosure. Moisture or humidity sensing 2700 is a passive RFID tag, which includes a sensor, the sensor having a variable sensor impedance, and IC 1800. The sensor impedance varies as the coupling of interdigitated capacitor 2704 responds to environmental changes. In one embodiment interdigitated capacitor 2704 is located proximate to a film 2706 applied above interdigitated capacitor 2704. Film 2706 may be a material having an affinity for water (i.e. moisture or humidity) or other fluids. These fluids may include $CO$, $CO_2$, Arsenic, $H_2S$ or other known toxins or gases of interest. When film 2706 absorbs a fluid such as those described previously, the dielectric constant proximate to the interdigitated capacitor 2704 changes causing an impedance change. The impedance of the interdigitated capacitor 2704 sensed by the processing module coupled to the sensor then produces an output, a sensor code, representative of the absorbed material within film 2706. This data may be stored within a memory circuit of IC 1800 or transmitted to an external reader by the wireless communication module of IC 1800.

Figure 28:
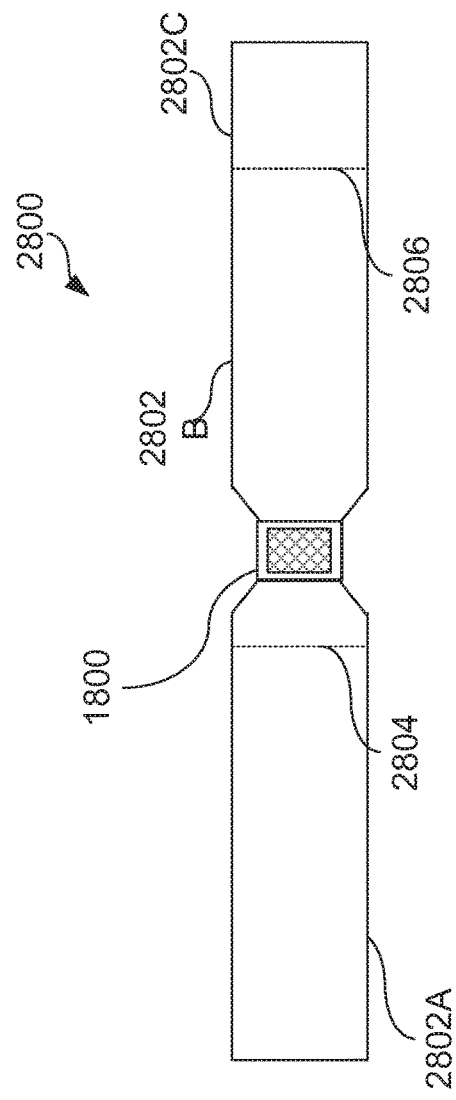
FIG. 28 is a view of a folded RFID tag comprising a radiating element in accordance with an embodiment of the present disclosure.

FIG. 28 is a view of a folded RFID tag 2800, including antenna 2802 comprising a radiating element, the radiating element comprising a first wing 2802A and a second wing, the second wing divided into a proximal section 2802B and a distal section 2802C, the distal section 2802C folded onto the proximal section 2802B, and the first wing 2802A folded onto the folded second wing, the distal section 2802C of the second wing capacitively couples to the proximal section 2802B and the first wing 2802A. These sections are folded about a PCB core.

Figure 29A:
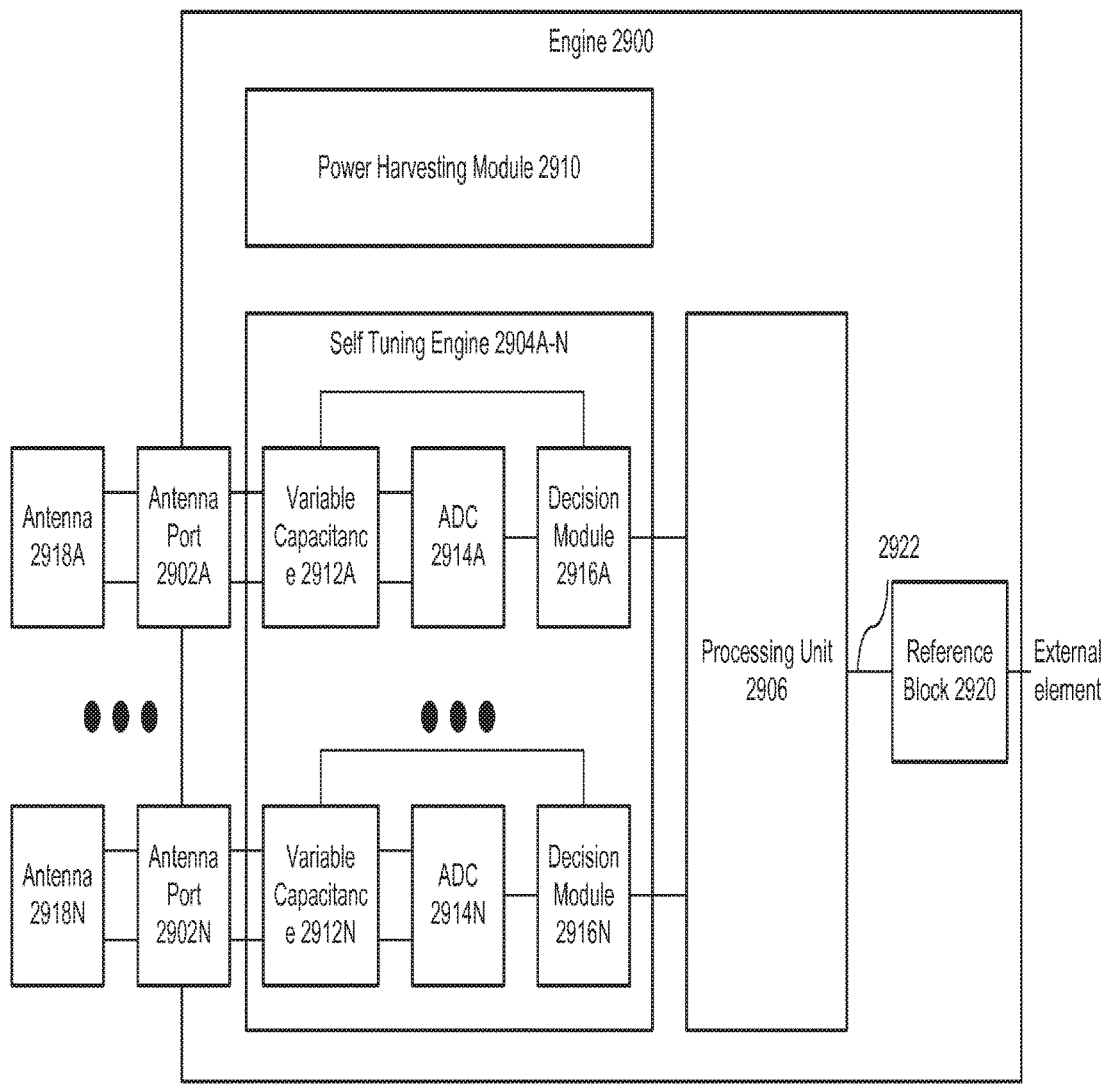
FIG. 29A and FIG. 29B are block diagrams of arrangements of a self-tuning engine to support the reporting of several stimuli with multiple passive RFID sensors using an antenna impedance sensing mechanism in accordance with embodiments of the present disclosure.
Figure 29B:
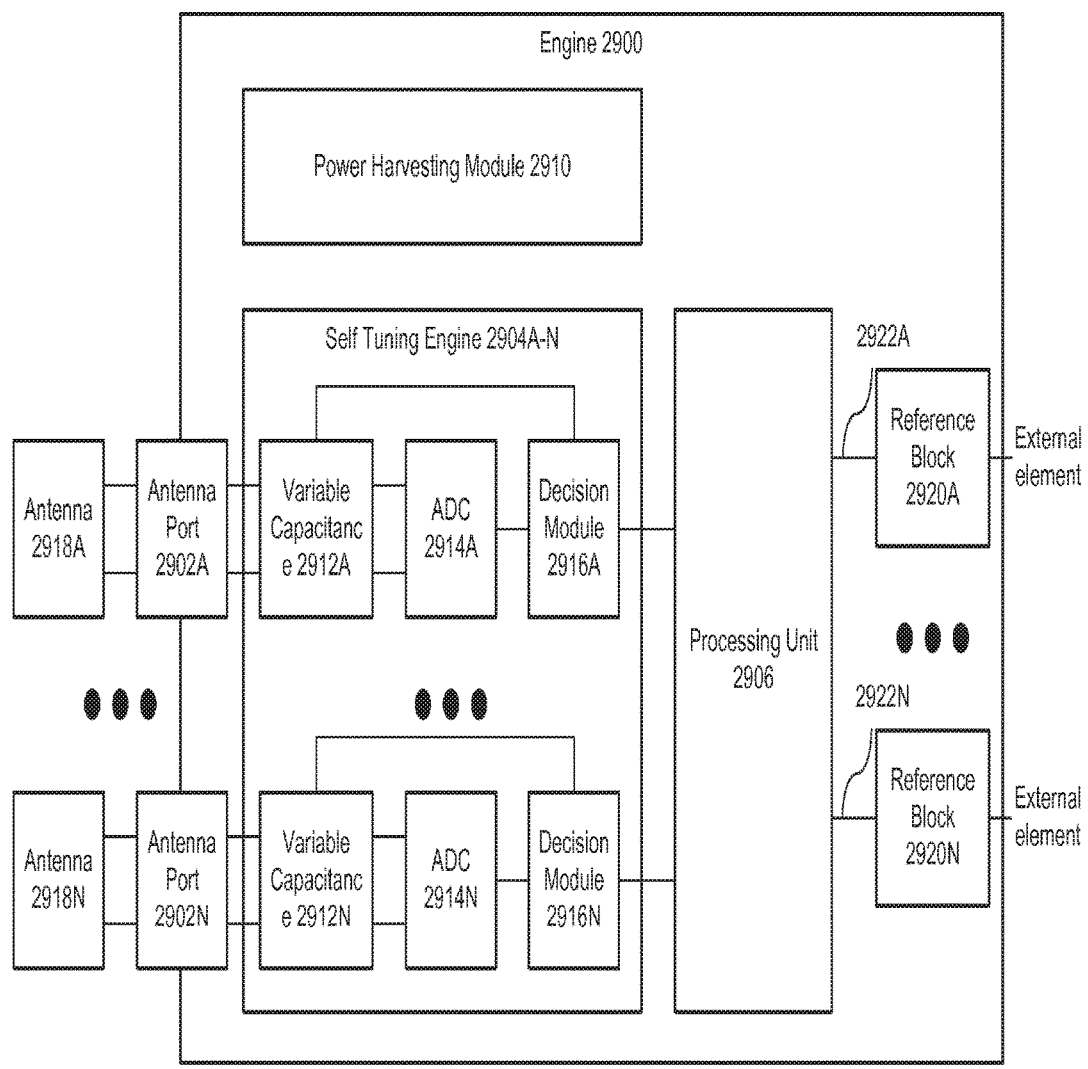

FIGS. 29A and 29B are block diagrams of arrangements of a self-tuning engine to support the reporting of several stimuli with multiple passive RFID sensors using an antenna impedance sensing mechanism in accordance with embodiments of the present disclosure. Module 2900 includes antenna ports 2902A-N, self-tuning engines 2904A-N, processing unit 2906, reference input module 2908 and power harvesting module 2910. A number of antenna ports 2902A-N passively sense stimuli through changing antenna inductance as previously discussed. The self-tuning engines 2904A-N adjusts a variable capacitance 2912A-N in response to the inductance sensed as ADC 2914A-N wherein decision module 2916A-N directs feedback to adjust the value of variable capacitance 2912A-N and produce a code reported to processing unit 2906. This sensor code reflects the sensed stimuli relative to the antenna inductor 2918A-N. The stimuli sensed may be any combination of stimuli sensed by the changing inductance of the antenna (i.e. pressure, moisture, proximity etc.) Processing unit 2906 is coupled to the self-tuning engines 2904A-N and other potential reference inputs such as those provided by reference block 2920. Reference block 2920 allows the processing unit to compensate for external elements sensitive to external stimulus with an input to processing unit 2906. One such example may be where an external element is sensitive to a condition such as temperature, in this example reference block 2920 provides a reference signal 2922 for the processing unit 2906. The block as a whole may be powered by a power harvesting engine 2910 to supply on-chip power needs.

Embodiments of the present disclosure encompass the ability for the passive RFID tag to (or based on the data supplied by the RFID tag) to make decisions based on multiple sensory inputs. Implemented in an on-chip analog signal processing circuit, single self-tuning engine 2904A-N automatically adjusts the input impedance to optimally tune the RFID tag every time it is accessed.

RFID tags based on conventional chips can be detuned by a variety of external factors, most commonly by proximity to liquids or metals. Such factors can change the impedance characteristics of a tag's antenna. When the RFID tag chip has a fixed impedance, a mismatch between the chip and the antenna results, reducing the RFID tag's performance. Self-tuning engine 2904A-N maintains the chip-antenna match as conditions change, resulting in more consistent RFID tag performance.

Reference signal 2922 is basically a reference voltage that is generated by an external sensing mechanism. In combination with one or more of the single self-tuning engine 2904A-N, various decisions (e.g. co-dependent decisions) and sensing can be made based on various parameters collected from these multiple ports. A device can be interfaced to provide reference signal 2922. Examples of such devices include an accurate resistor (e.g. 1% resistor) between used to calibrate the various circuitry or sensors. The 1% resistor value can be digitized to calibrate temperature or pressure measurement. Other examples include: A photodiode to sense light; A pin diode; A remote temperature sensor; An LED (Light Emitting Diode); An infrared (I/R) sensor; and Basic I/O, ADC, DAC to input/output data from/to the sensor chip It may be desired to eliminate process variations or temperature variations from a sensing measurement (e.g. gas sensing application).

Figure 29C:
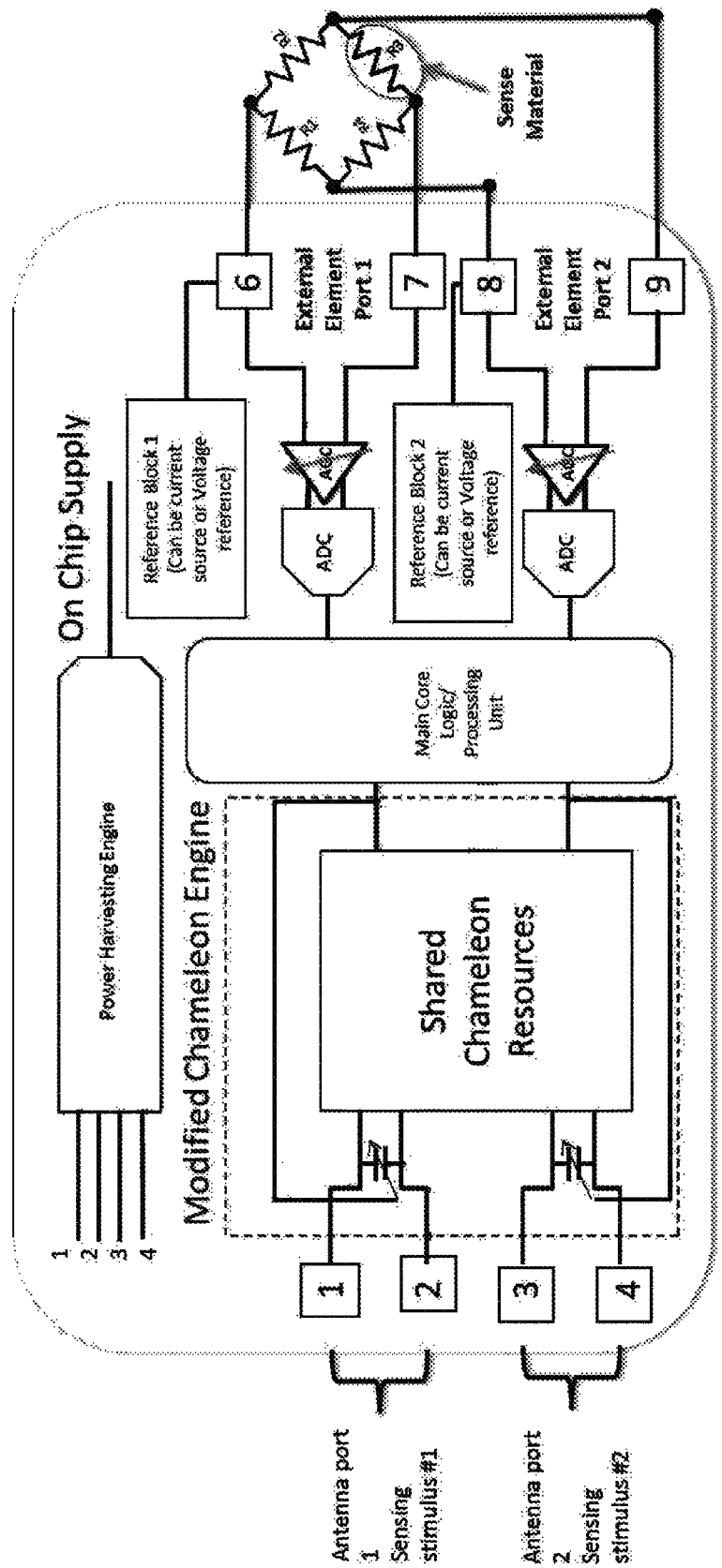
FIG. 29C is a schematic block diagram of an embodiment of a wireless sensor in accordance with the present disclosure.

FIG. 29B illustrates yet another embodiment with two external sensing ports providing reference signals 2922A and 2922N. In one embodiment, a Wheatstone Bridge (as shown in FIG. 29C) may be coupled to the external ports receiving reference signals 2922A and 2922N. A Wheatstone Bridge is a well-known electrical circuit that can be used to measure a variation in a resistance independent of any variations except for a controlled induced variation influencing one resistor of the bridge via, for example a sense material applied on top of the resistor. If a current, for example, is applied to the Wheatstone Bridge through one reference signal, a balanced Wheatstone Bridge would yield no net current from the second reference signal in absence of any disturbance on variation influencing one resistor. Other environmental factors that affect all four resistors would have no effect on the potential. The slightest of disturbances that affect the resistance of variation sensing leg of the Wheatstone Bridge would result in change in the second reference signal and thus the ability to sense such a change via the RFID tag/sensor of the disclosure. As discussed in various parts of this disclosure, the sense material can cause a change in resistance due to an environmental variable that is to be sensed and thus would affect the variation sensing leg differently than its effect on the rest of the resistors. All other environmental variables would affect the four balanced resistors equally and as such would be calibrated out and would not be sensed isolating the effect to the environmental variable affecting the variation sensing leg via the applied sense material.

One of the differences of sensing using an antenna port vs. an external element port is the fact that the sensing via the antenna port uses AC power generated by the application of a CW (continuous wave). The sensing on an external element port uses DC power that is generated via the power harvesting engine (using one or more charge pumps) as explained below. Given the fact that a charge pump efficiency of about 20% results in approximately five times increase in power consumption by sensing using the external element port vs. the antenna port (sensing using high frequency rather than DC).

Power harvesting engine 2910 generates DC power using one or more charge pumps. The charge pump is included in for example regulator 308 of FIG. 3, regulator 402 of FIG. 4, regulator 308 of FIG. 8, regulator 3616 of FIG. 36 and regulator 3616 of FIG. 38. Given the fact that a charge pump efficiency can greatly vary. The efficiency of a charge pump equals power delivered to its output (i.e. to the rest of the circuit it is to provide a supply voltage and current) divided by power consumed at its input. A charge pump, as known in the art, is continuously switching and whose voltage waveforms vary with time, so in general, efficiency can be measured as the ratio of the average power at input and output, as opposed to the ratio of instantaneous powers. A simple low efficiency charge pump can be designed to have a very quick startup time but will result in a great loss of power and thus be unable to operate a large amount of circuitry or sustain the operation of a circuit over a longer period of time compared to a higher efficiency charge pump. On the other hand, a higher efficiency charge pump in general will take a longer period of time to startup, but will be able to operate more circuitry given the same input power and would be able to sustain operation over a longer period of time that its low efficiency counterpart.

In order to achieve quick startup and efficient operation, a set of charge pumps may be used having different efficiencies. A first charge pump may be used to initially energize the RFID sensor. Once essential circuitry is operational, additional more efficient charge pumps may be used to energize the sensor and the remaining circuitry. This allows for a shorter time requirement to initialize the RFID sensor. Longer term operation of the RFID sensor may then be switched to the more efficient charge pump.

The charge pump(s) harvest power from only one of the ports 2902A-N and then supplies DC power to the rest of the circuitry. Another embodiment includes the use of two or more charge pumps one corresponding to an individual port and then combining the currents from both in order to produce the DC supply voltage for the RFID Sensor. In yet another embodiment, two charge pumps can be used for a single self-tuning engine 2904A-N regardless of whether the RFID tag a single or multiple single self-tuning engine 2904A-N/Sensing antenna 2918 arrangements.

Two or more charge pumps may be coupled to an individual antenna. One charge pump to turn on the single self-tuning engine 2904A-N quickly, and is thus optimized for low turn-on power which sacrifices efficiency. The second charge pump has a higher turn on power threshold but has a much higher efficiency. Both charge pumps may operate in parallel but results in a much faster turn-on time for the RFID tag.

Once sufficient stable power is available, power harvesting engine 2910 will produce a PowerOK signal to initiate system as seen in FIG. 9 and FIG. 36. A variable resistor can be provided in parallel with an inductor, so as to automatically vary this resistance to control the gain of the tank circuit within the power harvesting engine 2910.

The operation of the self-tuning engine in response to the PowerOK signal is illustrated in the description of FIG. 36, FIG. 37 and FIG. 38.

Another aspect of this disclosure is extending a mode that would allow for self-operation without the need for a reader but only a continuous wave (CW) source for power. In this self-operation mode, sensor values could be self-written in a user defined circular buffer in the memory (or other types of memories).

This mode would be entered with a header length in excess of specified period of time. For a typical transaction, the part would power up in the typical ready state to accept commands from a reader and respond like a traditional tag. Once a sufficient amount of time had passed and a command was not received, the part would enter into the self-operation mode of data logging. Some control and status registers could be preset by the user to configure this mode that could include:

a. data buffer size (1-x words in user bank)
b. data buffer pointer I index c. Sensor to log (Self-tuning engine and/or Temp)
d. Max/Min threshold value
e. Max/Min Threshold exceeded count Every time the RFID sensor entered this logging mode the RFID sensor would measure/log the data, auto increment the pointer/index to the next word in the buffer and then hold in an idle state. If thresholds were employed, a count could simply be maintained for any measurements over/under the threshold. This is useful in applications like cold chain management of produce or pharmaceuticals where the customer only cares if a perishable product has fallen outside of a specified temperature window.

The primary benefit of this self-operation mode would be the low cost CW sources that could be utilized instead of full reader to create a wireless logging system. The CW source would essentially just be tied to a timer that would control when and how long it was turned on. The timer on the CW source would set the data logging interval with one sample taken every time the CW source was turned on.

The CW sources would be used throughout the system to maintain data collection operation for the RFID tags and then readers would only be needed at the endpoints of the system to gather the data logged. For a cold chain application, the low cost CW sources could be placed in the refrigeration trucks or warehouses and then the customer would verify the product condition with a reader when it arrived at market. This is an economically viable idea since the infrastructure required to simply generate CW source would be much less than implementing a full functionality reader and communication capabilities.

Yet another aspect of this disclosure is the IC harvesting power from a CW source that is a different bandwidth than the UHF bandwidth for RFID readers in the United States (902-928 MHz). But rather using a 2nd Self-tuning engine engine/antenna/sensor port in that is tuned for other frequency bands such as an ISM band source.

Another aspect of this disclosure is the integration of an antenna, self-tuning engine and processing circuitry as part of a silicon wafer or a large IC (e.g. Microprocessor die, FPGA die). Such integration would enable a variety of applications that are currently not possible without powering an IC (e.g. Micro-processor or FPGA). For example, the ability to embed a serial number on in a Magnus register and to use an RFID reader to inventory the ICs. Such devices are very expensive and valuable and the ability to inventory each IC individually would provide great economic benefit such as saving time, fraud control and inventory control.

Additionally, having the sensor functionality can alert manufacturers, vendors, distributors and customers pre-production, post-production, pre-shipping, post-shipping and in the field to any exposure to environmental variables that are critical to the economic value and operation of the IC. Such harmful exposure is moisture, for example. Any of the sensory applications mentioned earlier in this application is possible.

Additionally, even during operation of such devices, the temperature gradient across a large die could be checked using RFID readers using a single integrated device with a tail antenna structure or multiple integrated devices.

Additional sensory applications are the detection of exposure to gases such as Oxygen for example. The locations of embodiments of the present disclosure do not have to be part of the IC design process but rather as part of the scribe area.

In another embodiment, the embodiment of the present disclosure is included on the IC masks as part of the post-tape out processing before mask making operations. The IC might include a reserved location and area where a particular clearance is defined as part of the design rules and the embodiments of the present disclosure are placed as part of a higher level processing after tape out and before mask generation. This is possible because of the fact that embodiments of the present disclosure require no external connections.

Figure 30:
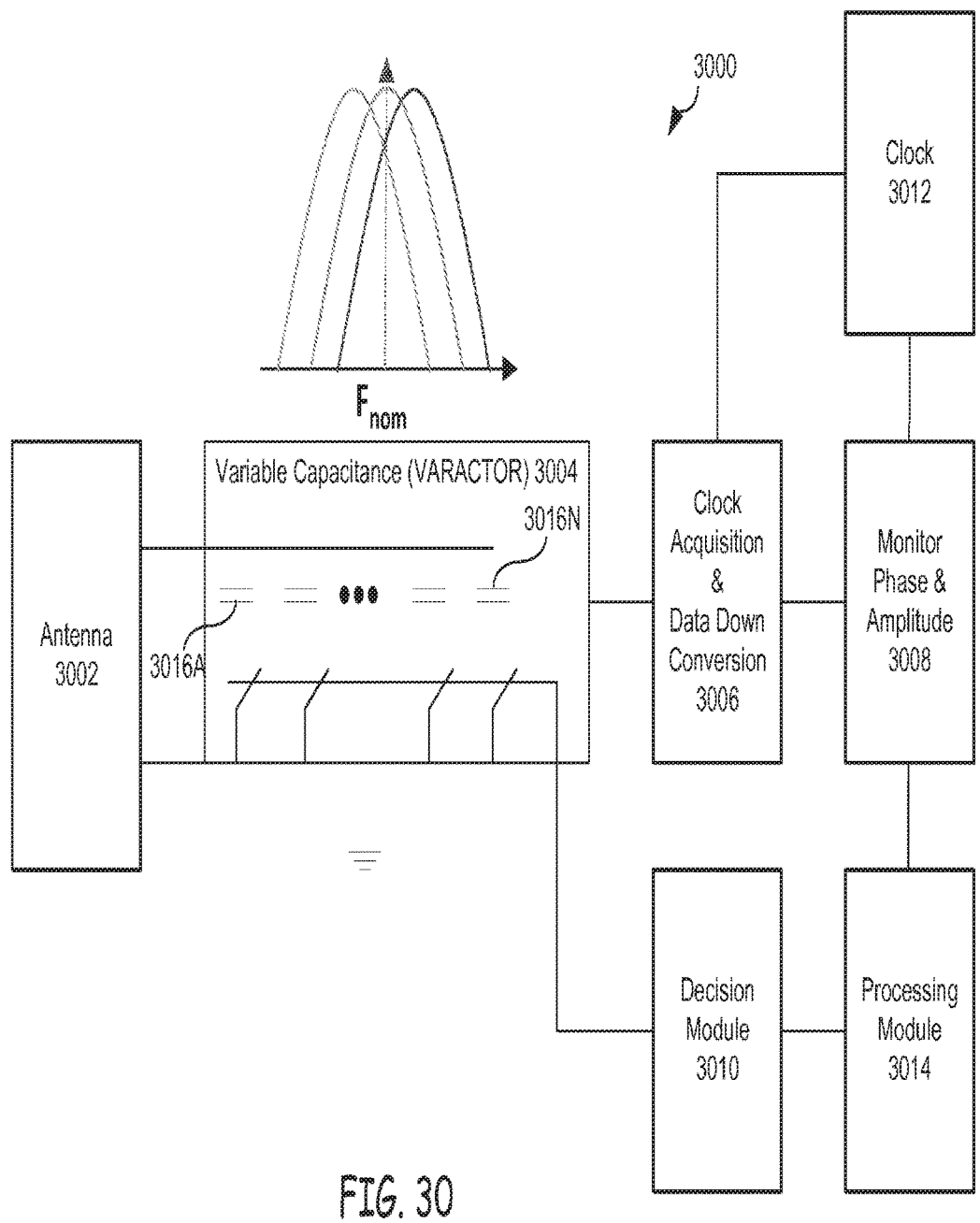
FIG. 30 is a block diagram of a self-tuning engine in accordance with embodiments of the present disclosure.

FIG. 30 is a block diagram of a self-tuning engine in accordance with embodiments of the present disclosure. Self-tuning engine 3000 includes an antenna 3002, a variable capacitance or varactor module 3004, a clock acquisition and data conversion module 3006, a monitoring module 3008, a decision module 3010, processing module 3014, and a clock module 3012.

Varactors are basically voltage-controlled capacitors. Varactors are implemented in various forms, for example as discrete components, in integrated circuits, in MEMS (micro-electro-mechanical systems). Varactors are widely used in RF circuits as tuning elements.

Figure 32:
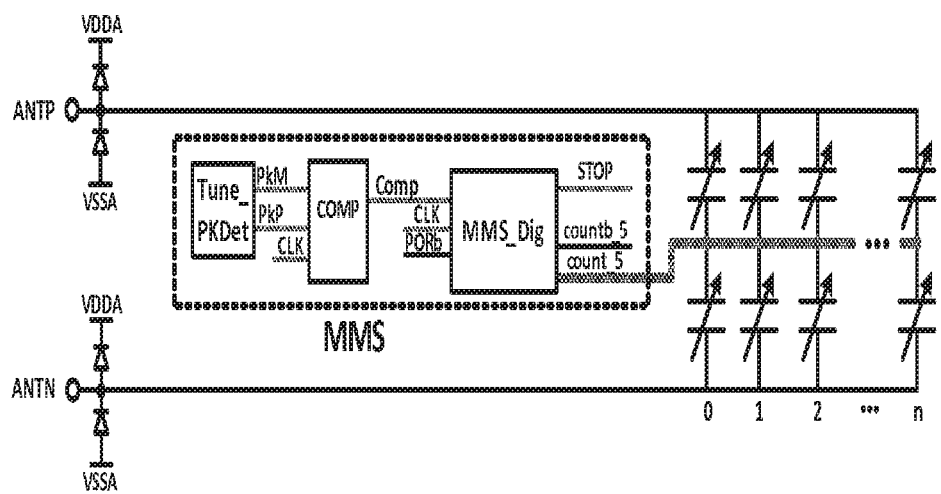
FIG. 32 illustrates an embodiment of the self-tuning engine provided by embodiments of the present disclosure along with the varactors that are driven by the self-tuning circuitry (also referred to as MIMS engine in this disclosure)
Figure 33:
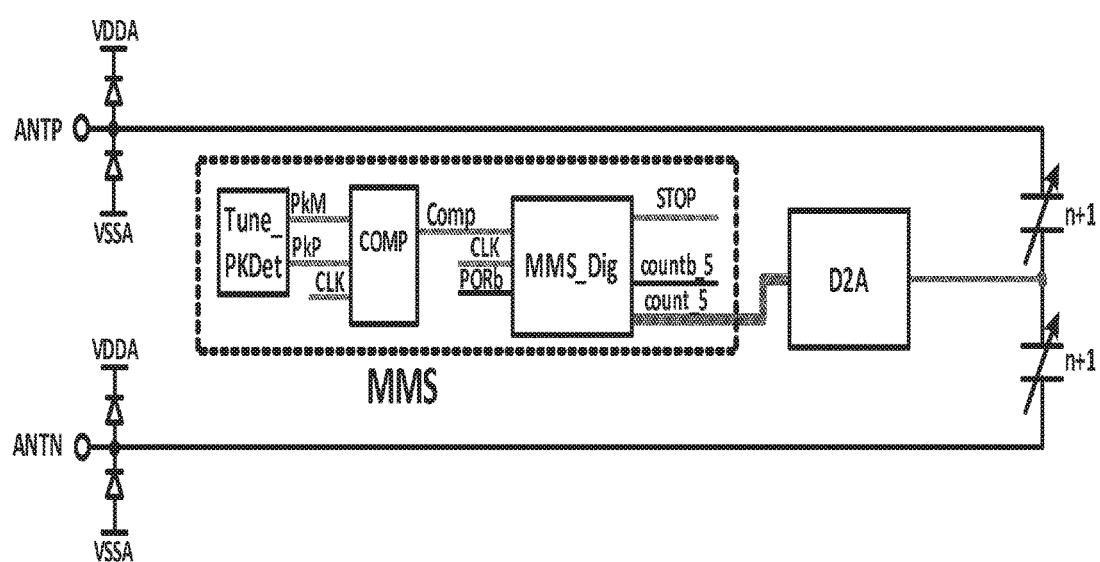
FIG. 33 illustrates another embodiment of the self-tuning engine provided by embodiments of the present disclosure along with the varactors that are driven by the tuning circuitry.

FIG. 32 illustrates an embodiment of the self-tuning engine provided by embodiments of the present disclosure along with the varactors that are driven by the tuning circuitry (referred to as self-tuning engine). The varactors in this embodiment are enhancement MOS varactors. In one embodiment, the engine generates 5 bits of sensor code (also referred to as MMS code) that are then converted to 16 bits (i.e. n=16) of thermometer codes. Each bit of the thermometer code drives one varactor unit. In this embodiment there are a total of 16 varactor units (each unit is a varactor on its own). Each code can be either VDDA (a high voltage) or VSSA (a low voltage signal). The antenna ports; ANTP and ANTN, are set at a voltage value of VDDA/2.0 under normal operation. Looking at this from the varactor perspective, the Gate of each of the 16 varactor units will always be at VDDA/2.0V with respect to Bulk, while the S/D, (Source/Drain), connection of each of the 16 varactor units will be set to VDDA or 0V with respect to Bulk, depending on the sensor code generated. Hence, each of the 16 varactor units will be set to either its min capacitance or max capacitance value. The total capacitance of the varactor structure is the sum of these minimax values. This implementation is referred to here as a digital implementation of an embodiment of the self-tuning engine provided by embodiments of the present disclosure.

One embodiment of the present disclosure uses non-equal capacitors in the self-tuning engine with no simple ratio metric relationship (e.g. integer multiple or ratio of integers) to implement dithering.

Another embodiment of the present disclosure is the combination of a counter and a 1-bit LF SR to achieve 3 pseudo pseudo-random bits that are random enough (reasonably uncorrelated).

Another embodiment of the present disclosure is the high resolution optimization, or system estimation, by averaging the path of a Hill Climbing algorithm in its terminal limit cycle after adding noise to the system perturbation.

Another embodiment of the present disclosure is inference of the precise optimization of a physical system by adding randomly selected elements to a coarsely variable physical parameter. For example, adding randomly selected capacitors to dither the capacitor value in a tank circuit as a means to precisely determine the inductance.

In an embodiment, the self-tuning Engine is effectively a Hill Climbing algorithm which we employ to find the setting of a 5-bit capacitor array which maximizes the received signal.

For system sensitivity purposes, the 5-bit capacitor array is all the "resolution" we need to achieve near optimal tuning of the antenna resonance.

For the tank circuit system, we know there are no (false) local maxima, so there is no need for stochastic search algorithms.

For sensing applications, however, to achieve higher resolution (ideally 10-bits or more) of the capacitance which exactly tunes the resonance in the presence of the variable inductance of the sensor structure. Achieving higher resolution with a higher resolution capacitor array is not desirable because a larger array would take more die area, degrade sensitivity due to added parasitics. Taking smaller steps in capacitance would "break" the Hill Climbing algorithm because the system response to the smaller capacitance step would be too small to overcome offsets in the analog differencing circuit that calculates when to change direction. Thus, one goal of dithering within embodiments of the present disclosure utilizes dithering to randomize the path taken by the Hill Climbing algorithm in such a way that averaging the 5-bit capacitor selections made by the algorithm will increase the resolution and accuracy of the calculated capacitor code. This allows dithering with coarse system perturbation to achieve high resolution System Estimation.

The self-tuning algorithm works by continuing to increase (or decrease) the capacitor code until the received signal stops increasing. When the system response to a change in capacitance is negative (less signal), the algorithm reverses direction and continues the search. Assuming a large initial mistuning, the algorithm takes multiple steps in the proper direction until it takes one step too far. From that point on, the algorithm falls into a limit cycle.

a. Imagine a case where the ideal code is 5. The self-tuning search algorithm will eventually fall into the following 3-level pattern: 5, 6, 5, 4, 5, 6, 5, 4, 5, 6, 5, 4, 5 . . . .

b. Now imagine a case where the ideal code is 5.5. The self-tuning search algorithm will eventually fall into a 4-level pattern which is more chaotic because there is no difference in system response between the 5 code and the 6 code, and hence the algorithm will sometimes change direction after a step from 5 to 6 (or 6 to 5) and sometimes not: 5, 6, 7, 6, 7, 6, 5, 4, 5, 4, 5, 6, 7, 6, 5 . . . .

Given the limit cycle behavior, running the algorithm for a fixed period of time and using the result does not work well. Doing so essentially "samples" the limit cycle process, resulting in a code that could be 1 code off (3-level limit cycle) or 1.5 codes off (4-level limit cycle). The original self-tuning engine averages the 5-bit capacitor codes for 24 trials to properly extract the centroid of the limit cycle. For systems with ideal capacitor settings near a whole code, for example 5.2, the resulting 3-level pattern will average exactly to the middle code of the pattern because the code happens to be of length 4. Even if one were to look at the LSBs of the averaging register there would be no additional information—the LSBs (below the 5-bit array code) will be identically 0 after 24 cycles. For systems with ideal capacitor settings near a code gap, for example 5.6, the LSBs of the averaging register will have useful information, in the presence of circuit noise, since the system is more likely to recognize a step from 5 to 6 as an increase in the system response than a step from 6 to 5. Therefore, the system will see more 6's and 7's than 4's and 5's in the limit cycle, and the average will be a little larger than 5.5.

Embodiments of the present disclosure use three mechanisms to achieve an effective self-tuning Dithering. First, probabilistically flipping the direction decision broadens the limit cycle to more codes by forcing bad direction decisions. Extreme direction excursions will be un-biased and will not correlate with the correct decision direction. Therefore, the noise added to the limit cycle will be zero mean and carry no information. Ultimately probabilistically flipping the direction decision will not test the system at points in between the 5-bit capacitor values.

A second mechanism adds noise at the input to the comparator. This broadens the limit cycle to more codes by forcing bad direction decisions. Extreme direction excursions will be biased and will correlate with the correct decision direction, thus influencing the average in the right direction. There is an optimal noise level—big enough to provide effective dithering, not so large as to require excessive averaging. The right amount of dither is directly dependent on system Q since the system response to a capacitor step is larger with higher Q. Ultimately does not test the system at points in between the 5-bit capacitor values.

A third mechanism provides for random switching of sub-LSB Capacitors. This mechanism broadens the limit cycle to more codes by forcing bad direction decisions. Extreme direction excursions are biased and correlate with the correct decision direction, thus influencing the average in the right direction. There is an optimal noise level (big enough to provide effective dithering, not so large that a lot of averaging is required). The right amount of dither is independent of system Q. Tests the system at points in between the 5-bit capacitor values.

Non-Equal dither capacitors of the variable capacitance array of FIG. 30 can provide more fine-grained system sampling than equal-weighted or binary weighted caps. To do so, each capacitor is either In or Out; what matters is the change in capacitance in a given step. For example, 3 Equal-weighted caps of value $\frac{1}{3}$ can therefore achieve values of: $-1, -\frac{2}{3}, -\frac{1}{3}, 0, +\frac{1}{3}, +\frac{2}{3}, +1$ (7 values in all); 3 Binary-weighted capacitors of $\frac{1}{8}, \frac{1}{4}, \frac{1}{2}$ can reach: $-\frac{7}{8}, -\frac{3}{4}, -\frac{5}{8}, -\frac{1}{2}, -\frac{3}{8}, -\frac{1}{4}, -\frac{1}{8}, 0, \frac{1}{8}, \frac{1}{4}, \frac{3}{8}, \frac{1}{2}, \frac{5}{8}, \frac{3}{4}, \frac{7}{8}$ (15 values in all); and 3 Capacitors of values 0.3, 0.45 and 0.7 can reach: 27 values from $-1.5$ to $+1.5$. This third choice results in smoother dither curves than an equal weighted or binary weighted set.

The 3 dither caps ideally require 3 independent pseudo-random sequences. A pseudo-random sequence of length $(2^N-1)$ can be generated very efficiently using a Linear Feedback Shift Register (LFSR). An N-bit LFSR requires just N 'D' Flip-Flops and a couple of logic gates. While the output of the LFSR is uncorrelated in time, the bits within the LFSR are perfectly correlated in time (separated by a delay), so it is not possible to use 3 bits from a single LFSR for the 3 dither caps. An N-bit counter is available, and was found that 3 reasonably independent sequences could be created by logically combining bits from the LFSR and the counter.

The following logical combinations were found to yield results close to that of 3 independent random sequences:

a. C2=L[6] 0.7 Unit Cap b. C1=L[3] NXOR B[0] 0.45 Unit Cap c. C0=L[6] NXOR B[1] 0.3 Unit Cap Given: L[6:0]—7-bit LFSR (127 bit sequence), B[6:0]—7-bit counter With averaging over 128 self-tuning steps.

Figure 31A:
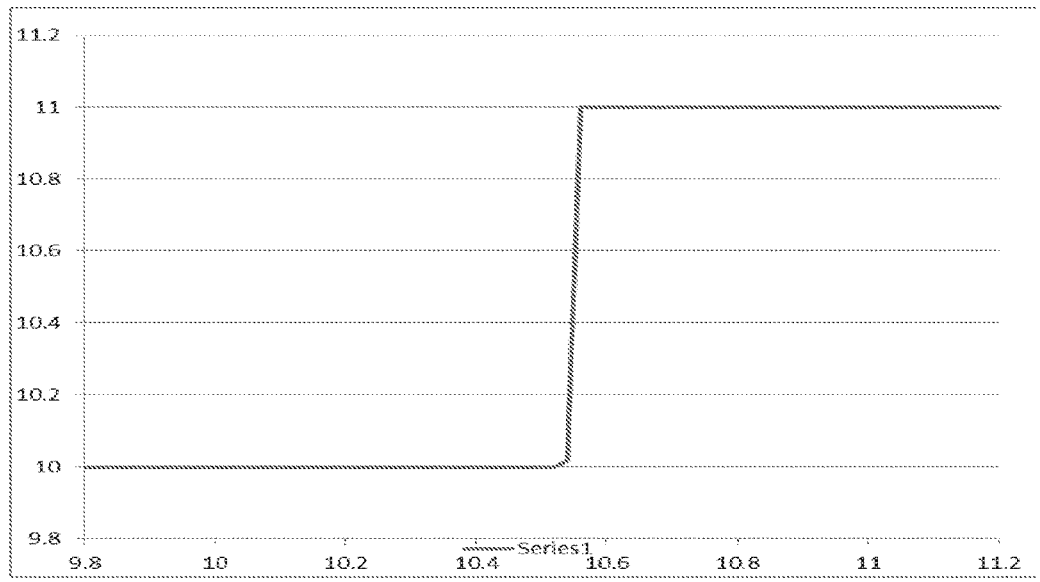
FIGS. 31A-31D are graphs of simulations performed with an RLC Tank Circuit system model with variable center frequency and Q.
Figure 31B:
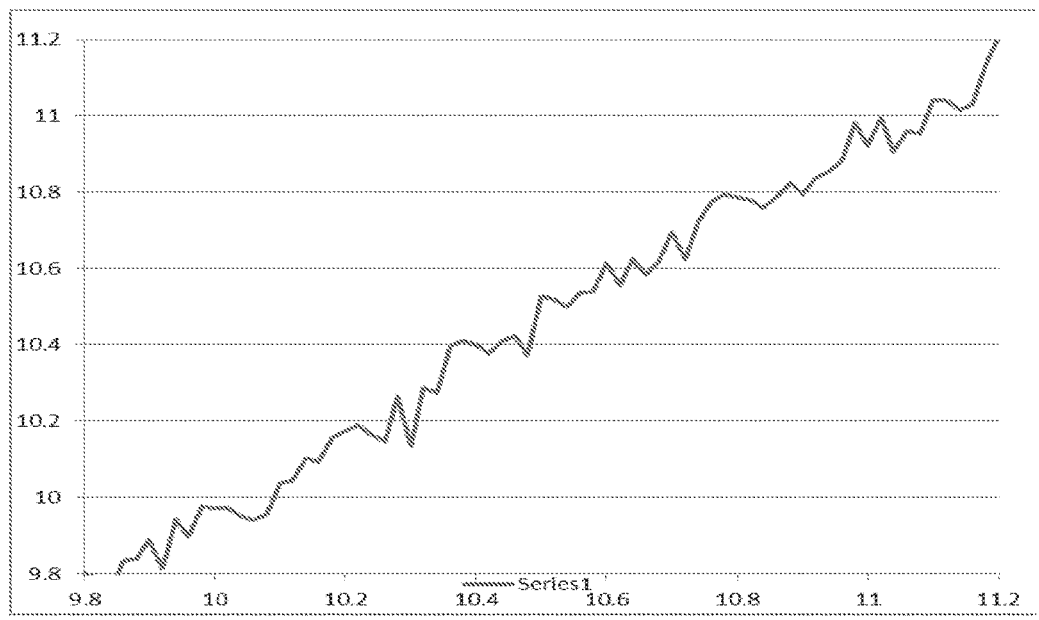
Figure 31C:
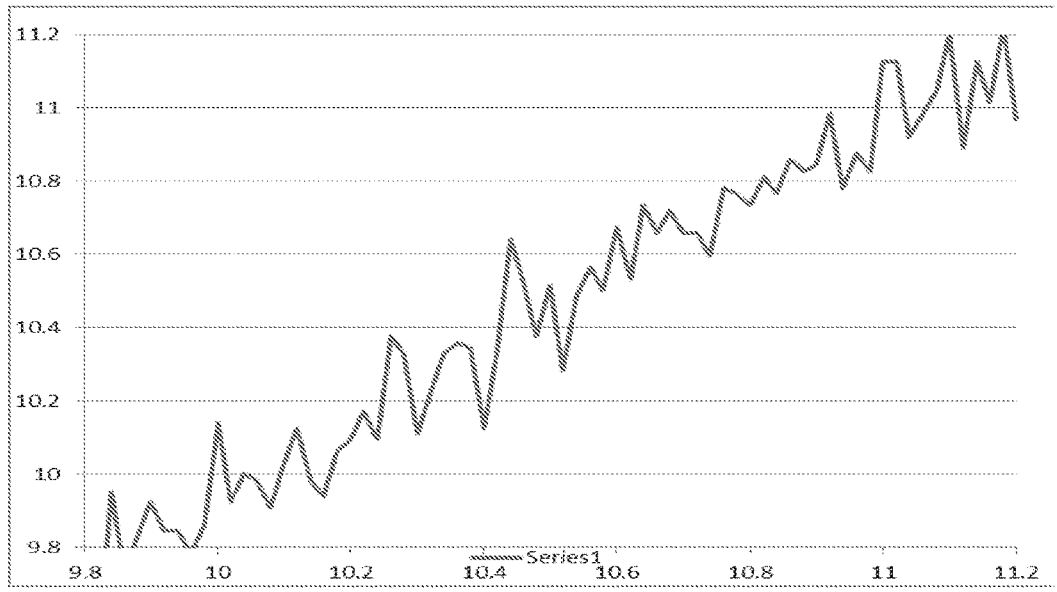
Figure 31D:
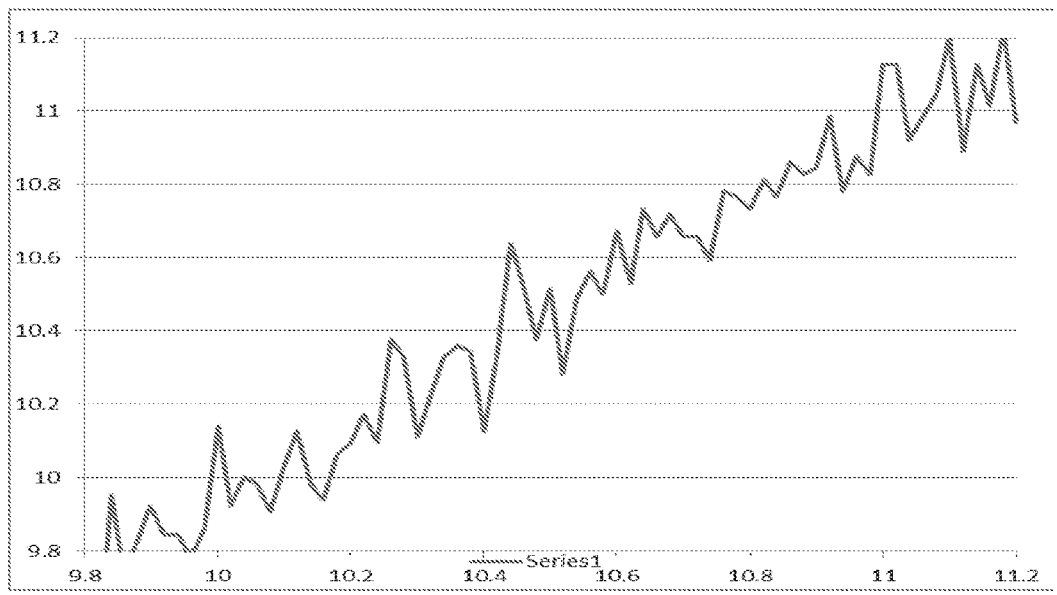

FIGS. 31A-31D are graphs of simulations performed with an RLC Tank Circuit system model with variable center frequency and Q. The self-tuning Algorithm simulations for 4 cases are presented. FIG. 31A presents the self-tuning Algorithm simulation for "No dither." FIG. 31B presents the self-tuning Algorithm simulation for "1024 step averaging with random dither bits (ideal)." FIG. 31C presents the self-tuning Algorithm simulation for "128 step averaging with random dither bits." Finally, FIG. 31D presents the self-tuning Algorithm simulation for "128 step averaging with reduced complexity pseudo pseudo-random dither bits."

The simulations were performed by sweeping L so as to sweep the target C from 9.8 to 11.2 and running one trial at each target C. The performance is best for Q>15. The above embodiments showed a resolution of 12-bits, truncated to 9-bits returned to the reader. For Q>3, the interpolation error for a single trial at a single (reader) frequency is approximately 0.1 Unit Cap which represents roughly 8-bits of accuracy. The self-tuning algorithm finds the Cap that maximizes the system response, which is not the natural frequency. This systematic error is approximately 0.15 Unit Cap at Q=10 and grows for lower Q. However, accuracy improves with averaging over frequency band.

Returning to FIG. 30, the clock acquisition and data conversion module 3006 will sense a voltage associated with the variable capacitance or varactor 3004 that may change as a function of antennae impedance wherein the impedance is changed based on environmental stimulus or other like conditions. Monitoring module 3008 may monitor phase and amplitude or other qualities associated with the data collected by clock and data conversion module 3006. This information is then provided to processing module 3014 which in conjunction with decision module 3010 may place capacitors 3016 A through N in service within the variable capacitance or varactor 3004 in order to maximize power transfer or other like considerations with antennae 3002. The manipulation of the varactor 3004 will relate to a sensor code as discussed previously or other like signal. Clock 3012 provides a clock input to the various modules within Engine 3000 such that the data acquisition and the actions of the various processing modules may be coordinated.

Figure 34:
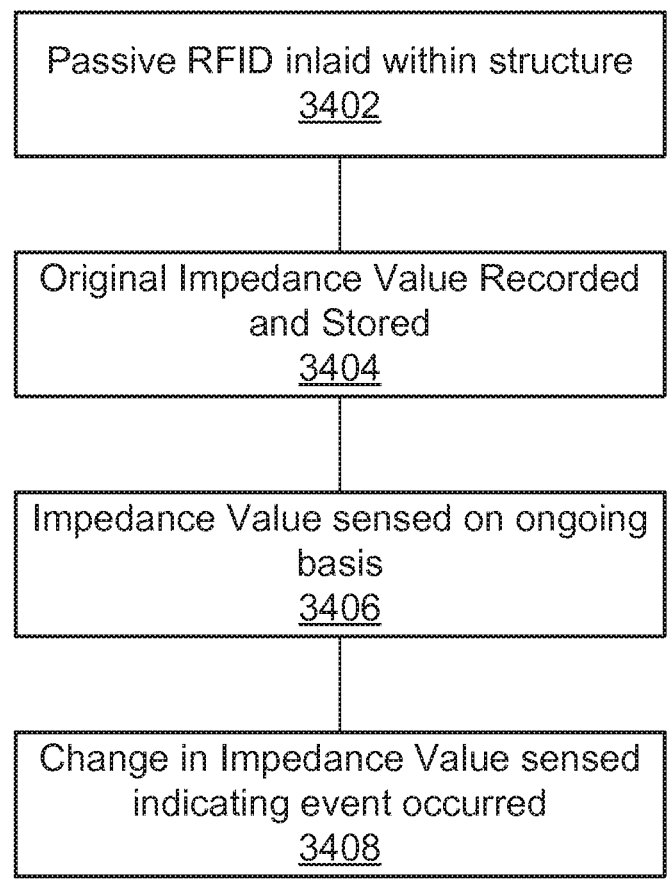
FIG. 34 provides a flow chart of one embodiment of the present disclosure.

Embodiments of the present disclosure may provide a passive RFID sensor (IC chip, antenna, and package) such that once an event of interest has occurred, the structure of the antenna and package may change its characteristics in an irreversible manner. FIG. 34 provides a flow chart of one such embodiment. In Block 3402, a passive RFID sensor, such as an antenna may be inlaid within the structure wherein a physical characteristic of the antenna and/or the sensor, such as impedance, may be altered when exposed to a sudden force. For example, an antenna may be wrapped around a glass or other structure. The original unique impedance value may be recorded and stored for comparison in block 3404. In block 3406, the impedance value may be read on an ongoing basis wherein when the impedance value or a code associated with the impedance value changes, that change signals that the event of interest may have occurred. Such an event may be when an object on which the passive sensor is mounted has been dropped.

In an embodiment, step 3406 of FIG. 34 can be altered so rather than sensing on an ongoing basis, the impedance is read at a later time that is offset from the event that caused the original unique impedance to change value. The sensing in step 3408 thus indicates that the particular event occurred that changed the original unique impedance because the new code read is different than the original code recorded in step 3404. The recording can be locally on the tag itself via a non-volatile memory or in a database remote from the tag as is associated with the unique identification number of the tag. In any of the cases, the magnitude of the impedance change, results in a different code change and thus is used to also detect the magnitude or amount of exposure to an event or and environmental change.

An embodiment of the present disclosure includes the permanent activation (i.e. irreversible change of a state) of an RFID tag/sensor by a non-powering event (without exposure to any RF signal that powers the RFID tag/sensor). In one embodiment, a non-powering event would result in a change in the characteristics of the antenna. An example is the fingers of the antenna getting closer to each other thus changing the impedance characteristics of the antenna and thus the tuning frequency that a Self-tuning engine optimizes power at. So fundamentally resulting in a code, when the RFID tag/sensor is queried by a RFID reader or powered up by a CW signal (or powered up in any way, e.g. via a DC or AC voltage applied to the IC) that is different than a unique calibrated code in the RFID tag that was stored before the occurrence of the event, (e. g. at the factory, at the warehouse, prior to including the RFID tag sensor on/in an object that experiences the event, when stacking object on a shelf, when object is loaded on a transporter, etc.).

An example of such an event is the dropping of a box that has the RFID tag/sensor affixed to it or within it. The processes that can affect such a change include, for example, acceleration of the object. For example, the antenna printed on a glass slide and a structure with a ball bearing that a change in acceleration would result in the ball bearing breaking the glass slide and results in a permanent change in the impedance of the antenna.

For all of the above embodiments in this section, the RFID tag/sensor can be read in multiple states, the calibrated neutral state (i.e. its unique impedance) and the one or more states after exposure to an event. In contrast to prior art where the RFID tag can be read in one state and the absence of a reading is an assumption of exposure (a second state). Such prior art results in an inability to distinguish between exposure to the desired event, removal (dislodging) of tag, or tag failure. The current disclosure does not suffer from this drawback and a reading would clearly indicate the exposure to the event and, in some embodiments, the level of exposure.

Embodiments of the present disclosure provide a passive radio frequency identification (RFID) sensor. This passive RFID sensor includes an antenna, a processing module, and a wireless communication module. The antenna has an antenna impedance that may vary with an environment in which the antenna is placed. The processing module couples to the antenna and has a tuning module that may vary a reactive component impedance coupled to the antenna in order to change a system impedance. The system impedance including both the antenna impedance and the reactive component impedance. The tuning module then produces an impedance value representative of the reactive component impedance. A memory module may store the impedance value which may then later be communicated to an RFID reader via the wireless communication module. The RFID reader may then exchange the impedance value representative of the reactive components of impedance with the RFID reader such that the RFID reader or another external processing unit may process the impedance value in order to determine environmental conditions at the antenna. These environmental conditions may include but are not limited to temperature, humidity, wetness, or proximity of the RFID reader to the passive RFID sensor.

In another embodiment, a conductor or transmission line couples the antenna to the processing module allowing the antenna to be positioned remotely or offset from the processing module. In yet another embodiment, a sensor having the sensor impedance that varies with the environment may be coupled to the processing module wherein the sensor impedance may be sensed via a sensor tuning module in much the same way that the antenna impedance is sensed and since a reactive component impedance is determined and a value representative of the impedance is produced which may again be transmitted to an RFID reader for external processing.

In one embodiment, the sensor is offset from the processing module via a conductor or transmission line. In one particular embodiment the sensor is positioned within a cavity offset from the processing module wherein the cavity is impervious to radio frequency signals. This sensor may be an open circuited transmission line where the open circuited transmission line only introduces a capacitance when liquids are present proximate to the open circuit transmission line. The capacitance changes in such an example may change with the volume of liquid proximate to the open circuited transmission line. This is extremely useful when placing liquid or water sensors within cavities such as those contained within a vehicle chassis or when the cavities are prone to fluid incursion. This allows the sensor to be offset from the processing module where the environment to be sensed is hostile to the processing module.

In another embodiment, the sensor may be an interdigitated capacitor wherein the capacitor's impedance changes in response to moisture, i.e. humidity proximate to the interdigitated capacitor. In yet another embodiment, the sensor may be a conductive plate proximate to a tuning fork wherein the conductive plate is separated from the tuning fork by a compressible insulating material wherein an external pressure applied to the conductive plate changes an impedance or inductance of the tuning circuit. In the case of the interdigitated capacitor, the impedance may change in response to an environmental dialectic constant change in the environment proximate to the interdigitated capacitor. This may occur when different gasses or fluids proximate to the sensor involve a change in dielectric constant at the sensor as may be caused by changing gas. Thus in one embodiment the passive RFID sensor may be used to detect an environment toxin such as CO, C02, arsenic, hydrogen sulfide or other hazardous chemicals.

A change in an effective dielectric constant may involve applications involving moisture, including water vapor detection, sensing of wet material stock when wetness causes product loss or deterioration, sensing of wetness in applications sensitive to mold or corrosion, and detection of leaks in hard-to-access locations. Solid state films, having an effective dielectric constant, react to a variety of gases with a change in resistance or effective dielectric constant, and enable the construction of sensor tags that respond to industrially significant gases such as CO, $CO_2$, $NO_x$, $H_2S$, $O_2$, and $Cl_2$. Thin films deposited onto an interdigitated capacitor can produce sufficient change in circuit Q to build wireless passive sensors readable through the sensor code.

In one embodiment, a non-powering event would result in a change in the characteristics of the antenna. An example is the fingers of the antenna getting closer to each other thus changing the impedance characteristics of the antenna and thus the tuning frequency that a Self-tuning engine optimizes power at. So fundamentally resulting in a code, when the RFID tag/sensor is queried by a RFID reader or powered up by a CW signal (or powered up in any way, e.g. via a DC or AC voltage applied to the IC) that is different than a unique calibrated code in the RFID tag that was stored before the occurrence of the event, (e. g. at the factory, at the warehouse, prior to including the RFID tag sensor on/in an object that experiences the event, when stacking object on a shelf, when object is loaded on a transporter, etc.).

Physical distortion of the antenna itself causes a change in resonant frequency of the antenna, and the self-tuning engine can adjust a sensor code to accommodate the change. Applications are possible for alarms, stress detection, such as for bridge integrity monitoring and inflation of flexible objects. An example of such an event is the dropping of a box that has the RFID tag/sensor affixed to or within the box.

The processes that can affect such a change also include, for example, acceleration of the object to which the RFID tag/sensor is affixed. For example, the antenna printed on a glass slide and a structure with a ball bearing that a change in acceleration would result in the ball bearing breaking the glass slide and results in a permanent change in the impedance of the antenna.

Figure 35A:
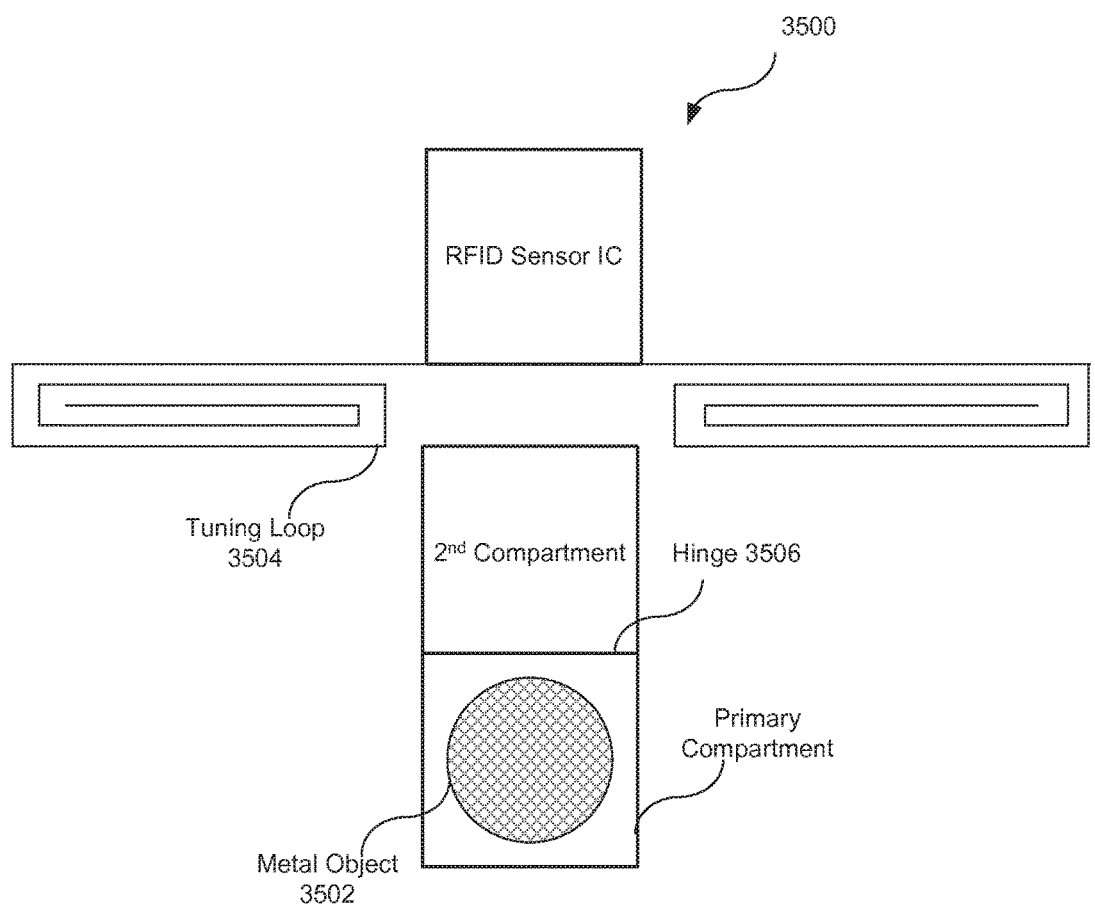
FIGS. 35A-35G are block diagrams of embodiments of the present disclosure that provide an RFID sensor with non-electronic memory.

FIG. 35A is a diagram of an embodiment of the present disclosure that provides a non-electronic memory passive RFID sensor. RFID sensor 3500 experiences a changing impedance due to the proximity of a metal object 3502 (e.g. ball bearing) to the tuning loop 3504 in the antenna. Acceleration results in the release and entrapment of the metal object 3502 closer to the tuning loop 3504 via an irreversible mechanism, for example a one-way hinge 3506 or stop that the acceleration results in the release of such a stop. Additionally, the process might be implemented in a reverse structure with the metal object 3502 is in close proximity to the tuning loop (initially in 2nd compartment 3508 and an acceleration event results in the metal object 3502 being irreversibly displaced from the proximity location to the tuning loop resulting in a change in impedance and as a result a permanent change in the tuning code. The effect could include the permanent release of the ball bearing from an open ended tube past the stop hinge.

Figure 35B:
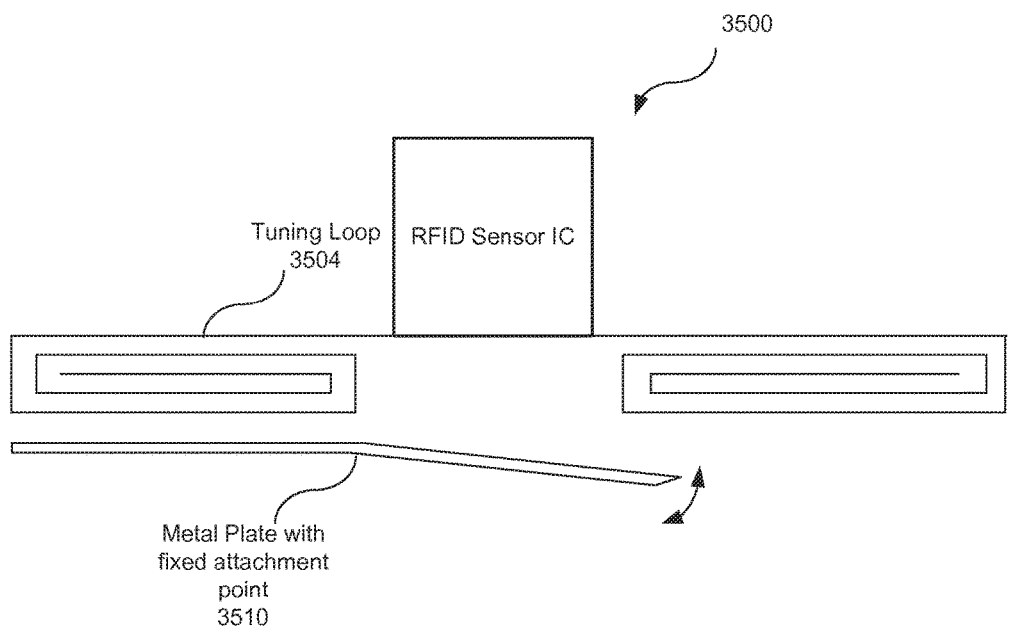

FIG. 35B is a diagram of an embodiment of the present disclosure that provides a non-electronic memory passive RFID sensor. In this embodiment of an RFID tag/acceleration sensor with non-electronic memory, an acceleration event is detected by a metal proximity change (e.g. metal plate 3510 with a fixed attachment point) resulting in antenna impedance change and therefore code change when tag is queried. For example, the antenna can be on a solid substrate. Different strength rivets result in the different threshold values. Furthermore, a tab can be implemented in order to ensure that the plate is never accelerated back into its original position. A fraction of an inch displacement from the tuning loop is sufficient to cause an impedance change that results in a significant and easily detectable code change. Another embodiment would affix the metal plate to the tuning inductor with a particular type of glue that the acceleration would cause a permanent displacement (detachment of the glue).

Figure 35C:
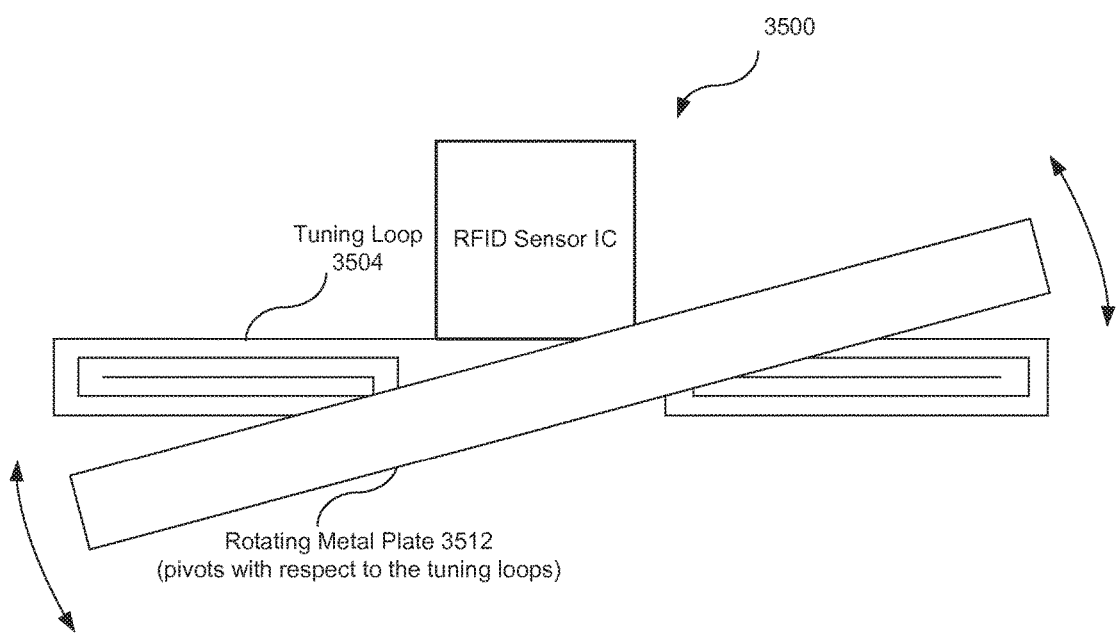

FIG. 35C is a diagram of an embodiment of the present disclosure that provides a non-electronic memory passive RFID sensor. In this embodiment of an RFID tag/acceleration sensor with non-electronic memory, a rotational or acceleration event is detected by a metal proximity change (e.g. metal plate 3512 with a pivot point) resulting in antenna impedance change and therefore code change when tag is queried.

Figure 35D:
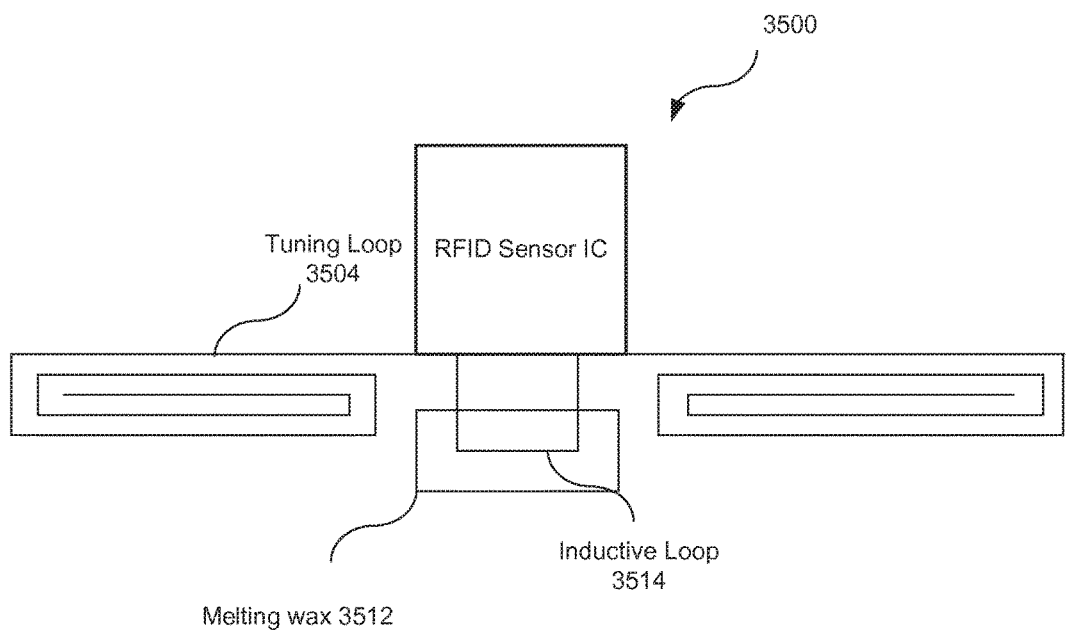

FIG. 35D is a diagram of an embodiment of the present disclosure that provides a non-electronic memory passive RFID sensor. In this embodiment of an RFID tag/acceleration sensor with non-electronic memory, a temperature change sensor using a wax strip 3512 that changes the area of the tuning loop 3514 (inductor) when melted resulting in a code change when tag is queried. An example is an antenna whose dielectric constant changes when, for example, ice melts with the wetness (moisture) resulting in a change in characteristics of the antenna.

Temperature change above and/or below a specific temperature or range (can be programmable, e.g. a code in a register representing the tuning code at a particular temperature or codes in multiple registers representing a range of temperatures).

In an embodiment, a strip of wax with conductive properties (particles of metal embedded in the wax) is placed in the inductive tuning loop of an antenna of an RFID tag. When the wax intact, the loop area is smaller than if the conductive wax did not exist. When the wax melts the area of the inductor increases and as a result changes the inductance of the loop resulting in a detectable code change. It is well known that the inductance of the loop is linearly proportional to the loop area.

To create multiple temperature thresholds, several such strips of wax with different melting point temperatures could be embedded in more than one location. The result is the ability to detect a lower and upper bound temperature range. For example, this can be embedded in a product where a 1st temperature increase results in a shorter shelf time and thus affects the price of the products and a 2nd temperature increase would result in a product that is unacceptable. This is can be expanded to multiple temperature ranges using the same process.

The application of various strips of material (e.g. wax) can be done via screen printing.

Figure 35E:
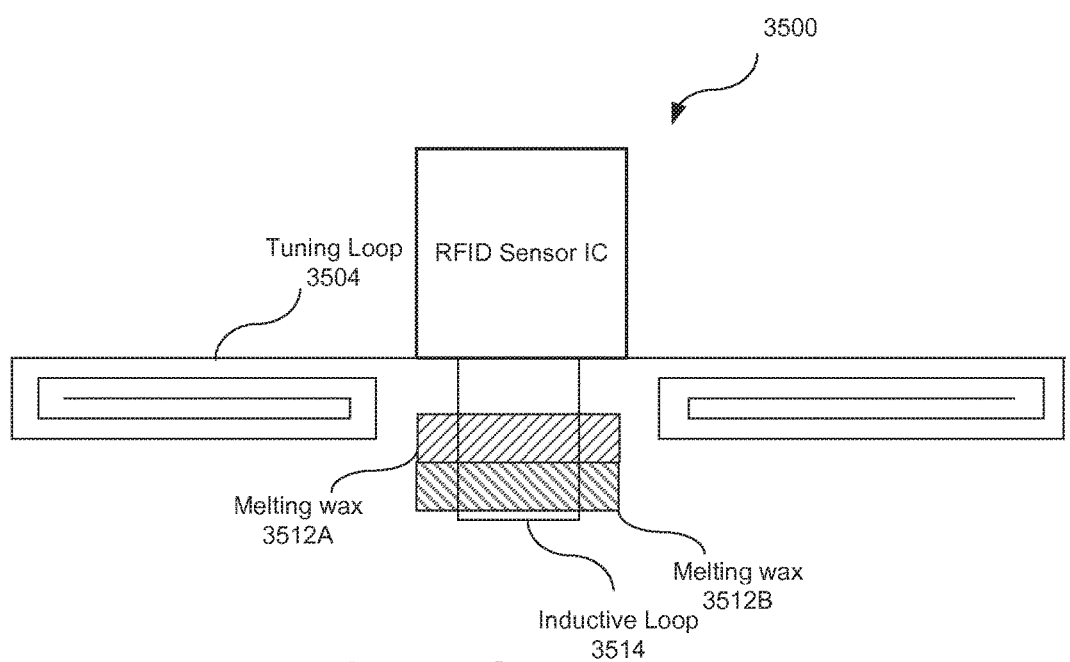

FIG. 35E is a diagram of an embodiment of the present disclosure that provides a non-electronic memory passive RFID sensor. In this embodiment of an RFID tag/acceleration sensor with non-electronic memory, a temperature change sensor using a wax strip 3512A that changes the area of the tuning loop 3514 (inductor) when melted resulting in a code change when tag is queried. A second temperature change sensor using a wax strip 3512B that changes the area of the tuning loop 3514 (inductor) when melted resulting in a further code change when tag is queried. Another embodiment of an RFID tag/temperature sensor with non-electronic memory may detect a temperature change with a wax substance on an interdigitated capacitor in parallel with the tuning loop that changes the reactance of the antenna when melted resulting in a code change when tag is queried. FIGS. 35D and 35E are examples where a similar concept of changing the loop inductance (geometry) is used to change the interdigitated capacitances dielectric material. The melting of the wax placed between the digits of an interdigitated capacitor would result in a change in the dielectric material of the capacitor and as a result a change in the tuning code from the calibrated code when the RFID tag is powered up (e.g. read). In order to achieve multiple thresholds, parallel, horizontal or vertical, strips of wax of various melting temperatures can be placed on top of the interdigitated capacitor and the melting of these individual wax strips would result in a different tuning code when the RFID tag is powered up.

Figure 35F:
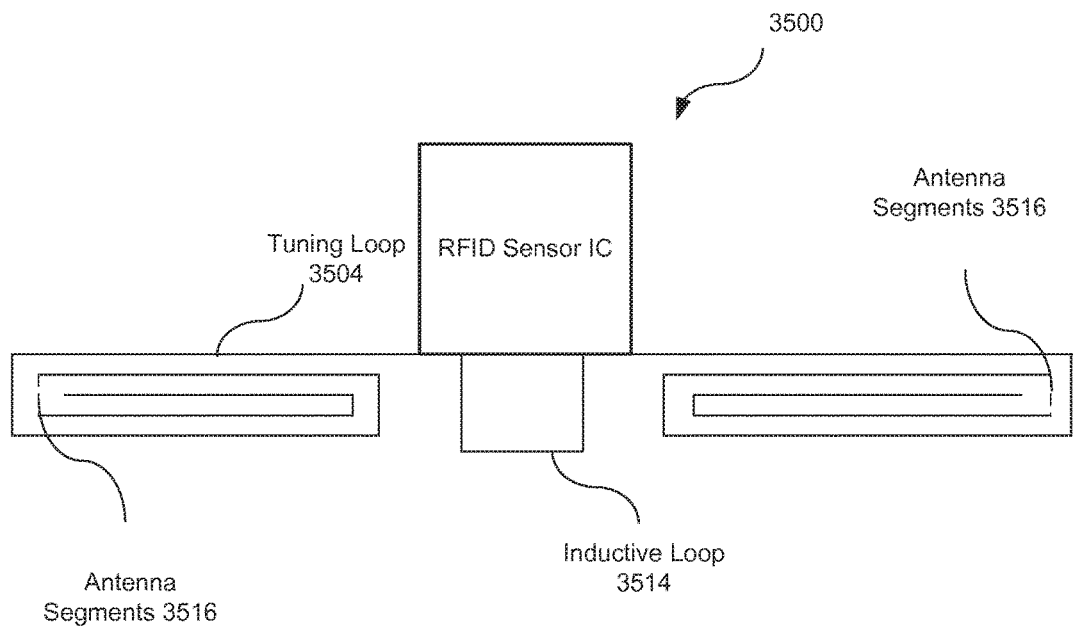
Figure 35G:
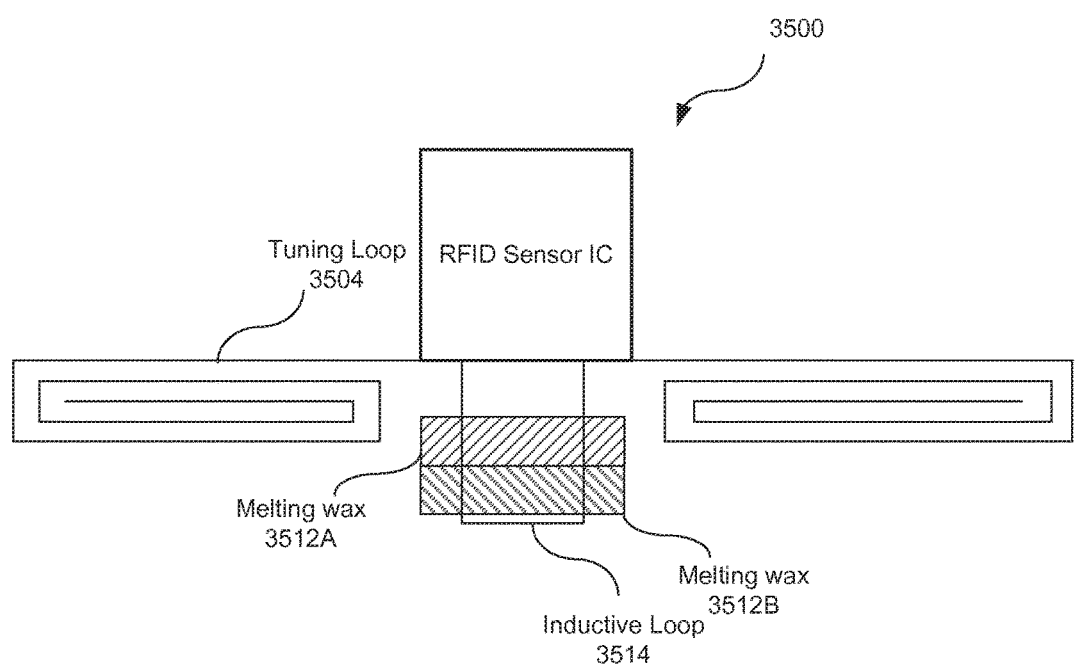

FIG. 35F is a diagram of an embodiment of the present disclosure that provides a non-electronic memory passive RFID sensor. In this embodiment of an RFID tag/moisture sensor with non-electronic memory, segments 3516 allows a moisture sensor that detects a wetness event using conductive ink that is water soluble that changes the length of the antenna when dissolved by moisture resulting in a code change when tag is queried.

In another embodiment, segments 3516 allow an embodiment of an RFID tag/light sensor with non-electronic memory. Segments 3516 detects a light exposure event using a photo resistive film that changes the length of the antenna or alternatively on top of an interdigitated capacitor in parallel with tuning loop that permanently changes resistance when exposure occurs that changes resulting in a code change when tag is queried.

By changing the tuning inductor's loop area, code movements are achieved that are arbitrarily low or high and are completely controllable by the calculation of the impedance change due to the loop area change.

It must be noted that changing the tuning inductive loop does not significantly change the read range for the RFID tag, if at all. Another embodiment is to change of length of antenna in order to control the impedance, where the ink is placed such that the length of the antenna is changed. Such an application would result in a change in the read range of the RFID tag.

For the embodiments where an interdigitated capacitor in parallel with the tuning inductor is used, the Self-tuning engine is used to tune out any effects of such a capacitor. The Self-tuning engine is designed such that the additional capacitor has no effect on either the tuning range or the readability range (because we can simply change the loop area of the inductor to compensate for any reactance change due to the addition of the interdigitated capacitor in parallel).

Another embodiment is used for ammonia leak measurement. This can be done by using a polymer that dissolves due to ammonia rather than in water. The idea is that the structure can be used to detect any fluid exposure that can cause a particular polymer or material to dissolve.

Another embodiment involves the use of a tuning loop (inductive loop) rather than the interdigitated capacitors used in a tail structure. All of the above mentioned embodiments involving an inductive loop are applicable to the tail structures. In additions, all of the above mentioned embodiments involving an interdigitated capacitor are applicable to the tail structures with such a capacitor.

Another embodiment involves the use of water soluble conductive ink and the antenna immersed or in contact with such an ink (e.g. a layer of ink or a blot of ink on top of all or parts of the antenna). As with the wax embodiments above different types of ink with different solubility points would create the same effect and structures as the wax.

Another embodiment is a tag in a diaper. The antenna has one characteristic impedance when dry, another when the water is covering the entire tag and various codes in-between when portions of the RFID tag is covered.

For sensing level of wetness, in for example a diaper, several tags can be used to detect water level/levels of wetness. However, using the DC ports a single tag with a long tail can be used whose impedance will incrementally change as the level of wetness in, for example, the diaper rises.

In another embodiment, the RFID tag/sensor is used to detect a powerless exposure to light. The principal is putting a photo film that changes conductivity or dissolved with light exposure over the interdigitated capacitor of the tuning. When the capacitor is DC shorted due to the photo film having very low resistance we have a structure that looks like two parallel inductors. When the photo film's resistance permanently changes due to light exposure resulting in a high resistance, we have a capacitor in parallel with the tuning inductor and thus resulting in a Self-tuning engine code change when tag is queried.

In another embodiment, a non-electronic memory sensor one that detects a pressure event with a film that deforms and stays deformed once exposed to pressure. The embodiments are similar to the one described above. Basically, separating the metal from the tuning loop via wax/plastic or any material that once deformed results in permanent proximity change.

In another embodiment, tuning loops, antennas and/or interdigitated capacitors are covered with strips of adhesive material that change color and thus impedance with exposure to temperature, light or the like. Temperature sensitive resistive properties that is irreversible once the temperature event occurs.

In another embodiment, the RFID tag/sensor of the disclosure is used as an orientation sensor. The calibrated sensor (unique reference code) includes a tube over the antenna with a ball bearing or other metallic object in close proximity to the antenna tuning loop. The sensor is deployed such that the tube is vertically affixed or semi-vertically (the angle is dependent on the tilting threshold desired for detection) affixed to an upright object for which detection of a tilting effect is desired and the top cover of the tube is removed. The effect of the tilting past the threshold angle is the permanent displacement of the metal object (falling out of the tube) and thus the permanent change is the RFID tag tuning code once the RFID tag is queried and thus the detection of the tilting event.

In yet another embodiment, mercury can be used as the metallic proximity object to the tuning loop.

For shipping the RFID tags with, for example the wax structures, a plastic adhesive strip can be placed over the wax in order to prevent it from being displaced if exposed to a temperature variation during shipping to the RFID tag customer. When the customer affixes the RFID tag to the final product, the adhesive strip is removed and thus enabling the detection of the destructive event.

Another embodiment is the use of a bimetallic strip that moves with temperature as an antenna structure. For example, embedding such a bimetallic strip in waxy material would irreversibly disturb that wax it is immersed in once a temperature event has occurred.

For all of the above embodiments in this section, the RFID tag/sensor can be read in multiple states, the calibrated unique neutral state and the one or more states after exposure to an event. In contrast to prior art where the RFID tag can be read in one state and the absence of a reading is an assumption of exposure (a second state). The result in an inability to distinguish between exposure to the desired event, removal (dislodging) of tag, or tag failure. The current disclosure does not suffer from this drawback and a reading would clearly indicate the exposure to the event and, in some embodiments, the level of exposure.

Embodiments of the present disclosure allow for combining multiple sensing applications in a single die thus expanding the application space of passive RFID sensors. Additional applications include altitude sensing (via pressure sensing), external accurate temperature sensing, dew point and differentials (temperature, moisture, etc.).

The passive RFID sensor may also include an RFID power harvesting module operable to receive energy form the RFID reader and power the passive RFID sensor with the received power. The processing module may determine how much of this energy is to be consumed by the passive RFID sensor and divert any remaining energy to a reservoir power harvesting element. Additionally, the memory module may store identification information for the passive RFID sensor wherein the identification information may be provided with the impedance values associated with the antenna or a separate sensor and be provided to the RFID sensor for further processing. Additionally, a time stamp may be applied to this information. This may allow the RFID reader to generate an alarm signal based on certain measured environmental conditions.

Thus, it is apparent that embodiments of the present disclosure have provided an effective and efficient method and apparatus for sensing changes to an environment to which the RFID tag is exposed.

Those skilled in the art will recognize that modifications and variations can be made without departing from the spirit of the present disclosure. Therefore, we intend that embodiments of the present disclosure encompass all such variations and modifications as fall within the scope of the appended claims the system controllers or processors may comprise a microprocessor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory may couple to the microprocessor in the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the microprocessor implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in the FIGs.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A wireless sensor comprises:
   an antenna operable to receive an inbound radio frequency (RF) signal and to transmit an outbound RF signal;
   a sensing element proximal to the antenna, wherein the sensing element, when sensing a first environmental condition, changes a characteristic of an RF front-end of the wireless sensor;
   a tuning circuit operably coupled to adjust the RF front-end to compensation for the change in the characteristic, wherein the RF front-end includes two or more of: the antenna, the sensing element, and the tuning circuit;
   a reference circuit block operable to generate a signal based on a low voltage low frequency input that corresponds to a second environmental condition;
   a processing module operably coupled to:
      generate a first digital value based on the adjustment to the RF front-end, where the first digital value is a representation of the first environmental condition; and
      generate a second digital value based on the signal, where the second digital value is a representation of the second environmental condition; and
   a transmitter operable to generate the outbound RF signal, which includes at least one of the first and second digital values.

2. The wireless sensor of claim 1, wherein the low voltage low frequency input comprises one or more of:
   a DC signal;
   a temperature sensor input;
   a wheat stone bridge input; and
   a pressure sensor input.

3. The wireless sensor of claim 1 further comprises:
   the representation of the first environmental condition including one of: an actual measurement of the first environmental condition, a relative measurement of the first environmental condition with respect to a known measurement of the first environmental condition, and the first digital values; and
   the representation of the second environmental condition including one of: an actual measurement of the second environmental condition, a relative measurement of the second environmental condition with respect to a known measurement of the second environmental condition, and the second digital values.

4. The wireless sensor of claim 1, wherein the reference circuit block comprises:
   one or more ports for receiving the low voltage low frequency input;
   a gain stage to amplify the low voltage low frequency input to produce an amplified signal; and
   an analog to digital converter operable to convert the amplified signal into the signal.

5. The wireless sensor of claim 1 further comprises:
   a second reference circuit block operable to generate a second signal based on a second low voltage low frequency input that corresponds to a third environmental condition;
   the processing module is further operably coupled to:
      generate a third digital value based on the second signal, where the third digital value is a representation of the third environmental condition; and
   the transmitter is further operable to generate the outbound RF signal to further include the third digital value.

6. The wireless sensor of claim 1 further comprises:
   a second antenna operable to receive the inbound RF;
   a second sensing element proximal to the second antenna, wherein the second sensing element, when sensing a third environmental condition, changes a second characteristic of a portion of the RF front-end;
   a second tuning circuit operably coupled to adjust the portion of the RF front-end to compensation for the change in the second characteristic, wherein the portion of the RF front-end includes two or more of: the second antenna, the second sensing element, and the second tuning circuit;
   the processing module operably coupled to:
      generate a third digital value based on the adjustment to the portion of the RF front-end, where the third digital value is a representation of the third environmental condition; and
   the transmitter is further operable to generate the outbound RF signal to include the third digital value.

7. The wireless sensor of claim 1 further comprises:
   a power harvesting circuit operable to generate a power supply voltage from the inbound RF signal, wherein the power supply voltage is sourced to one or more of the tuning circuit, the reference circuit block, the processing module, and the transmitter.

8. The wireless sensor of claim 1 further comprises:
   a first power harvesting circuit operable to generate a first power source from the inbound RF signal; and
   a second power harvesting circuit operable to generate a second power source from the inbound RF signal, wherein the first and second power sources are combined to produce a power supply voltage that is sourced to one or more of the tuning circuit, the reference circuit block, the processing module, and the transmitter.

9. The wireless sensor of claim 1 further comprises:
   a memory for storing the at least one of the first and second digital values;
   the antenna operable to receive a continuous wave signal;
   a power harvesting circuit operable to generate a power supply voltage from the continuous wave signal, wherein the power supply voltage is sourced to one or more of the tuning circuit, the reference circuit block, the processing module, the memory, and the transmitter; and wherein the receiving of the continuous wave signal triggers the processing module to generate at least one of the first and second digital values.

* * * * *